United States Patent
Shinoura et al.

(10) Patent No.: US 12,337,553 B2
(45) Date of Patent: Jun. 24, 2025

(54) COMPOSITE MATERIAL MOLDED ARTICLE AND METHOD FOR MANUFACTURING SAME

(71) Applicant: Mitsubishi Chemical Corporation, Tokyo (JP)

(72) Inventors: Yasutaka Shinoura, Tokyo (JP); Takayuki Kobayashi, Tokyo (JP); Takuya Miyauchi, Tokyo (JP); Takeshi Ishikawa, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1223 days.

(21) Appl. No.: 17/027,796

(22) Filed: Sep. 22, 2020

(65) Prior Publication Data
US 2021/0002436 A1 Jan. 7, 2021

Related U.S. Application Data

(63) Continuation of application No. PCT/JP2019/013101, filed on Mar. 27, 2019.

(30) Foreign Application Priority Data

Mar. 27, 2018 (JP) .................................. 2018-060422
Jul. 5, 2018 (JP) .................................. 2018-128580
(Continued)

(51) Int. Cl.
*B29C 70/46* (2006.01)
*B29C 70/14* (2006.01)
(Continued)

(52) U.S. Cl.
CPC .............. *B29C 70/46* (2013.01); *B29C 70/14* (2013.01); *B29C 70/465* (2013.01); *C08J 5/042* (2013.01);
(Continued)

(58) Field of Classification Search
CPC ....... B29C 70/46; B29C 70/14; B29C 70/465; C08J 5/042; C08K 3/04; C08K 7/06; B29K 2105/14; B29K 2307/04
(Continued)

(56) References Cited

U.S. PATENT DOCUMENTS

| 4,438,062 A | 3/1984 | Griffith et al. |
| 2014/0004308 A1 | 1/2014 | Taniguchi et al. |

(Continued)

FOREIGN PATENT DOCUMENTS

| DE | 102015200763 A1 | 8/2016 |
| EP | 0393476 A1 | 10/1990 |

(Continued)

OTHER PUBLICATIONS

Office Action issued in corresponding European Patent Application No. 19775455.9, dated Aug. 26, 2022.
(Continued)

*Primary Examiner* — Matthew D Matzek
(74) *Attorney, Agent, or Firm* — Morgan, Lewis & Bockius LLP

(57) ABSTRACT

A composite material molded article includes a molded product of a molding material containing a resin and fibers, in which a fiber orientation degree f of the following region A of the molded product is 0.10 or more and 1 or less.
Region A: in a case where a distance between one point at each of edges of a surface of a first end portion of the molded product and edges of the other end portion is measured along a vertical direction perpendicular to lateral faces of the first end portion within a surface of the molded product, and points separated from the one point by a distance equivalent to 3.0% of the distance measured from the one point are connected with a line along the edges of the first end portion,
(Continued)

a region surrounded with the line and the edges of the molded product is regarded as a region A.

10 Claims, 26 Drawing Sheets

(30) Foreign Application Priority Data

Aug. 28, 2018 (JP) ................................ 2018-159083
Aug. 28, 2018 (JP) ................................ 2018-159482

(51) Int. Cl.
　　*C08J 5/04* (2006.01)
　　*C08K 3/04* (2006.01)
　　*C08K 7/06* (2006.01)
　　*B29K 105/14* (2006.01)
　　*B29K 307/04* (2006.01)

(52) U.S. Cl.
　　CPC ................. *C08K 3/04* (2013.01); *C08K 7/06* (2013.01); *B29K 2105/14* (2013.01); *B29K 2307/04* (2013.01)

(58) Field of Classification Search
　　USPC ........................................................ 428/221
　　See application file for complete search history.

(56) References Cited

U.S. PATENT DOCUMENTS

| | | | |
|---|---|---|---|
| 2017/0057208 A1 | 3/2017 | Oosawa et al. | |
| 2017/0183465 A1 | 6/2017 | Kawabe et al. | |
| 2017/0298199 A1 | 10/2017 | Akiyama et al. | |
| 2018/0162070 A1* | 6/2018 | Iwata | ..................... G01N 23/00 |

FOREIGN PATENT DOCUMENTS

| | | | |
|---|---|---|---|
| JP | 59-190828 A | 10/1984 | |
| JP | 02-295708 A | 12/1990 | |
| JP | 2000-167863 A | 6/2000 | |
| JP | 2008-221794 A | 9/2008 | |
| JP | 2013-203773 A | 10/2013 | |
| JP | 2016-027956 A | 2/2016 | |
| JP | 2016-074197 A | 5/2016 | |
| JP | 2016-079337 A | 5/2016 | |
| JP | 2016-090259 A | 5/2016 | |
| JP | 5994448 B | 9/2016 | |
| JP | 2017-043095 A | 3/2017 | |
| WO | 2012/108446 A1 | 8/2012 | |
| WO | 2016/039326 A1 | 3/2016 | |
| WO | WO-2016208731 A1 * | 12/2016 | ............. B29B 11/16 |

OTHER PUBLICATIONS

International Search Report issued in corresponding International Patent Application No. PCT/JP2019/013101, dated Jun. 18, 2019.
Office Action issued in corresponding Japanese Patent Application No. 2019-519775, dated Jun. 30, 2020.
Office Action issued in European Patent Application No. 19775455.9 dated Mar. 22, 2023.
Office Action dated Jan. 4, 2024, issued in corresponding European Patent Application No. 19775455.9.
Office Action issued in corresponding Japanese Patent Application No. 2020-199207, dated Aug. 24, 2021.
Search Report issued in corresponding European Patent Application No. 19775455.9, dated Aug. 30, 2021.

* cited by examiner

COMPOSITE MATERIAL MOLDED ARTICLE AND METHOD FOR MANUFACTURING SAME

This application is a continuation application of International Application No. PCT/JP2019/013101, filed on Mar. 27, 2019, which claims the benefit of priority of the prior Japanese Patent Application No. 2018-060422 filed in Japan on Mar. 27, 2018, the prior Japanese Patent Application No. 2018-128580 filed in Japan on Jul. 5, 2018, the prior Japanese Patent Application No. 2018-159482 filed in Japan on Aug. 28, 2018, and the prior Japanese Patent Application No. 2018-159083 filed in Japan on Aug. 28, 2018, the entire contents of which are incorporated herein by reference.

TECHNICAL FIELD

The present invention relates to a composite material molded article which is a molded substance containing fibers and a resin, and a method for manufacturing the same.

BACKGROUND ART

Owing to their mechanical properties such as strength and rigidity, composite material molded articles containing a reinforcing material such as fibers and a resin are used in a wide variety of fields. The composite material molded articles are manufactured, for example, by a method of performing compression molding on a composite material containing reinforcing fibers and a thermosetting resin. Examples of such a composite material include a prepreg and a sheet molding compound (hereinafter, also referred to as SMC). Conventionally, glass fibers have been used as the reinforcing fibers. In recent years, the glass fibers have been increasingly replaced with carbon fibers because the carbon fibers have high specific strength and high specific elastic modulus and can reduce the weight of composite material molded articles.

SMC contains short fibers having a small fiber length as reinforcing fibers. Therefore, during molding, the material constituting SMC flows and fills up a molding die. Accordingly, it is possible to form from SMC a complicated shape having fine irregularities that is difficult to mold from a prepreg using a reinforcing material formed of aligned continuous reinforcing fibers. On the other hand, because the reinforcing fibers in SMC have a small fiber length and randomly oriented, unfortunately, the mechanical properties of the composite material molded article obtained from SMC are poorer than those of the composite material molded article obtained from the prepreg.

As a solution to the above problem, the following SMC has been suggested.

SMC made of carbon fiber, of which a monofilament linear density is 1.0 to 2.4 dtex and a roundness of a cross section perpendicular to a fiber axis of a monofilament is 0.70 or more and 0.90 or less, and a matrix resin composition (Patent Literature 1).

SMC made of a molding material containing a fiber base material composed of carbon fibers, at least either an epoxy (meth)arylate resin or an unsaturated polyester resin, an inorganic filler having a specific shape, and a polyisocyanate compound (Patent Literature 2).

In Patent Literature 3, as a method making it possible to calculate a fiber orientation degree of a composite material molded article with high accuracy, a method using X-ray diffraction is suggested.

Furthermore, by controlling the orientation of fibers in the composite material molded article described above, it is possible to design mechanical characteristics according to the way the product is used. For example, by uniformly arranging the fibers along a predetermined direction or arranging the fibers in random directions, the mechanical characteristics of the composite material molded article can be changed. The following Patent literature 4 describes a method of calculating a crystal orientation degree of fiber tows in a fiber-reinforced composite material.

In a case where a composite material molded article is manufactured using SMC described above, because SMC flows in the process of molding, sometimes SMCs merge together from 2 directions and form a weld line (also called weld portion). In this case, in the vicinity of the weld line, reinforcing fibers are oriented along the weld line. Therefore, unfortunately, the obtained composite material molded article exhibits poor mechanical characteristics along a direction perpendicular to the weld line.

Patent Literature 5 discloses a method for manufacturing a composite material molded article having a well-like portion and a planar portion, in which a plate-like molding material made of a fiber-reinforced composite material containing discontinuous reinforcing fibers and a thermoplastic resin is used for the well-like portion, a plate-like molding material made of a thermoplastic resin material is used for the planar portion, and the plate-like molding materials are subjected to cold press molding under predetermined conditions such that no weld portion is present at the boundary between the well-like portion and the planar portion.

Patent Literature 6 discloses a method of insert-molding a reinforcing member made of a predetermined continuous fiber-reinforced thermoplastic resin composite material, as a method of reinforcing a weld portion in an injection-molded article of a short fiber-reinforced thermoplastic resin.

Patent Literature 7 discloses a molding die for SMC, in which in a cavity of the molding die for SMC, a resin reservoir is provided in a direction different from a direction along which a flow direction of softened SMC changes, such that a molded article hardly broken at a portion such as a weld portion where the flow changes can be molded. Patent Literature 7 also discloses a method for manufacturing an SMC molded article by using the molding die.

CITATION LIST

Patent Literature

[Patent Literature 1]
  Japanese Unexamined Patent Application, First Publication No. 2013-203773
[Patent Literature 2]
  PCT International Publication No. WO2016/039326
[Patent Literature 3]
  Japanese Unexamined Patent Application, First Publication No. 2016-90259
[Patent Literature 4]
  PCT International Publication No. WO2016/208731
[Patent Literature 5]
  Japanese Unexamined Patent Application. First Publication No. 2017-43095
[Patent Literature 6]
  Japanese Unexamined Patent Application, First Publication No. 2000-167863

[Patent Literature 7]
   Japanese Unexamined Patent Application, First Publication No. 2008-221794

SUMMARY OF INVENTION

Technical Problem

Currently, it is generally difficult to obtain carbon fibers having the high monofilament linear density and the specific roundness described above. Therefore, it is difficult to manufacture SMC in Patent Literature 1.

SMC in Patent Literature 2 has a disadvantage in that the formulation of the materials is significantly restricted.

Therefore, there is a demand for a technique making it possible to obtain a composite material molded article having excellent mechanical properties even though general materials are used as SMC.

In Patent Literature 3, the improvement of mechanical properties of a composite material molded article using SMC is not examined.

In some cases, molded articles each molded from SMC are connected to each other to manufacture a single product. Therefore, it is necessary to inhibit the occurrence of warpage at a specific site such as the connection portion. In a case where a composite material molded article is manufactured using SMC, sometimes the fiber orientation direction changes as a resin material flows during molding. In a case where the fiber orientation direction cannot be controlled, the mechanical characteristics of the molded substance are likely to change. For example, in a case where the crystal orientation degree of the fiber tows (hereinafter, referred to as fiber orientation degree in some cases) is increased, high mechanical strength is likely to be obtained, but serious warpage is likely to occur.

Furthermore, the shape of the molded article that can be manufactured by the method described in Patent Literature 5 is limited. Therefore, unfortunately, this method cannot take advantage of SMC which can be molded into a member having a complicated shape.

In the method described in Patent Literature 6, insert molding is performed. Therefore, unfortunately, this method cannot take advantage of SMC which can be processed into a member by press molding within a short time. In addition, because the method described in Patent Literature 6 uses a composite material containing continuous fibers, this method cannot be used for obtaining a molded article having a complicated shape.

The method described in Patent Literature 7 requires a special molding die. Therefore, this method cannot reduce weld lines without depending on the molding die. Moreover, in this method, a resin portion or the like formed in the resin reservoir needs to be removed after molding, which leads to the problem of increase in number of steps.

An object of the present invention is to provide a composite material molded article having excellent mechanical properties and a method for manufacturing the same.

Another object of the present invention is to provide a composite material molded article in which the occurrence of warpage in a specific portion is inhibited and a method for manufacturing the same.

Solution to Problem

In order to achieve the above objects, the inventors of the present invention have repeated intensive studies. As a result, the inventors have found that charging a molding die with a molding material such as SMC under specific conditions is effective for obtaining a composite material molded article having a high fiber orientation degree at end portions, a composite material molded article in which the occurrence of warpage in a specific portion is inhibited, or a composite material molded article having excellent mechanical strength even though the article has a weld line. Based on the finding, the inventors have accomplished the present invention.

The present invention includes the following aspects.

<1> A composite material molded article containing a molded product of a molding material containing a resin and fibers,
in which an average of the following fiber orientation degree f in the following region A of the molded product is 0.10 or more and 1 or less,
region A: in a case where a distance between one point at each of edges of a surface of a first end portion of the molded product and edges of the other end portion is measured along a vertical direction perpendicular to lateral faces of the first end portion within a surface of the molded product, and points separated from the one point by a distance equivalent to 3.0% of the distance measured from the one point are connected with a line along the edges of the first end portion of the molded product, a region surrounded with the line and edges of the molded product is regarded as a region A,
fiber orientation degree f: in a case where the vertical direction is named 90° direction, a direction orthogonal to the vertical direction is named 0° direction, and an X-ray diffracted at a diffraction angle 2θ of 25.4° is detected by X-ray diffraction, a fiber orientation degree based on the 0° direction that is calculated from the following Equations (1), (2), and (3) is a fiber orientation degree f.

$$f = 2a - 1 \tag{1}$$

$$a = \frac{\sum_{i=1}^{N} I(\Phi_i)\cos^2\Phi_i}{\sum_{i=1}^{N} I(\Phi_i)} \tag{2}$$

$$\int_0^{360} I(\Phi)d\Phi = \sum_{i=2}^{N} (I(\Phi_i) + I(\Phi_{i-1})) \times d\Phi \times \frac{1}{2} = 10000 \tag{3}$$

In Equation (1), a is a coefficient of orientation expressed by Equation (2). $I(\varphi_i)$ is a luminance at an i-th rotation angle $(\varphi_i)$ in the X-ray diffraction, and is normalized such that an integrated intensity expressed by Equation (3) becomes 10,000. Furthermore, N in Equation (3) is the number of measurement points. The number of measurement points is a value obtained by dividing 360 (°) by a step size (°) that is an angle by which a molded product as a measurement target is rotated whenever the X-ray diffraction is measured. dφ in the same equation represents a micro-region of the rotation angle around the molded product as a measurement target. Herein, dφ equals a value of the step size.

<2> The composite material molded article in <1>, in which the region A is a region surrounded with the edges of the molded product and a line connecting points 2 mm distant from the one point of each of the edges of the surface of the first end portion of the molded product in the vertical direction perpendicular to the lateral faces of the first end portion along the edges of the first end portion of the molded product.

<3> The composite material molded article in <1> or <2>, in which the following function of the region A of the molded product has a negative slope, function: a linear function obtained by measuring the fiber orientation degree f for two points at both end portions of a straight line extending in the vertical direction in the region A and for two or more points closer to the inside than the two points, plotting a distance (mm) between each of the points and the lateral faces of the first end portion on an x axis, plotting the fiber orientation degree f on a y axis, and performing linear approximation by a least square method.

<4> A composite material molded article, which is a molded substance of a molding material containing a resin and fibers, the composite material molded article having a first region including a resin merging portion, in which the first region is a region which extends along the resin merging portion, a length of the first region is twice an average fiber length of the fibers in a direction intersecting with the resin merging portion, and an average fiber orientation degree in the first region is 0.19 or more.

<5> The composite material molded article in <4>, in which in the first region, a ratio of a tensile elastic modulus in a second direction intersecting with a first direction to a tensile elastic modulus in the first direction intersecting with the resin merging portion is 1.5 or more and 6.0 or less.

<6> The composite material molded article in <4> or <5>, including two second regions arranged in a direction intersecting with the resin merging portion across the first region, in which the average fiber orientation degree in the first region is higher than an average fiber orientation degree in the second regions.

<7> A composite material molded article using a molding material containing a resin and fibers, in which in a case where an in-plane second direction of a surface of the composite material molded article is named 0° direction, a first direction orthogonal to the second direction is named 90° direction, a fiber orientation degree based on the 0° direction is measured for a plurality of sites along the first direction by X-ray diffraction such that a distribution of the fiber orientation degree in the first direction is obtained, and the distribution of the fiber orientation degree is approximated to a normal distribution, a full width at half maximum is 5 or more mm.

<8> The composite material molded article in <7>, in which a weld line is within the surface, and the second direction is a direction in which the weld line extends.

<9> The composite material molded article in any one of <1> to <8>, which is a cured product of a sheet molding compound.

<10> The composite material molded article in any one of <1> to <9>, in which the fibers are carbon fibers.

<11> The composite material molded article in any one of <1> to <10>, in which an amount of the fibers is 20% by mass or more and 65% by mass or less with respect to a total amount of the composite material molded article.

<12> A method for manufacturing a composite material molded article, including charging a molding die with a molding material containing a resin and fibers such that a ratio R of the following fiber flow length to an average fiber length of the molding material falls into a range of 0.2 to 15.0, and performing heat press molding on the molding material.

Fiber flow length: a distance that the fibers at an end portion of the molding material charged into the molding die move to reach a predetermined site at an edge or a resin merging portion of the molded article by heat press molding.

<13> A method for manufacturing a composite material molded article, including charging a molding die with a molding material containing a resin and fibers such that a ratio r of a distance that the fibers move along an edge or a resin merging portion of the molding die during molding to an average fiber length of the molding material falls into a range of 0.2 to 12.0, and performing heat press molding on the molding material.

<14> A method for manufacturing a composite material molded article, including charging a molding die with a molding material containing a resin and fibers such that the following charge rate becomes 10% to 80%, and performing heat press molding on the molding material.

Charge rate: a ratio of an area of the molding material to an area of the molding die.

<15> A method for manufacturing a composite material molded article which is a molded substance of a molding material containing a resin and fibers, the method including arranging a plurality of base materials containing the molding material in a molding die, and performing compression molding on the plurality of base materials such that a resin merging portion is formed by the fusion of a plurality of flowing fluids of the base materials, in which the base materials flow along a direction in which the resin merging portion extends, a first region including the resin merging portion of the molded substance is a region which extends along the resin merging portion, a length of the first region is twice an average fiber length of the fibers in a direction intersecting with the resin merging portion, and an average of a fiber orientation degree in the first region is 0.19 or more.

<16> The method for manufacturing a composite material molded article in any one of <12> to <15>, in which the molding material is a sheet molding compound.

The present invention also has the following aspects.

<1> A composite material molded article including a molded product of a molding material containing a resin and fibers, in which an average of the following fiber orientation degree f of the following region A of the molded product is 0.10 or more and 1 or less, preferably 0.10 or more and 0.80 or less, more preferably 0.12 or more and 0.70 or less, even more preferably 0.15 or more and 0.60 or less, and particularly preferably 0.20 or more and 0.50 or less.

Region A: a region obtained in a case where the molded product is cut in a vertical direction along a line that is separated from a corner A by a distance $D_2$ equivalent to 3.0% of a total length $D_1$ of the molded product in a width direction, in which the corner A is formed by an upper surface of the molded product and one lateral surface of the molded product.

Fiber orientation degree f: in a case where a test piece A is obtained by cutting out the region A, the depth direction is named 0° direction, and X-ray diffraction is performed to detect an X-ray diffracted at a diffraction angle 2θ of 25.4° when the test piece A is rotated around an axis that extends in a thickness direction of the test piece A and passes a center of gravity of the test piece A, a fiber orientation degree based on the 0° direction that is calculated from the following Equations (1), (2), (3), and (4) is a fiber orientation degree f.

$$f = 2a - 1 \quad (1)$$

$$a = \frac{\sum_{i=1}^{N} I(\Phi_i)\cos^2\Phi_i}{\sum_{i=1}^{N} I(\Phi_i)} \quad (2)$$

$$\int_0^{360} I(\Phi)d\Phi = \sum_{i=2}^{N}(I(\Phi_i) + I(\Phi_{i-1})) \times d\Phi \times \frac{1}{2} = 10000 \quad (3)$$

$$N = 360/d\Phi \quad (4)$$

In Equation (1), a is a coefficient of orientation expressed by Equation (2); $I(\varphi_i)$ is a luminance obtained in a case where the test piece A is rotated $\varphi_i°$ in the X-ray diffraction, and satisfies Equation (3); and N in Equation (3) is a value expressed by Equation (4).

<2> The composite material molded article described in <1>, in which the distance $D_2$ is 2 to 10 mm.

<3> The composite material molded article described in <1> or <2>, in which a slope a of a linear function expressed by Equation (AB) is negative.

$$y = ax + b \quad (AB)$$

Equation (AB) is a linear function obtained by measuring the fiber orientation degree f at two or more positions separated from one point on the corner A along the width direction within the region A, creating a graph by plotting a distance between one point on the corner A and the positions on an x axis and plotting the fiber orientation degree f on a y axis, and performing linear approximation by a least square method.

<4> The composite material molded article described in any one of <1> to <3>, which is a rectangular parallelepiped.

<5> The composite material molded article described in any one of <1> to <4>, having a first region including a resin merging portion, in which the depth direction of the first region is a direction in which the resin merging portion extends, the width direction of the first region is a direction orthogonal to the depth direction, a width of the first region is twice an average fiber length of the fibers, and an average of the following fiber orientation degree $f_1$ in the first region is 0.19 or more, preferably 0.19 or more and 0.50 or less, and more preferably 0.20 or more and 0.30 or less.

Fiber orientation degree f: in a case where a test piece 1 is obtained by cutting out the first region, the width direction is named 0° direction, and X-ray diffraction is performed to detect an X-ray diffracted at a diffraction angle 2θ of 25.4° when the test piece 1 is rotated around an axis that is a thickness direction of the test piece 1 and passes a center of gravity of the test piece 1, a fiber orientation degree based on the 0° direction that is calculated from the following Equations (5), (6), (7), and (8) is a fiber orientation degree $f_1$.

$$f_1 = 2a - 1 \quad (5)$$

$$a = \frac{\sum_{i=1}^{N} I(\Phi_i)\cos^2\Phi_i}{\sum_{i=1}^{N} I(\Phi_i)} \quad (6)$$

$$\int_0^{360} I(\Phi)d\Phi = \sum_{i=2}^{N}(I(\Phi_i) + I(\Phi_{i-1})) \times d\Phi \times \frac{1}{2} = 10000 \quad (7)$$

$$N = 360/d\Phi \quad (8)$$

In Equation (5), a is a coefficient of orientation expressed by Equation (6); $I(\varphi_i)$ is a luminance obtained in a case where the test piece is rotated $\varphi_i°$ in the X-ray diffraction, and satisfies Equation (7); and N in Equation (7) is a value expressed by Equation (8).

<6> The composite material molded article described in any one of <1> to <5>, in which in the first region a ratio of a tensile elastic modulus Ey in the depth direction to a tensile elastic modulus Ex in the width direction that is expressed as Ey/Ex is 1.5 or more and 6.0 or less and preferably 1.6 or more and 5.0 or less.

<7> The composite material molded article described in any one of <1> to <6>, having a second region 2a and a second region 2b which sandwich the first region in the width direction, in which an average of the fiber orientation degree $f_1$ in the first region is greater than an average of the following fiber orientation degree $t_{2a}$ in the second regions, and the average of the fiber orientation degree $f_1$ in the first region is greater than an average of the following fiber orientation degree $f_{2b}$ in the second region 2b.

Fiber orientation degree $f_{2a}$: in a case where a test piece 2a is obtained by cutting out the second region 2a, the depth direction is named 0° direction, and X-ray diffraction is performed to detect an X-ray diffracted at a diffraction angle 2θ of 25.4° when the test piece 2a is rotated around an axis that extends in a thickness direction of the test piece 2a and passes a center of gravity of the test piece 2a, a fiber orientation degree based on the 0° direction that is calculated from the following Equations (9), (10), (11), and (12) is a fiber orientation degree $f_{2a}$.

$$f_{2a} = 2a - 1 \quad (9)$$

$$a = \frac{\sum_{i=1}^{N} I(\Phi_i)\cos^2\Phi_i}{\sum_{i=1}^{N} I(\Phi_i)} \quad (10)$$

$$\int_0^{360} I(\Phi)d\Phi = \sum_{i=2}^{N}(I(\Phi_i) + I(\Phi_{i-1})) \times d\Phi \times \frac{1}{2} = 10000 \quad (11)$$

$$N = 360/d\Phi \quad (12)$$

In Equation (9), a is a coefficient of orientation expressed by Equation (10); $I(\varphi_i)$ is a luminance obtained in a case where the test piece 2a is rotated $\varphi_i°$ in the X-ray diffraction, and satisfies Equation (11); and N in Equation (11) is a value expressed by Equation (12).

Fiber orientation degree $f_{2b}$: in a case where a test piece 2b is obtained by cutting out the second region 2b, the width direction is named 90° direction, and X-ray diffraction is performed to detect an X-ray diffracted at a diffraction angle 2θ of 25.4° when the test piece 2 is rotated around an axis that extends in a thickness direction of the test piece 2b and passes a center of gravity of the test piece 2b, a fiber orientation degree based on the 0° direction that is calculated from the following Equations (13), (14), (15), and (16) is a fiber orientation degree $f_{2b}$.

$$f_{2b} = 2a - 1 \quad (13)$$

$$a = \frac{\sum_{i=1}^{N} I(\Phi_i)\cos^2\Phi_i}{\sum_{i=1}^{N} I(\Phi_i)} \quad (14)$$

$$\int_0^{360} I(\Phi)d\Phi = \sum_{i=2}^{N} (I(\Phi_i) + I(\Phi_{i-1})) \times d\Phi \times \frac{1}{2} = 10000 \quad (15)$$

$$N = 360/d\Phi \quad (16)$$

In Equation (13), a is a coefficient of orientation expressed by Equation (14); $I(\varphi_i)$ is a luminance obtained in a case where the test piece 2b is rotated $\varphi_i°$ in the X-ray diffraction, and satisfies Equation (15); and N in Equation (15) is a value expressed by Equation (16).

<8> A composite material molded article described in any one of <1> to <7>, which is obtained by molding a molding material containing a resin and fibers, in which in a case where the depth direction of the composite material molded article is named 0° direction, the width direction of the composite material molded article is named 90° direction, a fiber orientation degree $f_w$ based on the 0° direction is measured at each of a plurality points in the 90° direction such that a distribution of the fiber orientation degree in the 90° direction is obtained, and the distribution of the fiber orientation degree is approximated to a normal distribution, a full width at half maximum is 5 mm or more, preferably 5 mm or more and less than 10,000 mm, more preferably 20 mm or more and less than 8,000 mm, even more preferably 40 mm or more and 6,000 mm or less, still more preferably 100 mm or more and 4,000 mm or less, particularly preferably 200 mm or more and 3,000 mm or less, and most preferably 1,000 mm or more and less than 2,000 mm.

Fiber orientation degree $f_w$: in a case where a test piece including the points is cut out from the composite material molded article, the depth direction is named 0° direction, and X-ray diffraction is performed to detect an X-ray diffracted at a diffraction angle 2θ of 25.4° when the test piece is rotated around an axis that extends in a thickness direction of the test piece and passes a center of gravity of the test piece, a fiber orientation degree based on the 0° direction that is calculated from the following Equations (17), (18), (19), and (20) is a fiber orientation degree $f_w$.

$$f_w = 2a - 1 \quad (17)$$

$$a = \frac{\sum_{i=1}^{N} I(\Phi_i)\cos^2\Phi_i}{\sum_{i=1}^{N} I(\Phi_i)} \quad (18)$$

$$\int_0^{360} I(\Phi)d\Phi = \sum_{i=2}^{N} (I(\Phi_i) + I(\Phi_{i-1})) \times d\Phi \times \frac{1}{2} = 10000 \quad (19)$$

$$N = 360/d\Phi \quad (20)$$

In Equation (17), a is a coefficient of orientation expressed by Equation (18); $I(\varphi_i)$ is a luminance obtained in a case where the test piece is rotated $\varphi_i°$ in the X-ray diffraction, and satisfies Equation (19); and N in Equation (19) is a value expressed by Equation (20).

<9> A composite material molded article, which is a molded substance of a molding material containing a resin and fibers, the composite material molded article having a first region including a resin merging portion, in which a depth direction of the first region is a direction in which the resin merging portion extends, a width direction of the first region is a direction orthogonal to the depth direction, a width of the first region is twice an average fiber length of the fibers, and an average of the following fiber orientation degree $f_1$ in the first region is 0.19 or more, preferably 0.19 or more and 0.50 or less, and more preferably 0.20 or more and 0.30 or less.

Fiber orientation degree $f_1$: in a case where a test piece 1 is obtained by cutting out the first region, the depth direction is named 0° direction, and X-ray diffraction is performed to detect an X-ray diffracted at a diffraction angle 2θ of 25.4° when the test piece 1 is rotated around an axis that extends in a thickness direction of the test piece 1 and passes a center of gravity of the test piece 1, a fiber orientation degree based on the 0° direction that is calculated from the following Equations (5), (6), (7), and (8) is a fiber orientation degree $f_1$.

$$f_1 = 2a - 1 \quad (5)$$

$$a = \frac{\sum_{i=1}^{N} I(\Phi_i)\cos^2\Phi_i}{\sum_{i=1}^{N} I(\Phi_i)} \quad (6)$$

$$\int_0^{360} I(\Phi)d\Phi = \sum_{i=2}^{N} (I(\Phi_i) + I(\Phi_{i-1})) \times d\Phi \times \frac{1}{2} = 10000 \quad (7)$$

$$N = 360/d\Phi \quad (8)$$

In Equation (5), a is a coefficient of orientation expressed by Equation (6); $I(\varphi_i)$ is a luminance obtained in a case where the test piece is rotated $\varphi_i°$ in the X-ray diffraction, and satisfies Equation (7); and N in Equation (7) is a value expressed by Equation (g).

<10> The composite material molded article described in <9>, in which in the first region, a ratio of a tensile elastic modulus Ey in the depth direction to a tensile elastic modulus Ex in the width direction that is expressed as Ey/Ex is 1.5 or more and 6.0 or less and preferably 1.6 or more and 5.0 or less.

<1> The composite material molded article described in <9> to <10>, including a second region 2a and a second region 2b which sandwich the first region in the width direction, in which an average of the fiber orientation degree $f_1$ in the first region is greater than an average of the following fiber orientation degree $f_{2a}$ in the second regions, and the average of the fiber orientation degree $f_1$ in the first region is greater than an average of the following fiber orientation degree $f_{2b}$ in the second region 2b.

Fiber orientation degree $f_{2a}$: in a case where a test piece 2a is obtained by cutting out the second region 2a, the depth direction is named 0° direction, and X-ray diffraction is performed to detect an X-ray diffracted at a diffraction angle 2θ of 25.4° when the test piece 2 is rotated around an axis that extends in a thickness direction of the test piece 2a and passes a center of gravity of the test piece 2a, a fiber orientation degree based on the 0° direction that is calculated from the following Equations (9), (10), (11), and (12) is a fiber orientation degree $f_{2a}$.

$$f_{2a} = 2a - 1 \tag{9}$$

$$a = \frac{\sum_{i=1}^{N} I(\Phi_i)\cos^2\Phi_i}{\sum_{i=1}^{N} I(\Phi_i)} \tag{10}$$

$$\int_0^{360} I(\Phi)d\Phi = \sum_{i=2}^{N} (I(\Phi_i) + I(\Phi_{i-1})) \times d\Phi \times \frac{1}{2} = 10000 \tag{11}$$

$$N = 360/d\Phi \tag{12}$$

In Equation (9), a is a coefficient of orientation expressed by Equation (10); $I(\varphi_i)$ is a luminance obtained in a case where the molded substance is rotated $\varphi_i°$ in the X-ray diffraction, and satisfies Equation (11); and N in Equation (11) is a value expressed by Equation (12).

Fiber orientation degree $f_{2v}$: in a case where a test piece 2b is obtained by cutting out the second region 2b, the depth direction is named 0° direction, and X-ray diffraction is performed to detect an X-ray diffracted at a diffraction angle 2θ of 25.4° when the test piece 2 is rotated around an axis that extends in a thickness direction of the test piece 2b and passes a center of gravity of the test piece 2b, a fiber orientation degree based on the 0° direction that is calculated from the following Equations (13), (14), (15), and (16) is a fiber orientation degree $f_{2b}$.

$$f_{2b} = 2a - 1 \tag{13}$$

$$a = \frac{\sum_{i=1}^{N} I(\Phi_i)\cos^2\Phi_i}{\sum_{i=1}^{N} I(\Phi_i)} \tag{14}$$

$$\int_0^{360} I(\Phi)d\Phi = \sum_{i=2}^{N} (I(\Phi_i) + I(\Phi_{i-1})) \times d\Phi \times \frac{1}{2} = 10000 \tag{15}$$

$$N = 360/d\Phi \tag{16}$$

In Equation (13), a is a coefficient of orientation expressed by Equation (14); $I(\varphi_i)$ is a luminance obtained in a case where the test piece 2b is rotated $\varphi_i°$ in the X-ray diffraction, and satisfies Equation (15); and N in Equation (15) is a value expressed by Equation (16).

<12> A composite material molded article obtained by molding a molding material containing a resin and fibers,
in which in a case where a depth direction of the composite material molded article is named 0° direction, a width direction of the composite material molded article is named 90° direction, a fiber orientation degree $f_w$ based on the 0° direction is measured at each of a plurality points in the 90° direction such that a distribution of the fiber orientation degree in the 90° direction is obtained, and the distribution of the fiber orientation degree is approximated to a normal distribution, a full width at half maximum is 5 mm or more, preferably 5 mm or more and less than 10,000 mm, more preferably 20 mm or more and less than 8,000 mm, even more preferably 40 mm or more and 6,000 mm or less, still more preferably 100 mm or more and 4,000 mm or less, particularly preferably 200 mm or more and 3,000 mm or less, and most preferably 1,000 mm or more and less than 2,000 mm.

Fiber orientation degree $f_w$: in a case where a test piece including the points is cut out from the composite material molded article, the depth direction is named 0° direction, and X-ray diffraction is performed to detect an X-ray diffracted at a diffraction angle 2θ of 25.4° when the test piece is rotated around an axis that extends in a thickness direction of the test piece and passes a center of gravity of the test piece, a fiber orientation degree based on the 0° direction that is calculated from the following Equations (17), (18), (19), and (20) is a fiber orientation degree $f_w$.

$$f_w = 2a - 1 \tag{17}$$

$$a = \frac{\sum_{i=1}^{N} I(\Phi_i)\cos^2\Phi_i}{\sum_{i=1}^{N} I(\Phi_i)} \tag{18}$$

$$\int_0^{360} I(\Phi)d\Phi = \sum_{i=2}^{N} (I(\Phi_i) + I(\Phi_{i-1})) \times d\Phi \times \frac{1}{2} = 10000 \tag{19}$$

$$N = 360/d\Phi \tag{20}$$

In Equation (17), a is a coefficient of orientation expressed by Equation (18); $I(\varphi_i)$ is a luminance obtained in a case where the molded substance is rotated $\varphi_i°$ in the X-ray diffraction, and satisfies Equation (19); and N in Equation (19) is a value expressed by Equation (20).

<13> The composite material molded article described in <12>, in which a weld line is within a surface of the molded article, and the 0° direction is a direction in which the weld line extends.

<14> The composite material molded article described in any one of <1> to <13>, which is a cured product of a sheet molding compound.

<15> The composite material molded article described in any one of <1> to <14>, wherein the fiber are carbon fibers.

<16> The composite material molded article described in any one of <1> to <15>, in which an amount of the fibers is 20% by mass or more and 65% by mass or less with respect to a total mass of the composite material molded article.

<17> A method for manufacturing a composite material molded article, including charging a molding die with a molding material containing a resin and fibers such that a ratio R of the following fiber flow length to an average fiber length of the molding material falls into a range of 0.2 to 15.0, preferably falls into a range of 0.3 to 12.0, more preferably falls into a range of 0.5 to 10.0, even more preferably falls into a range of 0.8 to 9.0, and particularly preferably falls into a range of 1.0 to 8.0, and performing heat press molding on the molding material.

Fiber flow length: in a case where P0 represents a position of fibers at an end portion of a molding material just charged into the molding die, P1 represents a position that the fibers reach after moving to an edge or a resin merging portion of the molding die from P0, L0-1 represents a distance between P0 and P1, P2 represents a position that the fibers reach after further moving along the edge or the resin merging portion of the molding die from the position P1 until the molding ends, and L1-2 represents a distance between P1 and P2, L0-1 plus L1-2 equals to a fiber flow length.

<18> A method for manufacturing a composite material molded article, including charging a molding die with a molding material containing a resin and fibers such that a ratio r of the following moving distance to an average fiber length of the molding material falls into a range of 0.2 to 12.0, preferably falls into a range of 0.4 to 10.0, more preferably falls into a range of 0.8 to 8.0, even more preferably falls into a range of 1.0 to 6.0, and particularly preferably falls into a range of 1.2 to 4.0, and performing heat press molding on the molding material.

Moving distance: the distance L1-2 between the position P1 and the position P2.

<19> A method for manufacturing a composite material molded article, including arranging a molding material containing a resin and fibers in a molding die such that the following charge rate becomes 10 to 80% by area, preferably becomes 10 to 70% by area, more preferably becomes 10 to 60% by area, even more preferably becomes 10 to 50% by area, particularly preferably becomes 15 to 40% by area, and most preferably becomes 20 to 35% by area, and performing heat press molding on the molding material.

Charge rate: a ratio of a surface area of the molding material to a surface area of the molding die.

<20> The method for manufacturing a composite material molded article described in <19>, in which the molding die is rectangular in plan view, and the molding material is disposed at a plurality of positions Pm on the molding die.

<21> The method for manufacturing a composite material molded article described in <19> or <20>, in which at least one of the positions Pm is a region including one corner of the molding die, and at least another one of the positions Pm is a region including another corner of the molding die positioned in a width direction.

<22> A method for manufacturing a composite material molded article which is a molded substance of a molding material containing a resin and fibers, the method including arranging a plurality of base materials containing the molding material in a molding die, and performing compression molding on the plurality of base materials such that a resin merging portion is formed by the fusion of a plurality of flowing fluids of the base materials, in which the base materials flow along a direction in which the resin merging portion extends, a depth direction of a first region including the resin merging portion of the molded substance is a direction in which the resin merging portion extends, a width direction of the first region is a direction orthogonal to the depth direction, a width of the first region is twice an average fiber length of the fibers, and an average of the following fiber orientation degree $f_1$ in the first region is 0.19 or more.

Fiber orientation degree $f_1$: in a case where a test piece 1 is obtained by cutting out the first region, the width direction is named 0° direction, and X-ray diffraction is performed to detect an X-ray diffracted at a diffraction angle 2θ of 25.4° when the test piece 1 is rotated around an axis that extends in a thickness direction of the test piece 1 and passes a center of gravity of the test piece 1, a fiber orientation degree based on the 0° direction that is calculated from the following Equations (5), (6), (7), and (8) is a fiber orientation degree $f_1$.

$$f_1 = 2a - 1 \quad (5)$$

$$a = \frac{\sum_{i=1}^{N} I(\Phi_i)\cos^2\Phi_i}{\sum_{i=1}^{N} I(\Phi_i)} \quad (6)$$

$$\int_0^{360} I(\Phi)d\Phi = \sum_{i=2}^{N} (I(\Phi_i) + I(\Phi_{i-1})) \times d\Phi \times \frac{1}{2} = 10000 \quad (7)$$

$$N = 360/d\Phi \quad (8)$$

In Equation (5), a is a coefficient of orientation expressed by Equation (6); $I(\varphi_i)$ is a luminance obtained in a case where the test piece is rotated $\varphi_i°$ in the X-ray diffraction, and satisfies Equation (7); and N in Equation (7) is a value expressed by Equation (8).

<23> The method for manufacturing a composite material molded article described in any one of <17> to <22>, in which the molding material is a sheet molding compound.

Advantageous Effects of Invention

According to the present invention, it is possible to provide a composite material molded article which has excellent mechanical properties and in which the occurrence of warpage in a specific portion is inhibited, and a method for manufacturing the same.

DESCRIPTION OF EMBODIMENTS

Hereinafter, a composite material molded article and a method for manufacturing the same according to the present invention will be specifically described by illustrating embodiments by using drawings. For convenience of explanation, the dimensional ratios in FIGS. 1, 2A, 2B, 3 to 9, 11, and 12 are different from actual dimensional ratios.

Figure 1:
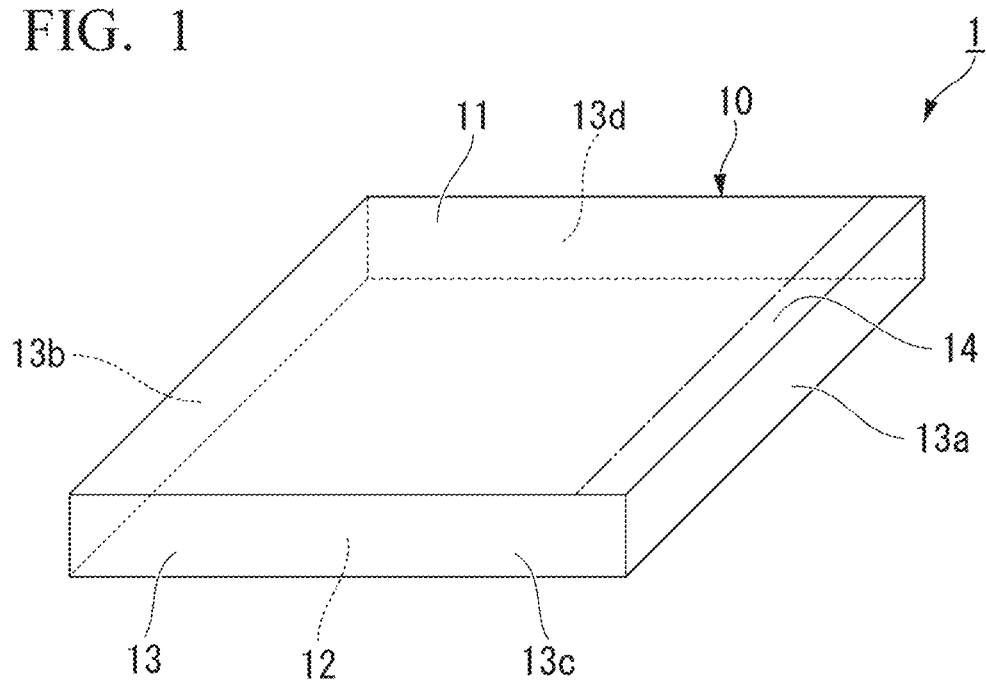
FIG. 1 is a perspective view of a composite material molded article according to an embodiment.
Figure 2A:
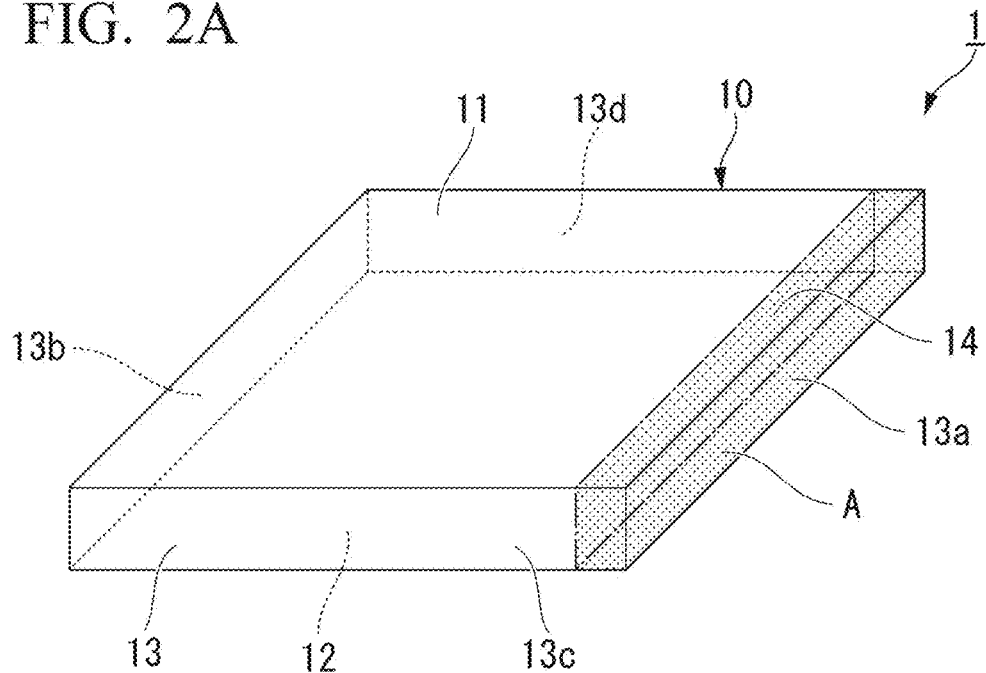
FIG. 2A is a perspective view of the composite material molded article according to the embodiment.
Figure 2B:
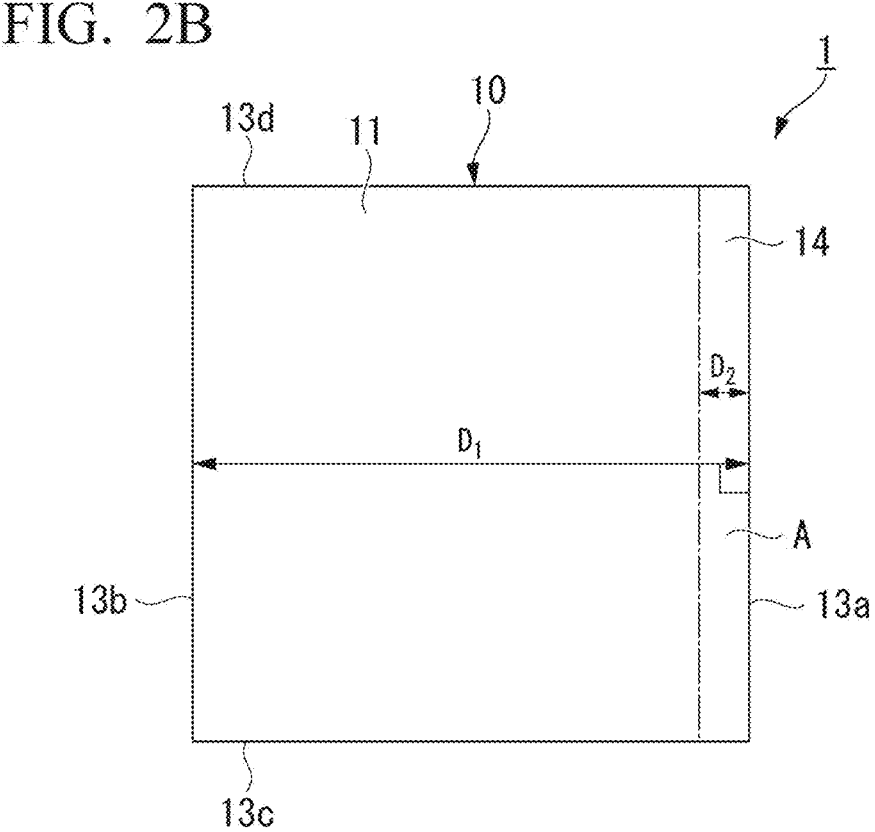
FIG. 2B is a plan view of the composite material molded article according to the embodiment.

FIG. 1 is a perspective view of a composite material molded article 1 according to a first embodiment of the present invention FIG. 2A is a perspective view of the composite material molded article 1, and FIG. 2B is a plan view of the composite material molded article 1.

The composite material molded article 1 includes a molded product 10 of SMC as a molding material containing a resin and fibers. SMC will be specifically described later.

As shown in FIG. 1, the molded product 10 is in the form of a flat rectangular plate in plan view, and has two main surfaces 11 and 12 facing each other and a lateral face 13 that connects the edges of the main surfaces 11 and 12. The lateral face 13 has two planar portions 13a and 13b facing each other and two planar portions 13c and 13d that connect both ends of the planar portions 13a and 13b.

As shown in FIG. 2A, the molded product 10 has a region A in a first end portion 14 including the planar portion 13a.

In a case where a distance $D_1$ between one point at each of edge portions within a surface of the first end portion 14 (a portion where the planar portion 13a as the lateral face 13 of the first end portion 14 intersects with the main surface 11 and a portion where the planar portion 13a intersects with the main surface 12) and edges of the other end portion (a portion where the main surface 11 intersects with the planar portion 13b as the lateral face 13 of an end portion opposite to the first end portion 14 in a vertical direction perpendicular to a tangent of the lateral face 13 (planar portion 13a) in the first end portion 14 and a portion where the planar portion 13b intersects with the main surface 12) is measured along the vertical direction within a surface of the molded product 10, a region surrounded with the edges of the molded product 10 and a line connecting points separated from the aforementioned one point by a distance equivalent to 3.0% of the distance $D_1$ along the edge of the first end portion 14 (edge of the planar portion 13a) of the molded product 10 is the region A in FIG. 2A. That is, the region A is a region that extends from a position separated from the planar portion 13a by a distance $D_2$ equivalent to 3.0% of the distance $D_1$ (position indicated by a dashed line in FIGS. 2A and 2B) to the planar portion 13a in a direction perpendicular to the planar portion 13a. For example, in a case where the distance $D_1$ is 60 to 400 mm, the distance $D_2$ is 1.8 to 12.0 mm. In a case where the distance $D_1$ is 67 to 333 mm, the distance $D_2$ is preferably 2 to 10 mm.

Hereinafter, the direction perpendicular to the planar portion 13a (the direction from the planar portion 13a to the planar portion 13b, the transverse direction in FIGS. 2A and 28) will be referred to as first direction, and the direction orthogonal to the first direction (the direction from the planar portion 13c to the planar portion 13d, the longitudinal direction in FIGS. 2A and 2B) will be referred to as second direction. The first direction and the second direction are orthogonal to the thickness direction of the molded product 10.

In a case where the composite material molded article of the present invention has a complicated shape having a rib, a region surrounded with the edges of the molded product and a line connecting points 2 mm distant from the one point of each of the edges of the surface of the first end portion of the molded product in the direction perpendicular to the lateral faces of the first end portion along the edges of the first end portion of the molded product can be regarded as the region A.

In the region A, the average of the following fiber orientation degree f is 0.10 or more and 1 or less.

Fiber orientation degree f: in a case where the first direction is named 90° direction, the second direction is named 0° direction, and an X-ray diffracted at a diffraction angle 2θ of 25.4° is detected by X-ray diffraction, a fiber orientation degree based on the 0° direction that is calculated from the following Equations (1), (2), and (3) is a fiber orientation degree f.

$$f = 2a - 1 \tag{1}$$

$$a = \frac{\sum_{i=1}^{N} I(\Phi_i)\cos^2\Phi_i}{\sum_{i=1}^{N} I(\Phi_i)} \tag{2}$$

$$\int_0^{360} I(\Phi)d\Phi = \sum_{i=2}^{N} (I(\Phi_i) + I(\Phi_{i-1})) \times d\Phi \times \frac{1}{2} = 10000 \tag{3}$$

In Equation (1), a is a coefficient of orientation expressed by Equation (2). $I(\varphi_i)$ is a luminance (diffraction intensity) at an i-th rotation angle $(\varphi_i)$ in the X-ray diffraction, and is normalized such that an integrated intensity expressed by Equation (3) becomes 10,000. Furthermore, N in Equation (3) is the number of measurement points. The number of measurement points is a value obtained by dividing 360 (°) by a step size (°) that is an angle by which a molded product as a measurement target is rotated whenever the X-ray diffraction is measured. dφ in the same equation represents a micro-region of the rotation angle around the molded product as a measurement target. Herein, dφ equals a value of the step size. That is, N is expressed by the following Equation (4).

$$N=360/d\varphi \tag{4}$$

The fiber orientation degree f is a value determined from a diffraction image (Debye ring) formed as a result of irradiating a fiber-reinforced resin material with X-rays as described in Patent Literature 3. Specifically, the fiber orientation degree f is measured by the following method.

From the first end portion 14 of the molded product 10, a test piece having a size of about 1 cm (length)×1 cm (width) including the planar portion 13a is cut out. Then, while the region A of the test piece is being irradiated with X-rays from an X-ray device by a transmission method, the test piece is rotated around an axis that is the thickness direction of the test piece, a diffracted X-ray is captured using a detector disposed at a diffraction angle 2θ=25.4°, and a luminance ($I(\varphi_i)$) at an i-th rotation angle $(\varphi_i)$ is measured. $I(\varphi_i)$ is normalized such that the integrated intensity expressed by Equation (3) becomes 10,000. The conditions for capturing the diffracted X-ray are as described in Examples which will be described later. Then, by using the measured $I(\varphi_i)$, a coefficient a of orientation is calculated from Equation (2). Furthermore, by using the obtained coefficient a of orientation, the fiber orientation degree f is calculated from Equation (1).

The test piece is cut out at a position in the vicinity of the center of the first end portion 14 in the second direction (for example, a position separated from each of the planar portions 13c and 13d in the second direction by a distance 10% or more of the length of the molded product 10).

Generally, a cured product of conventional SMC is considered to have poor mechanical characteristics. The average of the fiber orientation degree f of the cured product of conventional SMC is 0 or more and less than 0.10.

In a case where the average of the fiber orientation degree f of the region A is 0.10 or more, the reinforcing fibers are anisotropically oriented. Therefore, the mechanical properties of the molded product are better than those of the cured product of conventional SMC.

The average of the fiber orientation degree f of each portion of the region A is preferably 0.10 or more, more preferably 0.12 or more, even more preferably 0.15 or more, and particularly preferably 0.20 or more. The upper limit of the fiber orientation degree f is 1 that is obtained in a case where all fibers are oriented in the 0° direction.

The higher the fiber orientation degree f, the better the mechanical characteristics of the composite material molded article. However, it is difficult to manufacture a composite material molded article having a high fiber orientation degree f, and the productivity is poor.

The average of the fiber orientation degree f of each portion of the region A is preferably 0.80 or less, more preferably 0.70 or less, even more preferably 0.60 or less, and particularly preferably 0.50 or less.

Therefore, the average of the fiber orientation degree f of the region A is preferably 0.10 or more and 0.80 or less, more preferably 0.12 or more and 0.70 or less, even more preferably 0.15 or more and 0.60 or less, and particularly preferably 0.20 or more and 0.50 or less. In a case where the fiber orientation degree f is within the above range, the mechanical characteristics and productivity of the composite material molded article are excellent.

The fiber orientation degree f is an average in the region A. It is preferable that the fiber orientation degree f in each portion of the region A is within the above range.

The fiber orientation degree f of the region A can be adjusted by the charge rate, pressure, and the like in the manufacturing method which will be described later. The lower the charge rate is, the longer the flow distance of reinforcing fibers in the mold tends to be during molding, and the higher the fiber orientation degree f in the region A tends to be.

In end portions of the molded product 10 other than the first end portion 14, regions corresponding to the region A may have a fiber orientation degree f 0.10 or more and 1.0 or less or a fiber orientation degree f less than 0.10.

The following function relating to the region A preferably has a negative slope.

Function: a linear function obtained by measuring the fiber orientation degree f for two points at both end portions of a straight line extending in the vertical direction (first direction) in the region A and for two or more points closer to the inside than the two points, plotting a distance (mm) between each of the points and the lateral faces of the first end portion on an x axis, plotting the fiber orientation degree f on a y axis, and performing linear approximation by a least square method.

"Both end portions" are regions extending 1.0 mm or less from both ends (the position of the planar portion 13a and a position separated from the planar portion 13a by the distance $D_2$) of the region A.

The function is expressed as y=ax+b, a represents a slope of the linear function, and b represents an intercept of the linear function (the value of y obtained in a case where x=0).

Specifically, the slope a of the function is determined by the following procedure.

For the obtained measurement points, approximation is carried out by the linear function y=ax+b, and coefficients a and b are determined which minimize the sum of squares of a difference between y as an actually measured fiber orientation degree in each measurement point and y(x) as a fiber orientation degree obtained from the function obtained by approximation, expressed as $\Sigma(y-y(x))^2$. In this way, the slope a is calculated.

The negative slope a of the function shows that the fiber orientation degree f is increases toward the planar portion 13a in the region A. In a case where the slope a of the function is negative, the mechanical characteristics of the composite material molded article are further improved.

The slope a of the function is preferably −0.040 or more and less than 0, and more preferably −0.020 or more and less than −0.010. In a case where the slope a of the function is within the above range, the mechanical strength is further improved.

The fiber orientation degree f of the region A can be adjusted by the conditions, such as a charge rate, a fiber flow length, and pressure, in the manufacturing method which will be described later. The lower the charge rate is, the longer the flow distance of reinforcing fibers in the mold tends to be during molding, and the higher the fiber orientation degree f in the region A tends to be.

In end portions of the molded product 10 other than the first end portion 14, a region corresponding to the region A may have the function described above that has a negative or positive slope.

(Molding Material)

The molding material contains a resin and fibers. Specifically, the molding material contains a matrix resin as a resin and short reinforcing fibers as fibers.

A thermoplastic resin or a thermosetting resin can be used as the matrix resin.

The thermoplastic resin is shaped by cooling and solidification without a chemical reaction, and thus can be molded within a short period of time. Therefore, the productivity is excellent. As such a thermoplastic resin, for example, it is possible to use a polyetheretherketone resin, a polyetherimide resin, polyamide (such as nylon 6 or nylon 66), polyolefin (such as polyethylene or polypropylene), modified polyolefin, polyester (such as polyethylene terephthalate or polybutylene terephthalate), polycarbonate, polyamideimide, polyphenylene oxide, a polysulfone, polyether sulfone, polystyrene, ABS, polyphenylene sulfide, liquid crystal polyester, and an acrylonitrile-styrene copolymer. Moreover, a mixture of these may also be used. Furthermore, a copolymerized substance such as nylon 6-nylon 66 copolymer nylon may also be used. Among these, the polypropylene resin can be preferably used.

Examples of the thermosetting resin include an epoxy resin, a phenol resin, an unsaturated polyester resin, a vinyl ester resin, a phenoxy resin, an alkyd resin, a urethane resin, a urea resin, a melamine resin, a maleimide resin, a cyanate resin, and the like. Among these, the epoxy resin, the unsaturated polyester resin, and the vinyl ester resin can be preferably used. In a case where these resins are used, the resins excellently flow during molding. As a result, the fiber orientation degree or tensile elastic modulus of the molded product can be controlled.

In addition, a flame retardant, a weatherproofness improver, other antioxidants, a heat stabilizer, an ultraviolet absorber, a plasticizer, a lubricant, a colorant, a compatibilizer, a conductive filler, and the like can be added to the molding material according to the characteristics required to the molded product.

One or more kinds of the above resins can be appropriately selected and used. In the present invention, a molding material is suitable which contains a thermosetting resin as a matrix resin and a sheet molding compound (SMC) containing short reinforcing fibers as fibers.

SMC is a sheet-like uncured composite material. Typically, SMC is obtained by impregnating a sheet-like fiber tow group formed of a plurality of fiber tows with a matrix resin composition containing a thermosetting resin.

A fiber tow is a bundle of a plurality of short reinforcing fibers.

The fibers used in the molding material are not particularly limited, and for example, inorganic fibers, organic fibers, metal fibers, or hybrid reinforcing fibers obtained by combining these can be used.

Examples of the inorganic fiber include carbon fiber, graphite fiber, silicon carbide fiber, alumina fiber, tungsten carbide fiber, boron fiber, glass fiber, and the like. Examples of the organic fibers include aramid fibers, high-density polyethylene fibers, other general nylon fibers, polyester fibers, and the like. Examples of the metal fibers include fibers of stainless steel, iron, and the like. The metal fibers may also be carbon fibers coated with a metal. Considering the mechanical properties of the composite material molded article such as strength, the carbon fibers are preferable among the above.

One kind of each of the above fibers may be used singly, or two or more kinds of the above fibers may be used in combination.

The average fiber length of the fibers is preferably 5 to 100 mm, more preferably 10 to 75 mm, and even more preferably 20 to 60 mm. In a case where the average fiber length is equal to or greater than the lower limit described above, the mechanical properties of the composite material molded article such as tensile strength and elastic modulus are further improved. In a case where the average fiber length is equal to or smaller than the upper limit described above, the material constituting the molding material such as SMC more easily flows during molding, which facilitates molding.

The average fiber length is measured by the following method.

That is, fiber lengths of 100 fiber strands randomly sampled are measured to the unit of 1 mm by using calipers or the like, and the average thereof is calculated.

The number of fiber strands forming each fiber tow is preferably 1,000 to 60,000, more preferably 1,000 to 24,000, and even more preferably 1,000 to 15,000. In a case where the number of fiber strands forming each fiber tow is equal to or greater than the lower limit described above, the mechanical properties of the composite material molded article such as tensile strength and elastic modulus are further improved. In a case where the number of fiber strands forming each fiber tow is equal to or smaller than the upper limit described above, the material constituting the molding material such as SMC more easily flows during molding, which facilitates molding.

The average thickness of the fiber tows is preferably 0.01 to 0.1 mm, more preferably 0.02 to 0.09 mm, and even more preferably 0.025 to 0.07 mm. In a case where the average thickness of the fiber tows is equal to or greater than the lower limit described above, it is easy to impregnate the fiber tows with a matrix resin composition. In a case where the average thickness of the fiber tows is equal to or smaller than the upper limit described above, the mechanical properties of the composite material molded article such as tensile strength and elastic modulus are further improved.

The average thickness of the fiber tows in the composite material molded article can be measured by the following method.

The composite material molded article is heated using an electric furnace or the like such that the matrix resin (molded product of the matrix resin composition) is decomposed, and ten fiber tows are randomly selected from the residual fiber tows. For each of the ten fiber tows, the thickness of the fiber tow is measured at both end portions in the fiber axis direction and at three sites in the central portion by using calipers, and the average of all of the measured thicknesses is calculated to obtain the average thickness.

The average width of the fiber tows is preferably 2 to 50 mm, more preferably 3 to 15 mm, and even more preferably 3 to 8 mm. In a case where the average width of the fiber tows is equal to or greater than the lower limit described above, the material constituting the molding material such as SMC more easily flows during molding, which facilitates molding. In a case where the average width of the fiber tows is equal to or smaller than the upper limit described above, the mechanical properties of the composite material molded article such as tensile strength and elastic modulus am further improved.

The average width of the fiber tows is measured by the following method.

For each of the ten fiber tows obtained in the same manner as that adopted for measuring the average thickness, the width of the fiber tow is measured at both end portions in the fiber axis direction and at three sites in the central portion by using calipers, and the average of all of the measured widths is calculated to obtain the average width.

The matrix resin composition in SMC contains a thermosetting resin.

The thermosetting resin is not particularly limited, and examples thereof include an epoxy resin, a phenol resin, an unsaturated polyester resin, a vinyl ester resin, a phenoxy resin, an alkyd resin, a urethane resin, a urea resin, a melamine resin, a maleimide resin, a cyanate resin, and the like. One kind of thermosetting resin may be used singly, or two or more kinds of thermosetting resins may be used in combination.

The matrix resin composition in SMC may optionally further contain components other than the thermosetting resin.

Examples of components other than the thermosetting resin include a filler such as calcium carbonate, a shrinkage reducing agent, a mold release agent, a curing initiator, a thickener, and the like.

In the matrix resin composition, the content of components other than the thermosetting resin is, for example, 0 to 150 parts by mass with respect to 100 parts by mass of the thermosetting resin.

For the molding material, in a case where a direction corresponding to the first direction of the molded product 10 is named 90° direction, a direction corresponding to the second direction is named 0° direction, an X-ray diffracted at a diffraction angle 2θ of 25.4° is detected by X-ray diffraction, and a fiber orientation degree $f_a$ based on the 0° direction is calculated by the above Equations (1'), (2'), (3'), and (4'), it is preferable that the sum of the average of $f_a$ and the standard deviation of $f_a$ is 0.05 to 0.13.

$$f = 2a - 1 \quad (1')$$

$$a = \frac{\sum_{i=1}^{N} I(\Phi_i)\cos^2\Phi_i}{\sum_{i=1}^{N} I(\Phi_i)} \quad (2')$$

$$\int_0^{360} I(\Phi)d\Phi = \sum_{i=2}^{N} (I(\Phi_i) + I(\Phi_{i-1})) \times d\Phi \times \frac{1}{2} = 10000 \quad (3')$$

$$N = 360/d\Phi \quad (4')$$

For example, in a case where SMC is used as a molding material, the fiber orientation degree $f_a$ is measured by the following method.

From a 300 mm (length)×300 mm (width) range in SMC, 25 test pieces each having a size of 15 mm (length)×15 mm (width) are cut out at equal intervals (N=25). While each of the test pieces is being irradiated with X-rays from an X-ray device by a transmission method, the test piece is rotated around an axis that is the thickness direction of the test piece, a diffracted X-ray is captured using a detector disposed at a diffraction angle 2θ=25.4°, and a luminance (I($\varphi_i$)) at an i-th rotation angle ($\varphi_i$) is measured. I($\varphi_i$) is normalized such that the integrated intensity expressed by Equation (3) becomes 10,000. Then, by using the measured I($\varphi_i$), a coefficient a of orientation is calculated for each of the 25 test pieces by Equation (2). Furthermore, by using the obtained coefficient a of orientation, the fiber orientation degree $f_a$ is calculated for each of the 25 test pieces by Equation (1), and the average and standard deviation of $f_a$ are calculated.

In a case where the sum of the average and standard deviation of the fiber orientation degree $f_a$ is 0.05 or mom, it is possible to inhibit molding properties from deteriorating due to the deterioration of fluidity of the resin in the process of molding SMC, without causing the fiber tows to be excessively uniformity oriented. Furthermore, it is not necessary to excessively reduce the speed of the SMC production line, and hence sufficient productivity can be ensured.

The sum of the average and standard deviation of the fiber orientation degree $f_a$ is preferably 0.06 or more, and more preferably 0.08 or more.

In a case where the sum of the average and standard deviation of the fiber orientation degree $f_a$ is 0.13 or less, it is possible to inhibit the physical properties (values of CV) of the composite material molded article obtained by molding SMC from greatly varying among the respective sites in the first direction and the second direction.

The sum of the average and standard deviation of the fiber orientation degree $f_a$ of the fiber tows is preferably 0.12 or less, and more preferably 0.11 or less.

(Method for Manufacturing Composite Material Molded Article)

The composite material molded article of the present invention can be manufactured, for example, by charging a molding die with a molding material such as SMC containing a resin and fibers such that a ratio R of the following fiber flow length to an average fiber length of the fibers falls into a range of 0.2 to 15.0 and performing heat press molding on the molding material.

The fiber flow length is a distance that the fibers of the molding material charged into the molding die move to reach a predetermined site at an edge or a resin merging portion of the molded article by heat press molding. The fiber flow length mentioned herein equals to a shortest distance between the edge of the molding material charged into the molding die and the edge of the molding die plus a distance that the fibers move along the edge of the molding die during molding so as to reach the aforementioned predetermined site.

Figure 33A:
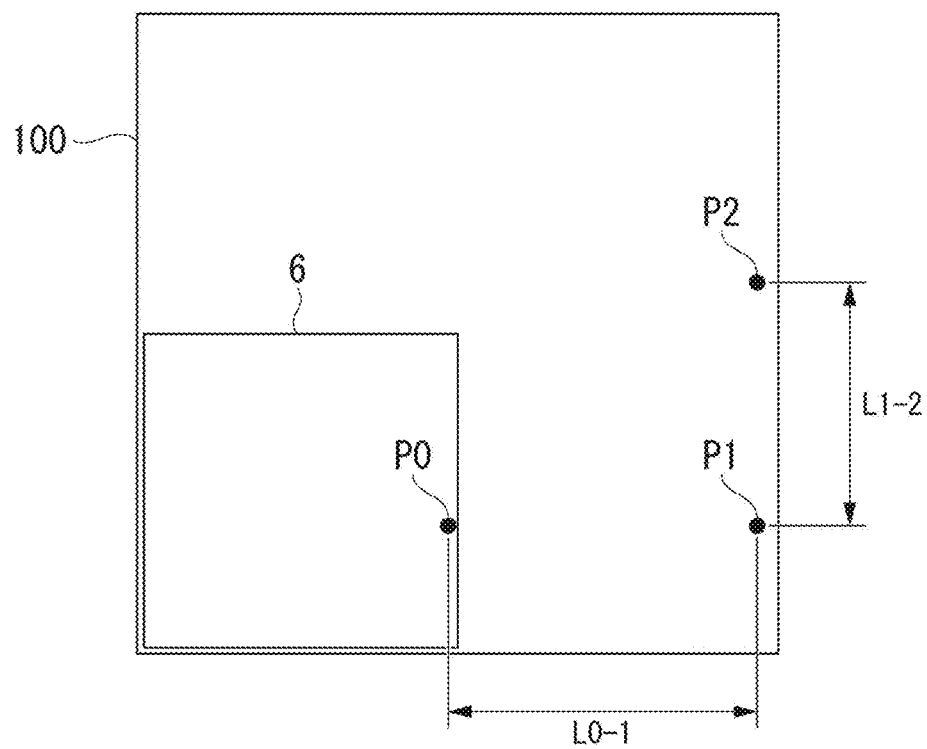
FIG. 33A is a view for illustrating an example of a fiber flow length at the edges of a molding die.

FIG. 33A is a schematic view for illustrating the fiber flow length. In FIG. 33A, a molding material is disposed at one site on the molding die. In FIG. 33A, in a case where P0 represents a position of fibers in a molding material just charged into a corner of a molding die, P1 represents a position that the fibers reach after moving to an edge of the molding die from P0, L0-1 represents a distance between P0 and P1, P2 represents a position that the fibers reach after further moving along the edge of the molding die from the position P1 until the molding ends, and L-2 represents a distance between P1 and P2, L0-1 plus L1-2 equals the fiber flow length.

Figure 33B:
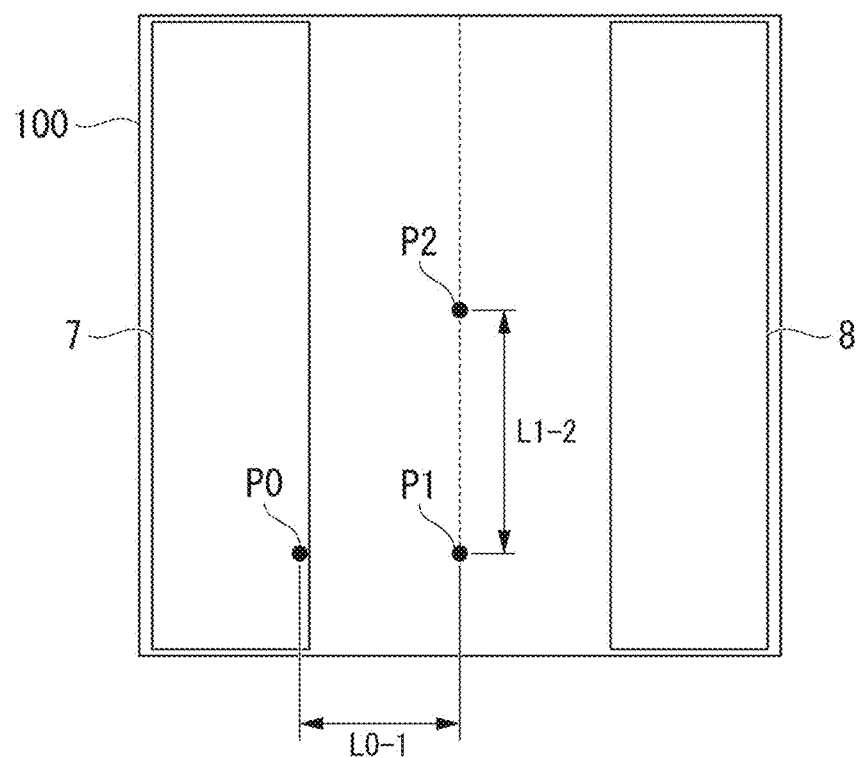
FIG. 33B is a view for illustrating an example of a fiber flow length in a resin merging portion.

FIG. 33B is a schematic view for illustrating the fiber flow length. In FIG. 33B, molding materials are arranged at two sites on a molding die. In FIG. 33B, in a case where P0 represents a position of fibers in a molding material just charged into a corner of a molding die, P1 represents a position that the fibers reach after moving to a resin merging portion from P0, L0-1 represents a distance between P0 and P1, P2 represents a position that the fibers reach after further moving along the resin merging portion from the position P1 until the molding ends, and L1-2 represents a distance between P1 and P2, L0-1 plus L1-2 equals the fiber flow length.

The positions that are the centers of the fibers in a case where the fibers contained in the molding material charged into the molding die are seen in plan view are regarded as fiber positions P0, P1, and P2.

In other words, in a case where P0 represents a position of fibers at an end portion of a molding material just charged into the molding die, P1 represents a position that the fibers reach after moving to an edge or a resin merging portion of the molding die from P0, L0-1 represents a distance between P0 and P1, P2 represents a position that the fibers reach after further moving along the edge or the resin merging portion of the molding die from the position P1 until the molding ends, and L1-2 represents a distance between P1 and P2, L0-1 plus L1-2 equals the fiber flow length.

The fiber flow length can be determined by preliminary test molding or resin flow simulation.

In a case where R is 0.2 or more, the fiber orientation degree f in the region A can be sufficiently increased, and hence the mechanical characteristics of the composite material molded article tend to be improved. R is preferably 0.3 or more, more preferably 0.5 or more, even more preferably 0.8 or more, and particularly preferably 1.0 or more.

On the other hand, in a case where R is 15.0 or less, it is possible to reduce the variation in the distribution of fibers in the composite material molded article in the region A, and hence the occurrence of a defective portion tends to be suppressed. R is preferably 12.0 or less, more preferably 10.0 or less, even more preferably 9.0 or less, and particularly preferably 8.0 or less.

R is preferably 0.3 to 12.0, more preferably 0.5 to 10.0, even more preferably 0.8 to 9.0, and particularly preferably 1.0 to 8.0.

In another aspect, the ratio R is preferably 0.2 to 15.0, more preferably 0.3 to 12.0, even more preferably 0.5 to 10.0, particularly preferably 0.8 to 9.0, and most preferably 1.0 to 8.0.

The composite material molded article of the present invention can be manufactured, for example, by charging a molding die with a molding material such as SMC containing a resin and fibers such that a ratio r of the following moving distance to the average fiber length of the fibers falls into a range of 0.2 to 12.0 and performing heat press molding on the molding material.

The moving distance is the distance L1-2 that the fibers at the end portion of the molding material charged into the molding die move to reach the position P2 from the position P1.

The moving distance L1-2 can be determined by preliminary test molding or resin flow simulation.

The ratio r is preferably 0.2 to 12.0, more preferably 0.4 to 10.0, even more preferably 0.8 to 8.0, particularly preferably 1.0 to 6.0, and most preferably 1.2 to 4.0.

In a case where force is applied to the fibers from the resin flowing during molding, the fibers experience rotation and translation and tend to be oriented in the flow direction during molding. In the present invention, such a tendency is marked in a case where the fibers move along an edge or a resin merging portion of the molding die during molding.

Therefore, it is preferable that the fiber flow length includes the moving distance that the fibers move along an edge of the molding die.

In a case where r represents a ratio of the moving distance to the average fiber length of the fibers, r is preferably within a range of 0.2 to 12.0, r is more preferably 0.4 to 10.0, even more preferably 0.8 to 8.0, particularly preferably 1.0 to 6.0, and most preferably 1.2 to 4.0.

In a case where r is 0.2 or more, it is possible to sufficiently increase the fiber orientation degree f in the region A, and hence the mechanical characteristics of the composite material molded article tend to be improved, r is more preferably 0.4 or more, eve more preferably 0.8 or more, particularly preferably 1.0 or more, and most preferably 1.2 or more.

On the other hand, in a case where r is 12.0 or less, it is possible to reduce the variation in the distribution of fibers in the composite material molded article in the region A, and hence the occurrence of a defective portion tends to be suppressed, r is more preferably 10.0 or less, even more preferably 8.0 or less, particularly more preferably 6.0 or less, and most preferably 4.0 or less.

The composite material molded article 1 or the like can be manufactured, for example, by a method of charging a molding die with a molding material such as SMC such that a charge rate becomes 10 to 80% and performing heat press molding on the molding material.

The charge rate is a ratio of the area of the molding material to the area of the molding die.

In a case where the charge rate is 80% or less, the molding material vigorously flows during molding, and the reinforcing fibers are more uniformly oriented toward the end portions of the molding die. As a result, the fiber orientation degree f in the first end portion 14 of the molded product 10 increases. The charge rate is preferably 70% or less, more preferably 60% or less, even more preferably 50% or less, particularly preferably 40% or less, and most preferably 35% or less.

On the other hand, in a case where the charge rate is 10% or more, it is easy for the molding material to spread over the entirety of the mold during molding. The charge rate is more preferably 15% or more, and even more preferably 20% or more.

The charge rate is preferably 10% to 70%, more preferably 10% to 60%, even more preferably 10% to 50%, particularly preferably 15% to 40%, and most preferably 20% to 35%.

The molding die used has a shape that conforms to the molded product 10.

The shape of the molding die, that is, the shape of the molded product 10 is preferably rectangular (such as a square or rectangle) in plan view. However, the shape of the molding die is not limited thereto and may be any shape.

As SMC that can be used in the present invention, for example, it is possible to use SMC manufactured by an SMC manufacturing method which will be described later. However, the SMC to be used is not limited thereto, and SMC manufactured by another manufacturing method or commercially available SMC may also be used.

The area (size in plan view) of SMC is set according to the charge rate during molding.

Typically, the shape of SMC is the same as the shape of the molding die.

The molding die may be charged with one sheet of SMC or two or more sheets of SMC.

SMC may be disposed in the molding die such that the center of SMC coincides with the center of the molding die, or may be disposed in the molding die such that the center of SMC and the center of the molding die are at different positions. It is preferable to dispose SMC such that the distance between SMC and a surface of the molding die that corresponds to the planar portion 13a is longer than the distance between SMC and a surface of the molding die that corresponds to the planar portion 13b. In a case where SMC is disposed in this way, it is easy to increase the fiber orientation degree f in the region A.

Examples of the molding conditions include conditions under which SMC is heated and pressed at a mold temperature of 140° C. for 3 minutes under a pressure of 8 MPa and conditions equivalent to the above conditions (conditions under which SMC flows and is cured to the same extent as that under the above conditions).

(SMC Manufacturing Method)

The SMC manufacturing method is not particularly limited. For example, it is possible to adopt the method described in PCT International Publication No. WO2016/208731.

Figure 3:
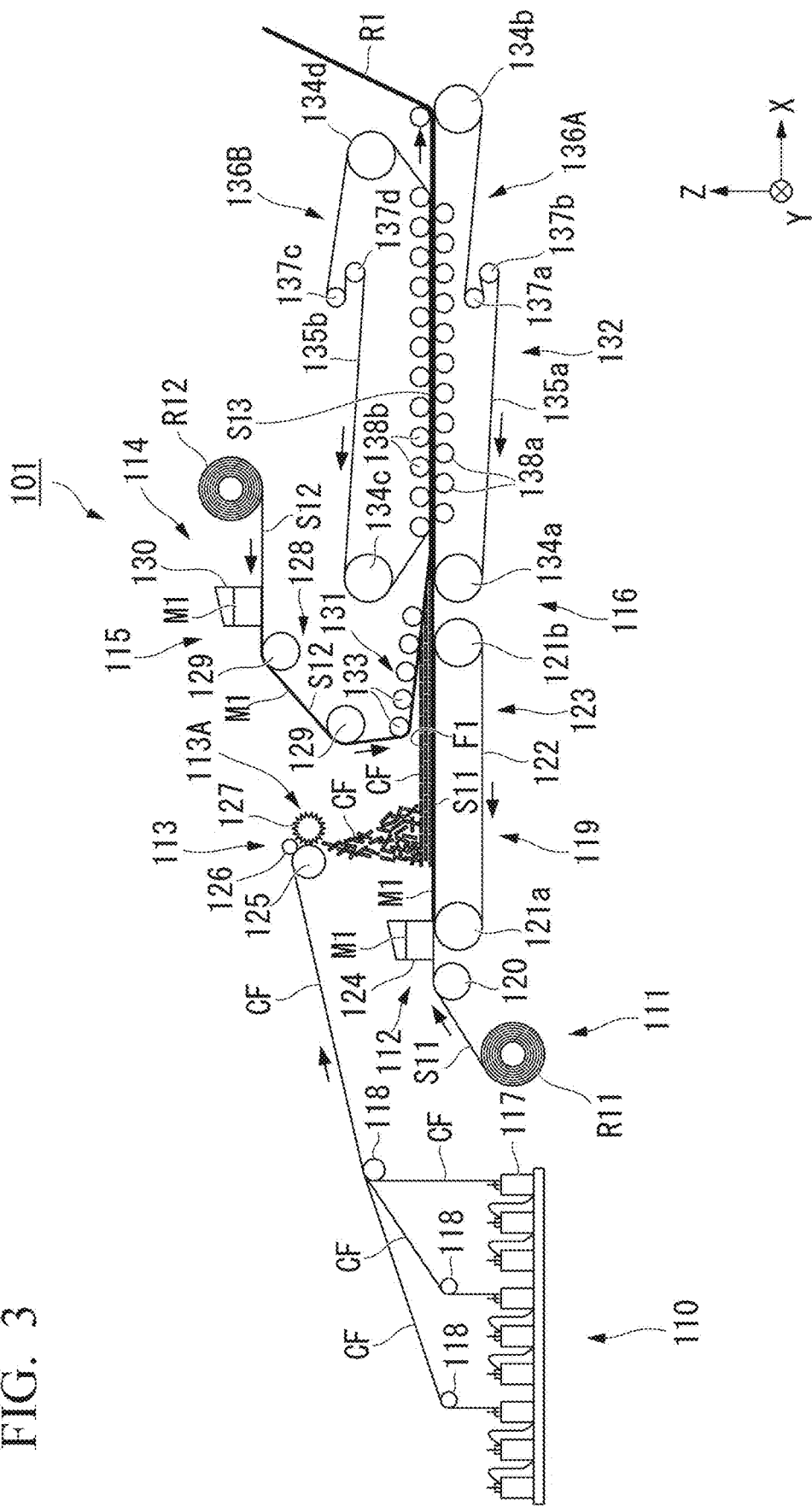
FIG. 3 is a lateral view showing the constitution of an SMC manufacturing apparatus.
Figure 4:
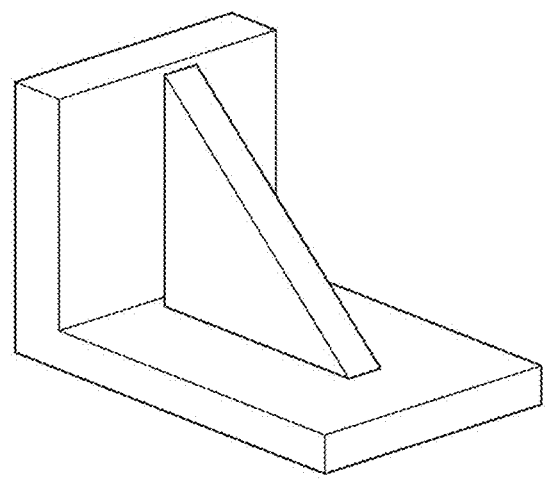
FIG. 4 is a view showing a molded article having a rib.
Figure 5:
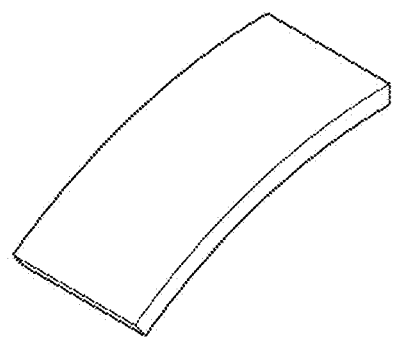
FIG. 5 is a view showing a curved molded article.
Figure 6:
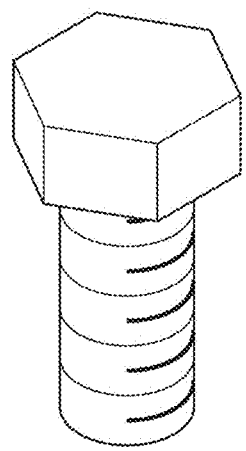
FIG. 6 is a view showing a bolt-shaped molded article.

FIG. 3 is a lateral view showing the constitution of an SMC manufacturing apparatus 101 used in the SMC manufacturing method. In the following description, an XYZ rectangular coordinate system is set, and the positional relationship between members will be described with reference to the XYZ rectangular coordinate system.

As shown in FIG. 3, the SMC manufacturing apparatus 101 (hereinafter, simply referred to as manufacturing apparatus 101) includes a fiber tow supply portion 110, a first sheet supply portion 111, a first coating portion 112, a cutting portion 113, a second sheet supply portion 114, a second coating portion 115, and an impregnation portion 116.

By the fiber tow supply portion 110, fiber tows CF composed of long carbon fibers are made into one fiber tow CF through a plurality of guide rollers 118 while being pulled out of a plurality of bobbins 117, and the fiber tow CF is supplied to the cutting portion 113.

By the first sheet supply portion 111, a long first sheet (carrier sheet) S11 wound off a first web roll R11 is supplied to the first coating portion 112. The manufacturing apparatus 101 includes a first transport portion 119 that transports the first sheet S11 in a predetermined direction (+X axis direction) (hereinafter, referred to as transport direction).

The first transport portion 119 includes a guide roller 120 and a conveyor 123 in which an endless belt 122 is looped between a pair of pulleys 121a and 121b. While rotating, the guide roller 120 guides the first sheet S11 supplied from the first sheet supply portion 111 toward the conveyor 123. The conveyor 123 rotates the pair of pulleys 121a and 121b in the same direction such that the endless belt 122 runs in circles. While the endless belt 122 is running in circles, the first sheet S11 on the surface of the endless belt 122 is transported in the +X axis direction (to the right in horizontal direction) in FIG. 3.

The first coating portion 112 includes a supply box 124 which is located immediately above one pulley 121a close to the guide roller 120 and supplies a paste M1 (matrix resin composition) containing a thermosetting resin. By the supply box 124, the surface of the first sheet S11 transported by the conveyor 123 is coated with the paste M1, which is supplied from a slit (not shown in the drawing) formed on the bottom surface of the supply box 124, at the predetermined thickness.

The cutting portion 113 is positioned on the downstream side (+X axis side) of the first coating portion 112 in the transport direction, cuts the fiber tow CF supplied from the fiber tow supply portion 110 by using a cutter 113A, and scatters the cut fiber tows on the paste M1. The cutter 113A is positioned above the first sheet S11 transported by the conveyor 123, and includes a guide roller 125, a pinch roller 126, and a cutter roller 127.

While rotating, the guide roller 125 guides the fiber tow CF supplied from the fiber tow supply portion 110 downwards. In a state where the fiber tow CF is interposed between the pinch roller 126 and the guide roller 125, the pinch roller 126 rotates in the opposite direction to the guide roller 125. The pinch roller 126 cooperates with the guide roller 125 in this way so as to pulls the fiber tow CF out of the plurality of bobbins 117. While rotating, the cutter roller 127 cuts the fiber tow CF in the predetermined length. The cut fiber tows CF fall from between the guide roller 125 and the cutter roller 127, and are scattered on the paste M1 with which the first sheet S11 is coated.

By the second sheet supply portion 114, a long second sheet (carrier sheet) S12 wound off a second web roll R12 is supplied to the second coating portion 115. The manufacturing apparatus 101 includes a second transport portion 128 that transports the second sheet S12 to the impregnation portion 116.

The second transport portion 128 is positioned above the first sheet S11 transported by the conveyor 123 and includes a plurality of guide rollers 129. The second transport portion 128 transports the second sheet S12 supplied from the second sheet supply portion 114 to the −X axis direction (to the left in horizontal direction) in FIG. 3, and then reverses the transport direction of the second sheet S12 by using the plurality of rotating guide rollers 129 such that the second sheet S2 having been transported downwards is transported in the +X axis direction (to the right in horizontal direction) in FIG. 3.

The second coating portion 115 is positioned immediately above the second sheet S12 transported in the −X axis direction (to the left in the horizontal direction) in FIG. 3 and includes a supply box 130 that supplies the paste M1. By the supply box 130, the surface of the second sheet S12 is coated with the paste M1, which is supplied from a slit (not shown in the drawing) formed on the bottom surface of the supply box 130, at a predetermined thickness.

The impregnation portion 116 is positioned on the downstream side of the cutting portion 113 in the transport direction, and includes a bonding mechanism 131 and a pressing mechanism 132.

The bonding mechanism 131 is positioned above the other pulley 121b of the conveyor 123 and includes a plurality of bonding rollers 133.

The plurality of bonding rollers 133 is arranged in a line along the transport direction in a state of coming into contact with the back surface of the second sheet S2 coated with the paste M1. Furthermore, the plurality of bonding rollers 133 is arranged such that the second sheet S12 slowly approaches the first sheet S1.

In the bonding mechanism 131, the second sheet S12 is superposed on the first sheet S11. Furthermore, the first sheet S11 and the second sheet S12 are transported to the pressing mechanism 132 in a state where the sheets S11 and S12 are bonded to each other together with the fiber tow CF and the paste M1 that are interposed between the sheets S11 and S12. Hereinafter, the first sheet S11 and the second sheet S12 that are bonded to each other together with the fiber tow CF and the paste M1 interposed between the sheets S11 and S12 will be referred to as bonding sheet S13.

The pressing mechanism 132 is positioned on the downstream side of the first transport portion 119 (conveyor 123), and includes a lower conveyor 136A in which an endless belt 135a is looped between a pair of pulleys 134a and 134b and an upper conveyor 136B in which an endless belt 135b is looped between a pair of pulleys 134c and 134d.

The lower conveyor 136A and the upper conveyor 136B are arranged to face each other in a state where the endless belts 135a and 135b come into contact with each other. The pressing mechanism 132 rotates the pair of pulleys 134a and 134b of the lower conveyor 136A in the same direction such that the endless belt 135a runs in circles. Furthermore, the pressing mechanism 132 rotates the pair of pulleys 134c and 134d of the upper conveyor 136B in the same direction such that the endless belt 135b and the endless belt 135a run in circles at the same speed in opposite directions. As a result, the bonding sheet S13 interposed between the endless belts 135a and 135b is transported in the +X axis direction (to the right in the horizontal direction) in FIG. 3.

The lower conveyor 136A is provided with a pair of tension pulleys 137a and 137b for adjusting the tension applied to the endless belt 135a. Likewise, the upper conveyor 136B is provided with a pair of tension pulleys 137c and 137d for adjusting the tension applied to the endless belt 135a. These tension pulleys 137a, 137b, 137c, and 137d are provided on the side opposite to portions of the endless belts 135a and 135b that come into contact with each other.

The pressing mechanism 132 includes a plurality of lower rollers 138a and a plurality of upper rollers 138b. The plurality of lower rollers 138a is arranged in a line in the transport direction in a state of coming into contact with the back surface of the contact portion of the endless belt 135a. Likewise, the plurality of upper rollers 138b is arranged in a line in the transport direction in a state of coming into contact with the back surface of the contact portion of the endless belt 135b. In addition, the plurality of lower rollers 138a and the plurality of upper rollers 138b are arranged in a line along the transport direction of the bonding sheet S13 such that the roller 138a and the roller 138b alternate.

In the pressing mechanism 132, while the bonding sheet S13 is passing between the endless belts 135a and 135b, the paste M1 and the fiber tow CF interposed between the first sheet S11 and the second sheet S12 are pressed by the plurality of lower rollers 138a and the plurality of upper rollers 138b. At this time, the fiber tows CF are impregnated with the paste M1 supplied from both the sheets S11 and S12 between which the fiber tows CF are interposed.

In this way, it is possible to obtain a web R of SMC composed of fiber tows CF impregnated with the thermosetting resin. The web R1 of SMC is cut in the predetermined length by cutting means not shown in the drawing and finally shipped as sheet-like SMC. The first sheet S11 and the second sheet S12 are peeled from SMC before SMC is molded.

In the manufacturing apparatus 101, the impregnation portion 116 further superposes the second sheet S12 coated with the paste M1 on the first sheet S11 on which the fiber tows CF are scattered, and then presses the paste M1 and the group of fiber tows interposed between the first sheet S11 and the second sheet S12 such that the fiber tows are impregnated with the paste M1. Compared to an impregnation portion that does not superpose the second sheet S12 coated with the paste M1 on the first sheet S11, the impregnation portion 116 enables the fiber tows to be more sufficiently impregnated with the paste M1. Therefore, it is possible to obtain a composite material molded article having excellent mechanical characteristics.

An impregnation portion may also be adopted which presses the paste M1 and the group of fiber tows without additionally superposing the second sheet S12 coated with the paste M1 on the first sheet S1 Ion which the fiber tows are scattered, such that the fiber tows are impregnated with the paste M1.

The SMC manufacturing apparatus is not limited to the manufacturing apparatus 101 described above. For example, in the SMC manufacturing apparatus, a spray portion may be installed which includes a gas sprayer spraying a gas such as air to the cut and falling fiber tows CF. In a case where the gas is sprayed to the cut and falling fiber tows CF under predetermined conditions, it is possible to uniformly disperse the fiber tows CF without directivity.

Next, the SMC manufacturing method using the manufacturing apparatus 101 will be specifically described. The SMC manufacturing method of the present example has a coating step, a cutting step, and an impregnation step that will be described below. Coating step: coating the first sheet S11 transported by the first transport portion 119 with the paste M1.

Cutting step: cutting the long fiber tow CF by the cutter 113A.

Impregnation step: impregnating the fiber tows CF with the paste M1 by pressing the paste M1 and the scattered fiber tow group F1 on the first sheet S11.

<Coating Step>

By the first sheet supply portion 111, the long first sheet S11 is wound off the first web roll R1 and supplied to the first transport portion 119. By the first coating portion 112, the first sheet S11 is coated with the paste M at a predetermined thickness. The first sheet S11 is transported by the first transport portion 119. As a result, the paste M1 with which the first sheet S11 is coated is transported. The thickness of the paste M1 with which the first sheet S11 is coated is not particularly limited.

<Cutting Step>

By the fiber tow supply portion 110, the long fiber tow CF is pulled out of the plurality of bobbins 117 and supplied to the cutting portion 113. By the cutter 113A, the fiber tow CF is continuously cut in a predetermined length.

<Impregnation Step>

By the second sheet supply portion 114, the long second sheet S12 is wound off the second web roll R12 and supplied to the second transport portion 128. By the second coating portion 115, the second sheet S12 is coated with the paste M1 at a predetermined thickness. The thickness of the paste M1 with which the second sheet S12 is coated is not particularly limited.

By the transport of the second sheet S12, the paste M1 with which the sheet S12 is coated is transported. In the impregnation portion 116, the second sheet S12 is bonded to the surface of a sheet-like fiber tow group F1 by the bonding mechanism 131. Then, the pressing mechanism 132 presses the sheet-like fiber tow group F1 and the paste M1 such that the fiber tows CF in the fiber tow group F1 are impregnated with the paste M1. In this way, a web R1 is obtained in which SMC is interposed between the first sheet S11 and the second sheet S12.

As described in the present example, the impregnation step in the manufacturing of SMC is preferably a step of superposing the second sheet S12 coated with the paste M1 on the first sheet S1 Ion which the fiber tows CF are scattered, and then pressing the paste M1 and the fiber tow group interposed between the first sheet S1 and the second sheet S12 such that the fiber tows are impregnated with the paste M1. This impregnation step enables the fiber tows to be more sufficiently impregnated with the paste M1, compared to an impregnation step in which the second sheet S12 coated with the paste M1 is not superposed on the first sheet S11. Therefore, it is possible to obtain a composite material molded article having excellent mechanical characteristics.

An impregnation step may also be adopted in which the fiber tows are impregnated with the paste M1 by pressing the paste M1 and the fiber tow group without additionally superposing the second sheet S2 coated with the paste M1 on the first sheet S11 on which fiber tows are scattered.

The SMC manufacturing method is not limited to the method using the manufacturing apparatus 101. For example, the SMC manufacturing method may include a scattering step of scattering fiber tows by spraying a gas such as air to the cut and falling fiber tows. In a case where a gas is sprayed to the cut and failing fiber tows CF under predetermined conditions, it is possible to uniformly disperse the fiber tows CF without directivity.

Furthermore, the SMC manufacturing method is not limited to the method in which long SMC is continuously manufactured as described above, and may be a method in which a single SMC sheet is manufactured.

The composite material molded article of the present invention may be made of a cured product of SMC, or may be a combination of a member made of a cured product of SMC and another member. For example, the composite material molded article of the present invention may be a composite material molded article prepared by combining SMC, a known prepreg, and a material other than SMC such as non-woven cloth.

The composite material molded article according to a second embodiment of the present invention is a composite material molded article which is a molded substance of a molding material containing a resin and fibers. The composite material molded article has a first region including a resin merging portion, the first region is a region which extends along the resin merging portion, the length of the first region is twice the average fiber length of the fibers in a direction intersecting with the resin merging portion, and the average of a fiber orientation degree in the first region is 0.19 or more.

In a case where the composite material molded article has the above characteristics, in the first region in the vicinity of the resin merging portion, as the resin flows during molding, the fibers are uniformly oriented along the direction in which the resin merging portion extends. As a result, the fiber orientation degree increases in the first region. In a case where the fiber orientation degree in the resin merging portion increases, the fibers show the same rotation behavior at the top and the bottom of the composite material molded article. Accordingly, the fiber orientation degrees are the same at the top and the bottom of the composite material molded article, and it is possible to inhibit warpage from occurring in the first region along the direction in which the resin merging portion extends. Therefore, in the composite material molded article, the occurrence of warpage can be inhibited in at least the first region which is a specific portion.

As a desirable aspect of the composite material molded article according to the second embodiment of the present invention, in the first region, a ratio of a tensile elastic modulus in a second direction intersecting with a first direction to a tensile elastic modulus in the first direction intersecting with the resin merging portion, which is expressed as [tensile elastic modulus in second direction]/[tensile elastic modulus in first direction], is 1.5 or more and 6.0 or less. According to this aspect, the tensile elastic modulus in the direction along which the resin merging portion extends is higher than the tensile elastic modulus in the direction intersecting with the resin merging portion. Therefore, in the composite material molded article, the flexural rigidity of the molded substance increases in the direction along which the resin merging portion extends, and the linearity of the composite material molded article is maintained. As a result, the warpage of the composite material molded article can be inhibited.

As a desirable aspect of the composite material molded article, the aforementioned fibers are at least one kind of fibers selected from carbon fibers, aramid fibers, and glass fibers. In a case where such materials are used, the fiber orientation degree or tensile elastic modulus of the composite material molded article can be controlled. As the fibers, carbon fibers are particularly preferable.

As a desirable aspect of the composite material molded article, the content of the fibers is 20% by mass or more and 65% by mass or less with respect to the total amount of the composite material molded article. In a case where the content of the fibers is within the above range, as the resin flows during molding, the fibers tend to be excellently uniformly oriented along the outer circumferential direction of the resin merging portion or molded article. Therefore, the fiber orientation degree, tensile elastic modulus, and the like of the composite material molded article can be controlled.

As the resin, it is possible to use at least one kind of resin selected from an epoxy resin, an unsaturated polyester resin, and a vinyl ester resin. In a case where these resins are used, the resins excellently flow during molding. As a result, the fiber orientation degree or tensile elastic modulus of the composite material molded article can be controlled.

As a desirable aspect of the composite material molded article according to the second embodiment of the present invention, the composite material molded article has two second regions that are arranged across the first region in a direction intersecting with the resin merging portion, and the average of the fiber orientation degree in the first region is higher than the average of the fiber orientation degree in the second regions. In such a composite material molded article, by controlling the fiber orientation degree in the first region in the vicinity of the resin merging portion, it is possible to inhibit warpage from occurring along a direction in which the resin merging portion extends in at least the first region.

The method for manufacturing a composite material molded article according to the second embodiment of the present invention is a method for manufacturing a composite material molded article which is a molded substance of a molding material containing a resin and fibers. In this manufacturing method, a plurality of base materials each containing the molding material is disposed in a mold and subjected to compression molding such that a plurality of flowing fluids of the base materials is fused and forms a resin merging portion. The base materials flow along a direction in which the resin merging portion extends, a first region including the resin merging portion of the molded substance is a region which extends along the resin merging portion, the length of the first region is twice the average fiber length of the fibers in a direction intersecting with the resin merging portion, and the average of the fiber orientation degree in the first region is 0.19 or more.

According to the above manufacturing method, a plurality of base materials is disposed in a mold during molding. As a result, the resin flows along the resin merging portion. Due to the flow of the resin, fibers are uniformly oriented along the direction in which the resin merging portion extends, and hence the fiber orientation degree in the first region increases. In a case where the fiber orientation degree in the resin merging portion increases, the fibers show the same rotation behavior on the inside and outside of the composite material molded article. Consequently, by the method for manufacturing a composite material molded article, the fiber orientation degrees are the same on the inside and outside, and it is possible to inhibit warpage from occurring along a direction in which the resin merging portion extends in the first region.

Hereinafter, the second embodiment of the present invention will be specifically described with reference to drawings. However, the present invention is not limited to the following modes for embodying the invention (hereinafter, referred to as embodiments). Furthermore, the constituents in the following embodiments include constituents that can be easily conceived by those skilled in the art, constituents that are substantially the same, and constituents that are within the so-called equivalent range. In addition, the constituents disclosed in the following embodiments can be appropriately combined.

EMBODIMENTS

Figure 13:
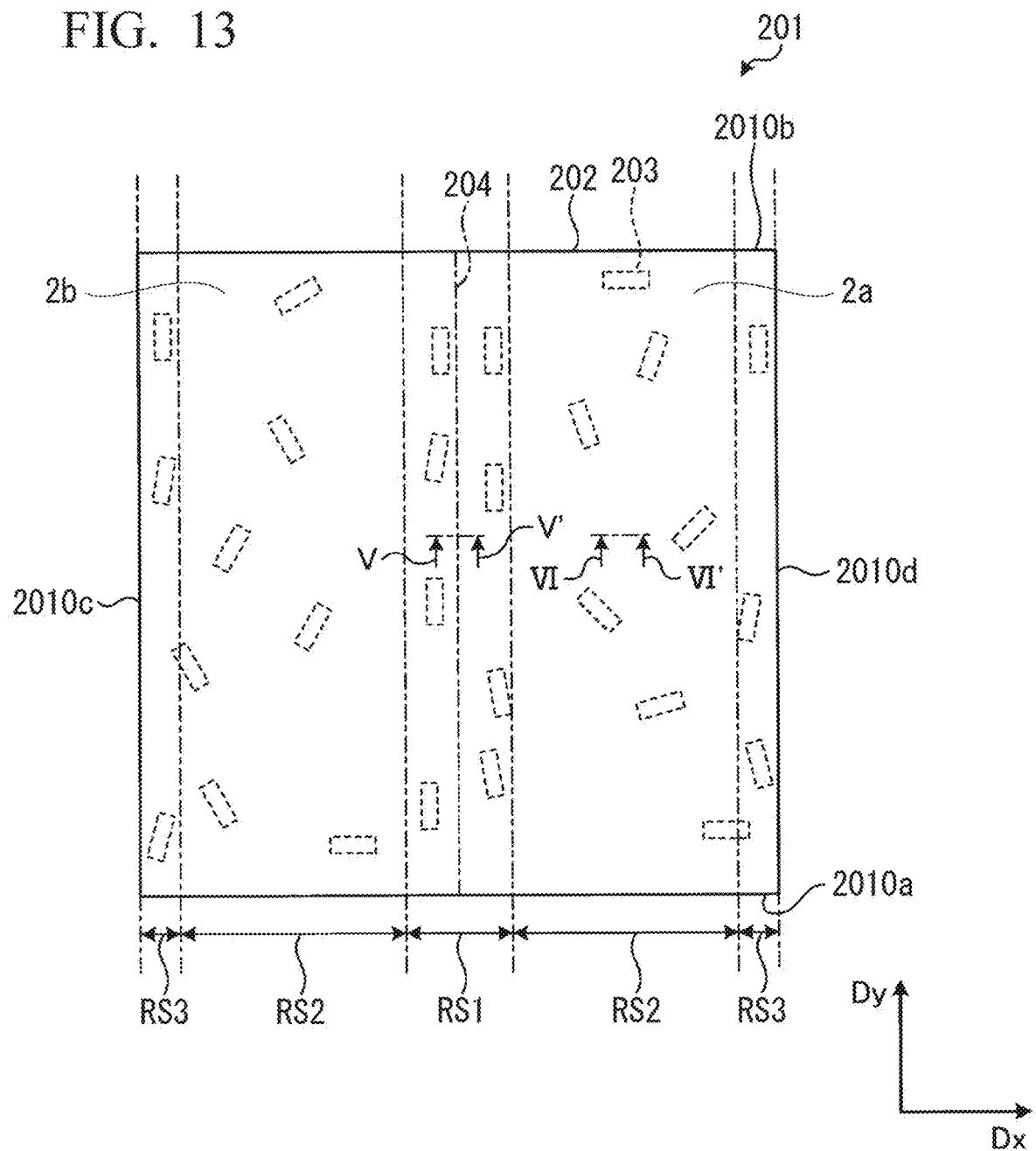
FIG. 13 is a plan view schematically showing a molded substance according to an embodiment.
Figure 14:
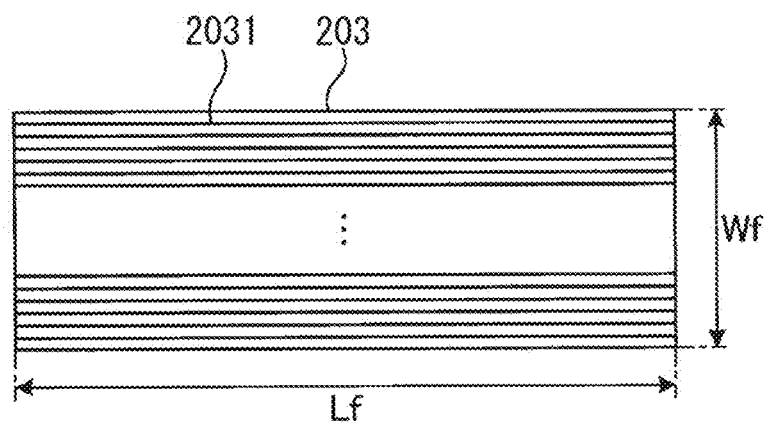
FIG. 14 is a plan view schematically showing a fiber tow contained in the molded substance.
Figure 15:
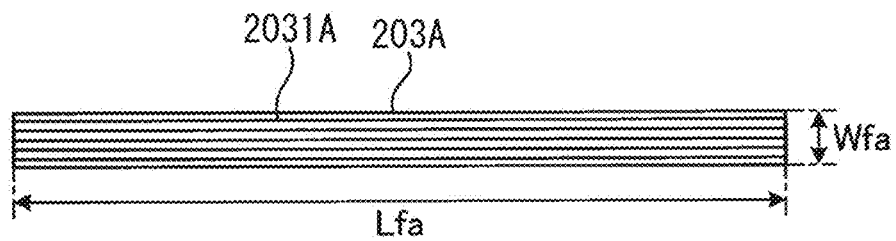
FIG. 15 is a plan view schematically showing another example of the fiber tow contained in the molded substance.
Figure 16:
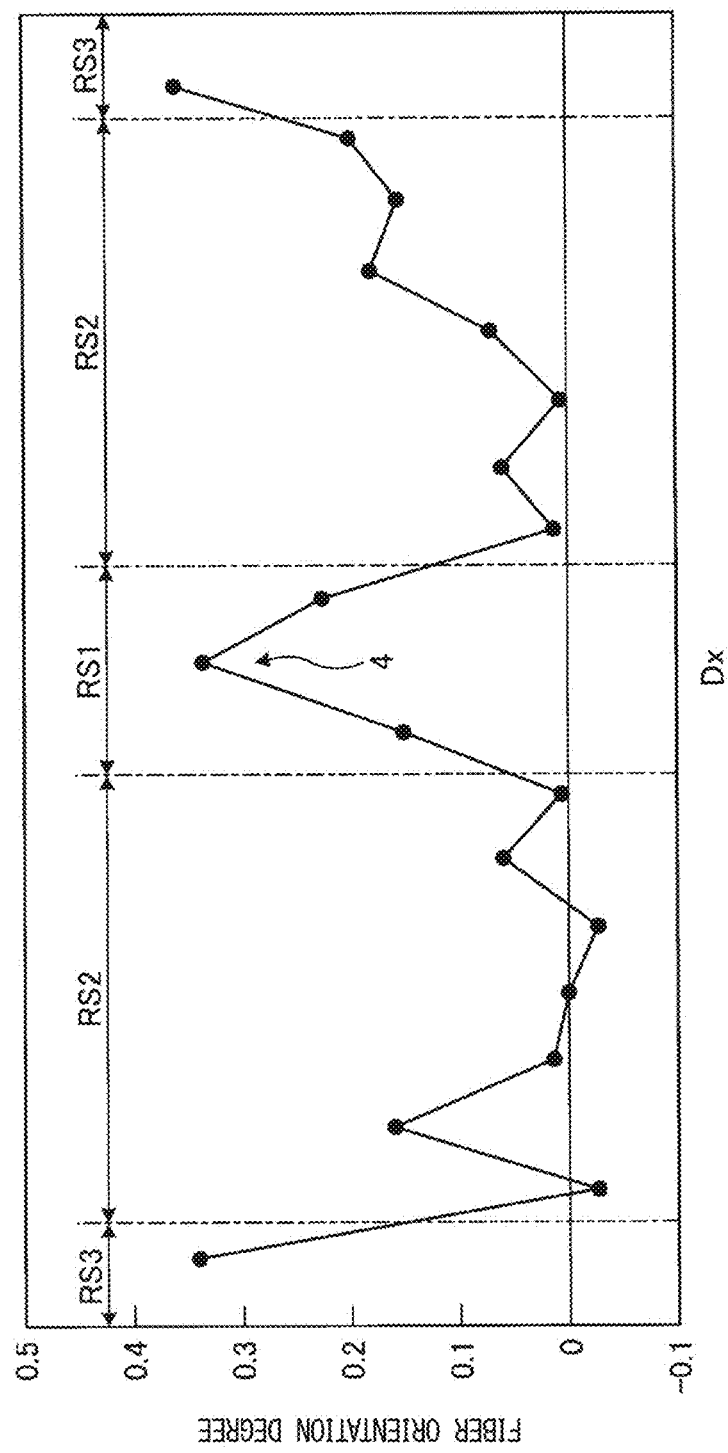
FIG. 16 is a graph showing the relationship between the position of the molded substance in a first direction and a fiber orientation degree.
Figure 17:
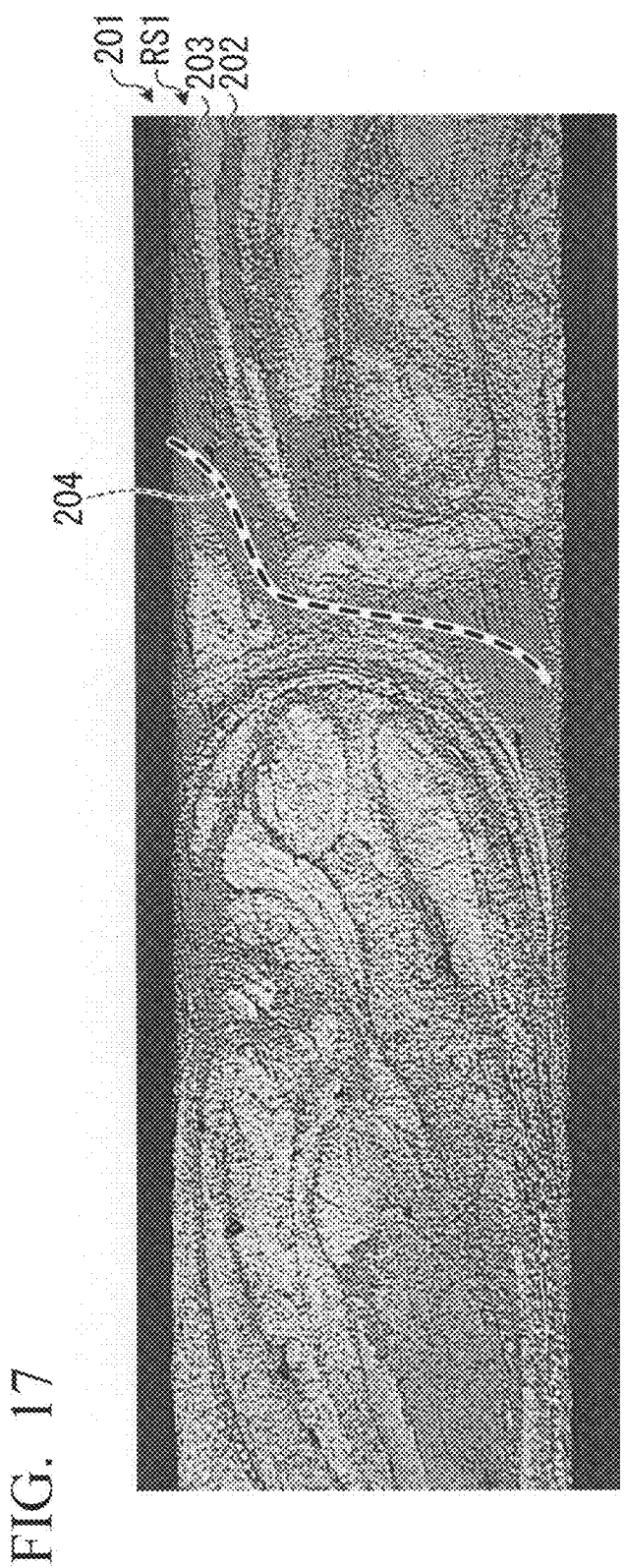
FIG. 17 is a cross-sectional photograph of a resin merging portion of the molded substance.
Figure 18:
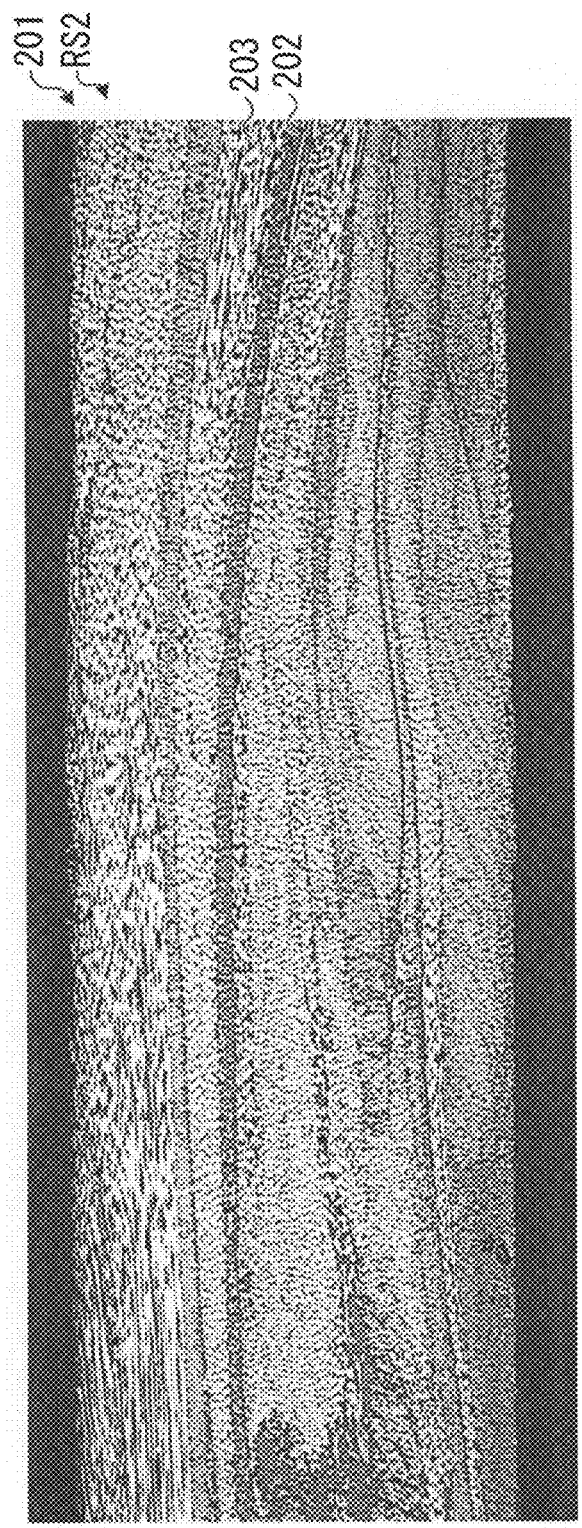
FIG. 18 is a cross-sectional photograph of a portion of the molded substance that does not have a resin merging portion.

FIG. 13 is a plan view schematically showing a molded substance according to an embodiment of the composite material molded article. FIG. 14 is a plan view schematically showing a fiber tow contained in the molded substance. FIG. 15 is a plan view schematically showing another example of the fiber tow contained in the molded substance. FIG. 16 is a graph showing the relationship between the position of the molded substance in a first direction and a fiber orientation degree. FIG. 17 is a cross-sectional photograph of a resin merging portion of the molded substance. FIG. 18 is a cross-sectional photograph of a portion of the molded substance that does not have a resin merging portion.

As shown in FIG. 13, the molded substance 201 has a molding material containing a resin 202 and a plurality of fiber tows 203. The molded substance 201 is fiber reinforced plastic (FRP), in which the plurality of fiber tows 203 is impregnated with the resin 202. The molded substance 201 is molded, for example, by a sheet molding compound (SMC) method. The molded substance 201 has a flat plate shape and is in the form of a quadrangle having four sides 2010a, 2010b, 2010c, and 2010d. Here, the molded substance 201 shown in FIG. 13 is schematically illustrated for easy understanding. The molded substance 201 is widely used for sports and leisure activities, industrial applications such as automobiles and aircrafts, and the like, and can be processed into a desired shape according to a product.

As the resin 202, a thermoplastic resin or a thermosetting resin is used. The thermoplastic resin is shaped by cooling and solidification without a chemical reaction, and thus can be molded within a short period of time. Therefore, the productivity is excellent. As such a thermoplastic resin, for example, it is possible to use a polyetheretherketone resin, a polyetherimide resin, polyamide (such as nylon 6 or nylon 66), polyolefin (such as polyethylene or polypropylene) modified polyolefin, polyester (such as polyethylene terephthalate or polybutylene terephthalate), polycarbonate, polyamideimide, polyphenylene oxide, a polysulfone, polyether sulfone, polystyrene, ABS, polyphenylene sulfide, liquid crystal polyester, and an acrylonitrile-styrene copolymer. Moreover, a mixture of these may also be used. Furthermore, a copolymerized substance such as nylon 6-nylon 66 copolymer nylon may also be used. Among these, the polypropylene resin can be preferably used. Examples of the thermosetting resin include an epoxy resin, a phenol resin, an unsaturated polyester resin, a vinyl ester resin, a phenoxy resin, an alkyd resin, a urethane resin, a urea resin, a melamine resin, a maleimide resin, a cyanate resin, and the like. Among these, the epoxy resin, the unsaturated polyester resin, and the vinyl ester resin can be preferably used. In a case where these resins are used, the resins excellently flow during molding. As a result, the fiber orientation degree or tensile elastic modulus of the molded substance 201 can be controlled. In addition, a flame retardant, a weatherproofness improver, other antioxidants, a heat stabilizer, an ultraviolet absorber, a plasticizer, a lubricant, a colorant, a compatibilizer, a conductive filler, and the like can be added to the molding material according to the characteristics required to the molded article.

As shown in FIG. 14, each fiber tow 203 has a plurality of fibers 2031. The plurality of fibers 2031 are bundled in a state of being aligned in the same longitudinal direction. Each fiber tow 203 is in the form of a tape. A length Lf of each fiber tow 203 is, for example, about 25 mm. A width Wf of each fiber tow 203 is, for example, about 10 mm. The thickness of each fiber tow 203 is, for example, about 200 μm. The fiber tow 203 shown in FIG. 14 is obtained by cutting a long fiber tow. The shape of the fiber tow 203 is merely an example and can be changed as appropriate. In the present embodiment, a fiber length is the length Lf of the fiber tow 203, and an average fiber length is the average of the length Lf of the plurality of fiber tows 203 contained in the molded substance 201. Furthermore, orientation means that the plurality of fiber tows 203 are arranged in the longitudinal direction, that is, the fibers 2031 are uniformly arranged in a predetermined direction.

Examples of the fibers 2031 include carbon fibers, aramid fibers, polyester fibers, graphite fibers, silicon carbide fibers, alumina fibers, tungsten carbide fibers, boron fibers, and glass fibers. Among these, at least one kind of fibers selected from carbon fibers, aramid fibers, and glass fibers are used. Particularly, carbon fibers are preferable. In a case where these materials are used, the molded substance 201 is lightened, and the strength thereof is increased. Furthermore, in a case where these materials are used, the fiber orientation degree or tensile elastic modulus of the molded substance 201 can be controlled.

As shown in FIG. 15, a fiber tow 203A as another example is in the form of a rope composed of a bundle of a plurality of fibers 2031A. Each fiber 2031A is, for example, glass fiber. A length Lfa of the fiber tow 203A is, for example, about 25 mm. A width Wfa and a thickness of the fiber tow 203A am, for example, about 100 μm.

As shown in FIG. 13, the molded substance 201 has a resin merging portion 204. The resin merging portion 204 is also called weld line. During the molding of the molded substance 201, a plurality of base materials 205 (see FIG. 19) each containing a resin material is subjected to compression molding. As a result, a plurality of flowing fluids of the resin 202 is fused, and hence the resin merging portion 204 is formed. That is, the resin merging portion 204 is a portion which does not contain the fiber tows 203 and in which the resin 202 forms a line. The resin merging portion 204 extends along a second direction Dy, and continues from one side 2010a to the other side 2010b.

Hereinafter, sometimes the molded substance 201 will be described using a first direction Dx and the second direction Dy. The first direction Dx is a direction parallel to the surface of the molded substance 201 and orthogonal to the resin merging portion 204. The second direction Dy is a direction parallel to the surface of the molded substance 201 and orthogonal to the first direction Dx.

FIG. 17 is a cross-sectional photograph of the molded substance 201 captured at a position corresponding to the line V-V' in FIG. 13. FIG. 18 is a cross-sectional photograph of the molded substance 201 captured at a position corresponding to the line VI-VI' in FIG. 13. The molded substance 201 shown in FIGS. 17 and 18 was molded by the same manufacturing method as that in embodiments 201 and 202 which will be described later. After being polished, the cross section of the molded substance 201 was observed by being imaged using an optical microscope at 50× magnification.

As shown in FIG. 17, during molding, a plurality of flowing fluids of the resin 202 is fused and forms the resin merging portion 204. In the vicinity of the resin merging portion 204, the resin 202 also flows in the thickness direction of the molded substance 201. Therefore, in a first region RS1 in the vicinity of the resin merging portion 204, the fiber tows 203 are oriented in the thickness direction. The fiber tows 203 are oriented along a direction inclined 45° or more away from a direction parallel to the surface of the molded substance 201. The resin merging portion 204 formed in the molded substance 201 extends to the back surface of the molded substance 201 from the front surface thereof, and has a resin-rich region composed only of the resin 202. On the other hand, as shown in FIG. 18, in a non-resin merging region (second region RS2) separated from the resin merging portion 204, the fiber tows 203 and the resin 202 are laminated in layers. The fiber tows 203 are oriented in a direction parallel to the surface of the molded substance 201. The fiber tows 203 are oriented such that an angle 30° or less is formed between the orientation direction and the direction parallel to the surface of the molded substance 201. As described above, the second region RS2 of the molded substance 201 does not have a resin-rich region.

The molded substance 201 has the first region RS1, the second regions RS2, and third regions RS3. The first region RS1 is a region which includes the resin merging portion 204 and extends along the resin merging portion 204. The width of the resin merging portion 204 in the first direction Dx is twice the average fiber length of the fiber tows 203. The molded substance 201 is provided with two second regions RS2. The two second regions RS2 are adjacent to each other in the first direction Dx across the first region RS1. The molded substance 201 is provided with two third regions RS3. The two third regions RS3 are regions which are provided at the end portions of the molded substance 201 and extend along the sides 2010c and 2010d. In other words, two second regions RS2 and one first region RS1 are provided between the third regions RS3 adjacent to each other in the first direction Dx.

In the first region RS1, the longitudinal direction of the fiber tows 203 is matched with the direction in which the resin merging portion 204 extends for the following reason. That is, during the molding of the molded substance 201, as the resin 202 flows, the fiber tows 203 are uniformly oriented along the direction in which the resin merging portion 204 extends. On the other hand, the number of fiber tows 203 inclined away from the second direction Dy is larger in the second regions RS2 than in the first region RS1. Therefore, in the second regions RS2, the fiber tows 203 are randomly oriented. In the third regions RS3, the longitudinal direction of the fiber tows 203 is matched with the direction in which each of the sides 2010c and 2010d extends.

FIG. 16 is a graph showing the fiber orientation degree obtained by quantifying the orientation state of the fibers 2031. The fiber orientation degree can be calculated by the method disclosed in PCT International Publication No. WO2016/208731.

Specifically, a fiber-reinforced resin material is irradiated with X-rays, the X-ray diffraction intensity resulting from crystals in the fibers is measured, an angle φ is plotted on the horizontal axis, and an X-ray diffraction intensity (p) is plotted on the vertical axis, thereby obtaining a one-dimensional orientation profile. From the obtained one-dimensional orientation profile, a coefficient a of orientation is calculated by Equation (2"). Then, a fiber orientation degree fa is calculated from Equation (1").

$$a = \frac{\int_0^{2\pi} I(\Phi)\cos^2\Phi d\Phi}{\int_0^{2\pi} I(\Phi)d\Phi} \tag{2"}$$

$$fa = 2a - 1 \tag{1"}$$

Although fa is generally called crystal orientation degree, because graphite crystals in carbon fibers are oriented in the fiber axis direction, the orientation of graphite crystals in a composite material is regarded as the orientation of fibers. Therefore, herein, fa is defined as a fiber orientation degree.

The horizontal axis in the graph shown in FIG. 16 shows the position of the molded substance 201 in the first direction Dx. The vertical axis shows the fiber orientation degree. FIG. 16 shows that the higher the positive fiber orientation degree is, the more the fiber tows 203 are uniformly arranged in the second direction Dy. On the other hand, FIG. 16 also shows that in a case where the fiber orientation degree is close to 0, the amount of fibers oriented in the direction Dx is the same as the amount of fibers oriented in the direction Dy, for example, the fiber tows 203 are randomly oriented.

As shown in FIG. 16, the fiber orientation degree in the first region RS1 is 0.16, 0.34, and 0.22. The average of the fiber orientation degree in the first region RS1 is 0.24. In both the second regions RS2, the fiber orientation degree is lower than the average of the fiber orientation degree in the first region RS1. The average of the fiber orientation degree in the first region RS1 is higher than the average of the fiber orientation degree in the second regions RS2. The fiber orientation degree in the third regions RS3 is larger than the average of the fiber orientation degree in the second regions RS2.

Specifically, it is preferable that the composite material molded article has a second region 2a and a second region 2b arranged in the width direction across the first region, the average of the fiber orientation degree $f_1$ in the first region RS1 is higher than the average of the following fiber orientation degree $f_{2a}$ in the second regions, and the average of the fiber orientation degree $f_1$ in the first region RS1 is higher than the average of the following fiber orientation degree $f_{2b}$ in the second region 2b.

In the molded substance 201 of the present embodiment, the fiber orientation degree is high in the first region RS1 in the vicinity of the resin merging portion 204. In the portion where the fiber orientation degree is high, the fiber tows 203 shows the same rotation behavior on the inside and outside during molding. Accordingly, the fiber orientation degrees are the same on the inside and outside of the molded substance 201. Therefore, it is possible to inhibit warpage from occurring in the first region RS1 along the direction in which the resin merging portion 204 extends.

A tensile elastic modulus in the first direction Dx in the first region RS1 is denoted as Ex. Furthermore, a tensile elastic modulus in the second direction Dy in the first region RS1 is denoted as By. That is, the tensile elastic modulus By is a tensile elastic modulus in the direction along which the fiber tows 203 are uniformly oriented. In a case where carbon fibers are used as the fibers 2031, for example, the tensile elastic modulus Ex is about 10 GPa, and the tensile elastic modulus Ey is about 50 GPa. In this case, a ratio Ey/Ex of the tensile elastic moduli of the first region RS1 is 5.0. The tensile elastic moduli Ex and Ey are measured based on JIS K 7164. Herein, regarding the value of strain, a strain gauge is attached to the center of a test piece in the longitudinal direction, a tensile test is performed, and the value of strain is calculated using a value of strain in the direction along which the test piece is stretched.

In a case where glass fibers are used as the fibers 2031, for example, the tensile elastic modulus Ex is about 8 GPa, and the tensile elastic modulus Ey is about 13 GPa. In this case, a ratio Ey/Ex of the tensile elastic moduli of the first region RS1 is 1.625.

In a case where a unidirectional prepreg material is used as a comparative example, fibers are uniformly oriented in one direction in the entirety of the molded substance. Therefore, in the comparative example, the tensile elastic modulus Ey in the direction along which the fibers are highly oriented is about 200 GPa. On the other hand, the tensile elastic modulus Ex in the direction orthogonal to the direction along which the fibers are highly oriented is about 10 GPa. In this case, a ratio Ey/Ex of the tensile elastic moduli in the comparative example is 20.

In the isotropic resin substrate having no fiber, both the tensile elastic modulus Ex and tensile elastic modulus Ey are about 3 GPa. In this case, a ratio Ey/Ex of the tensile elastic moduli in the isotropic resin substrate is 1.

As described above, in the first region RS1 having a high fiber orientation degree in the molded substance 201 of the present embodiment, the average of the fiber orientation degree $f_1$ along the direction in which the resin merging portion 204 extends is preferably 0.19 or more, more preferably 0.19 or more and 0.50 or less, and even more preferably 0.20 or more and 0.30 or less.

Although the fiber orientation degree $f_1$ is the average in the first region RS1, it is preferable that the fiber orientation degree $f_1$ in each portion of the first region RS1 is within the above range.

Furthermore, in the first region RS1 having a high fiber orientation degree in the molded substance 201 of the present embodiment, the tensile elastic modulus By along the direction in which the resin merging portion 204 extends is higher than the tensile elastic modulus Ex in the direction intersecting with the resin merging portion 204. The ratio Ey/Ex of the tensile elastic moduli is 1.5 or more and 6.0 or less. The ratio Ey/Ex of the tensile elastic moduli is more preferably 1.6 or more and 5.0 or less.

In a case where the ratio Ey/Ex is within the above range, the flexural rigidity of the molded substance 201 increases along the direction in which the resin merging portion 204 extends, and hence the linearity of the molded substance 201 is maintained. Therefore, in at least in the first region RS1 of the molded substance 201, it is possible to inhibit warpage from occurring in the direction in which the resin merging portion 204 extends.

The content of the fiber tows 203 is 20% by mass or more and 65% by mass or less with respect to the total amount of the molded substance 201. The content of the fiber tows 203 is more preferably 30% by mass or more and 60% by mass or less with respect to the total amount of the molded substance 201. For example, the content of the fiber tows 203 is about 50% by mass with respect to the total amount of the molded substance 201.

In a case where the content of the fibers 2031 is within the above range, as the resin 202 flows during molding, the fiber tows 203 tend to be excellently uniformly oriented along the direction in which the resin merging portion 204 extends. As a result, the fiber orientation degree or tensile elastic modulus of the molded substance 201 can be controlled. In a case where the content of the fiber tows 203 is smaller than 20% by mass, the strength of the molded substance 201 is likely to decrease. In a case where the content of the fiber tows 203 is greater than 65% by mass, the viscosity of the material caused to flow may increase during molding, and hence the molding properties are likely to deteriorate.

(Method for Manufacturing Molded Substance)

Figure 19:
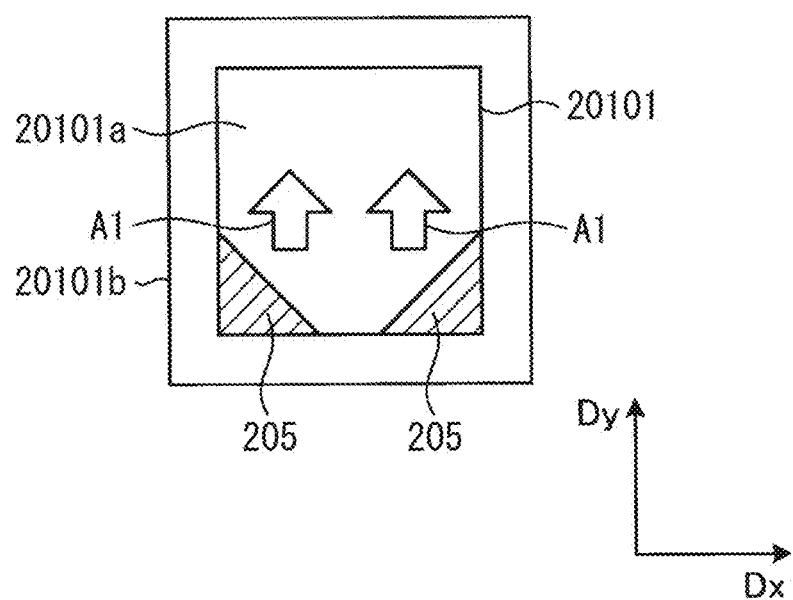
FIG. 19 is a view for illustrating a method for manufacturing a molded substance according to an embodiment, which shows an example of the way the base materials are arranged in a mold.
Figure 20:
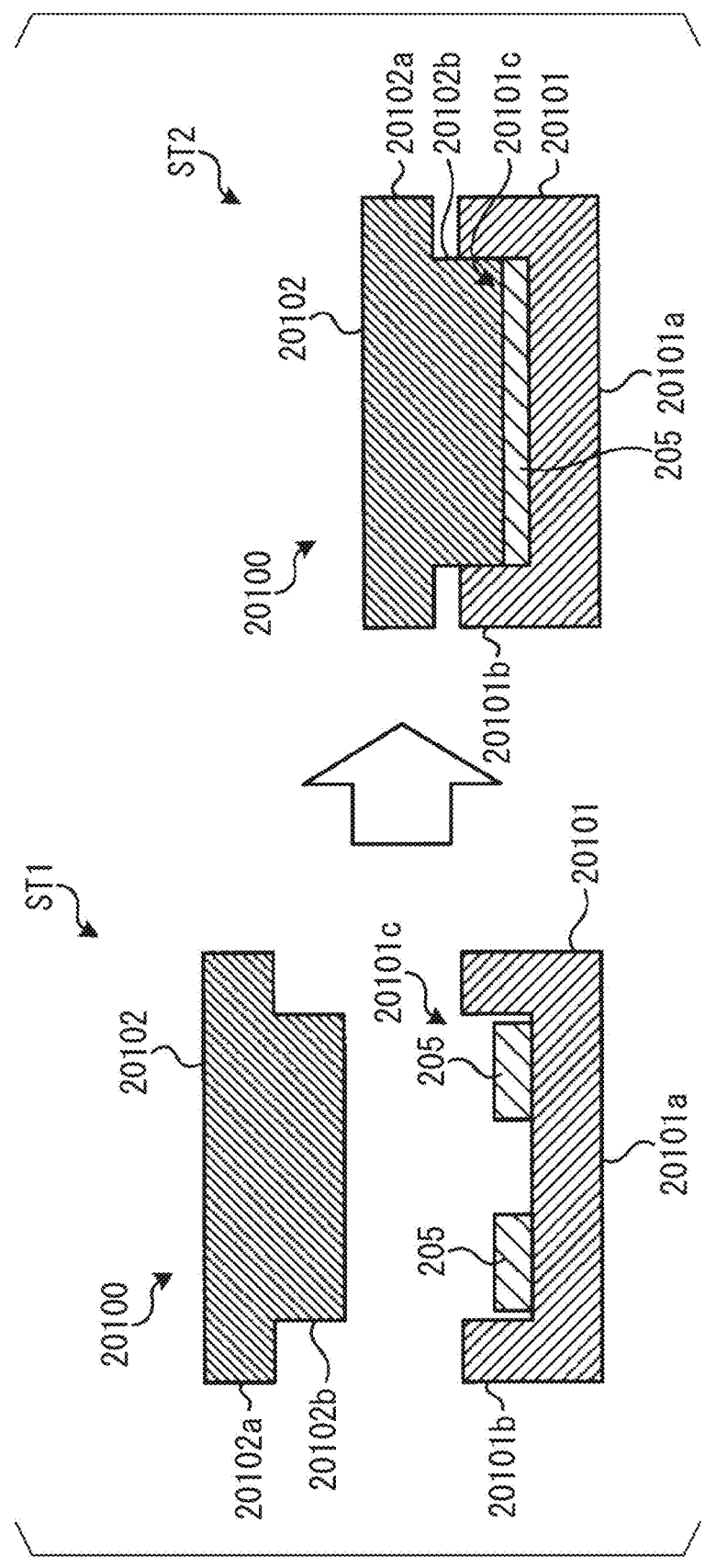
FIG. 20 is a view for illustrating a method for manufacturing a molded substance according to an embodiment.
Figure 21:
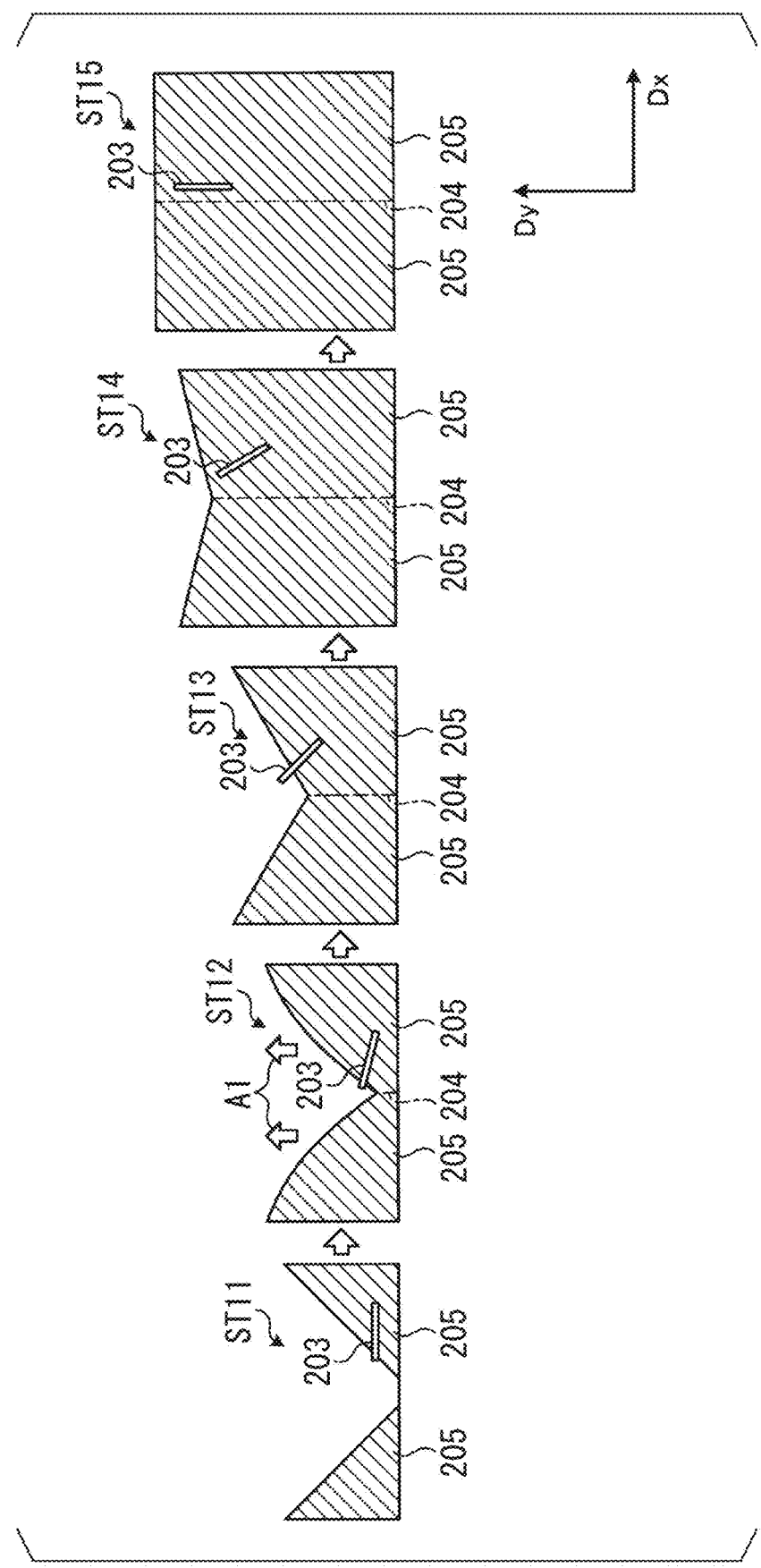
FIG. 21 is a view for illustrating the relationship between the flow of a resin and the orientation of fiber.

FIG. 19 is a view for illustrating a method for manufacturing a molded substance according to an embodiment, which shows an example of the way the base materials are arranged in a mold. FIG. 20 is a view for illustrating a method for manufacturing a molded substance according to an embodiment. FIG. 21 is a view for illustrating the relationship between the flow of a resin and the orientation of fiber.

As shown in FIGS. 19 and 20, a plurality of base materials 205 is spaced apart and arranged in a mold 20100 (Step ST1). Each of the base materials 205 is an SMC molding material and contains the resin 202 and fiber tows 203. In the method for manufacturing the base materials 205, for example, a sheet-like polyester resin is prepared first. The sheet-like polyester resin is obtained by adding styrene and azobisisobutylnitrile (AIBN) as a radical initiator to a polyester resin obtained by a condensation reaction between maleic anhydride and glycol. Then, the fiber tows 203 are allowed to perform free fall to the sheet-like polyester resin at random angles, and then impregnated with the polyester resin. In this way, the base materials 205 are obtained. In a state where the base materials 205 are arranged in the mold 20100, the fiber tows 203 oriented in random directions are impregnated with the resin 202.

The base material 205 is not limited to the manufacturing method or formulation described above. The base material 205 may be any material that can flow in the mold 20100 and is cured by a crosslinking reaction initiated by heat transfer from the mold 20100.

As shown in FIG. 20, the mold 20100 has a lower mold 20101 and an upper mold 20102. The lower mold 20101 has a bottom portion 20101a and a wall portion 20101b. A recess portion 20101c is formed by the bottom portion 20101a and the wall portion 20101b. The upper mold 20102 has a base portion 20102a and a projection portion 20102b. The projection portion 20102b is inserted into the recess portion 20101c of the lower mold 20101. In the mold 20100, the base material 205 can be compression-molded in the space surrounded with the projection portion 20102b, the bottom portion 20101a, and the wall portion 20101b.

As shown in FIG. 19, the two base materials 205 are arranged on the bottom portion 20101a of the lower mold 20101. The length of one side of the bottom portion 20101a is, for example, 30 cm. The base materials 205 each have a triangular shape and are arranged adjacent to each other in the first direction Dx. The base materials 205 are arranged at the corners of the lower mold 20101 and conic into contact with the wall portion 20101b. Supposing that there is a line that passes the midpoint of the bottom portion 20101a in the first direction Dx and extends in the second direction Dy and that this line is an axis of symmetry, the two base materials 205 are arranged in axial symmetry. The shape and arrangement of the base materials 205 are not limited to the example shown in FIG. 19. Each base material 205 may have a circular shape or another shape such as a polygonal shape including a quadrangular shape. Three or more base materials 205 may be arranged in one mold 20100.

Then, a controller (not shown in the drawing) sets the temperature of the mold 20100, for example, to 145° C., and the temperature of the mold 20100 increases. The temperature of the mold 20100 can be controlled, for example, by steam supplied from a boiler, an electric heater, and the like. Furthermore, it is preferable that the controller detects the temperature of the mold 20100 or the temperature of the base materials 205 by using a temperature sensor such as a thermocouple during compression molding. It is preferable that the controller controls the temperature by comparing the actually measured temperature with the set temperature of the steam or the electric heater.

The controller moves the upper mold 20102 to the lower mold 20101, and as a result, the base materials 205 are subjected compression-molded (FIG. 20, Step ST2). The base materials S205 flow in a space surrounded with the bottom portion 20101a, the wall portion 20101b, and the projection portion 20102b.

FIG. 21 shows the results obtained by analyzing the relationship between the flow of the resin and the fiber orientation degree by simulation. FIG. 21 schematically shows how the orientation of the fiber tows 203 changes as the resin flows by illustrating one fiber tow 203 for example.

As shown in FIG. 21, in a state where the base materials 205 have not yet been pressed (Step ST11), each of the base materials 205 has a triangular shape. The plurality of fiber tows 203 contained in the base materials 205 are randomly oriented as described above. For Step ST11, a fiber tow 203 oriented in the first direction Dx is illustrated for example. In a case where the base materials 205 are pressed, the two base materials 205 are compressed and deformed such that they are brought close to each other. As a result, the end portions thereof come into contact with each other, and hence the resin merging portion 204 is formed (Step ST12). Furthermore, the two base materials 205 flow along the direction indicated by the arrow A1.

In a case where the base materials 205 are pressed (Step ST13 and Step ST14), the two base materials 205 flow along the direction indicated by the arrow A1, a plurality of flowing fluids of the base materials 205 is fused, and hence the resin merging portion 204 extends along the second direction Dy. At this time, the flow velocity of the base materials 205 in the vicinity of the resin merging portion 204 is higher than the flow velocity at a position distant from the resin merging portion 204. Therefore, the fiber tow 203 rotates along the resin merging portion 204 as the base materials 205 flow. Then, the base materials 205 fill up the mold 20100 (Step ST15). Consequently, as shown in Step ST14 and Step ST15, the fiber orientation degree in the vicinity of the resin merging portion 204 increases. Furthermore, on the outer periphery of the base materials 205, the base materials 205 flow along the wall portion 20101b (see FIGS. 19 and 20) in the vicinity of the side extending in the second direction Dy. Therefore, the fiber tow 203 rotates along the wall portion 20101b as the base materials 205 flow. Consequently, on the outer periphery of the base materials 205, the fiber orientation degree increases in the vicinity of the side extending in the second direction Dy.

Thereafter, the base materials 205 are kept in the mold 20100 for several minutes. As a result, the base materials 205 to which the shape of the mold 20100 has been transferred undergo a crosslinking reaction and are cured. Subsequently, the mold 20100 is opened. In this way, a cured molded substance 201 is obtained.

According to the method for manufacturing the molded substance 201 described above, the plurality of base materials 205 is spaced apart and arranged in the mold 20100 during molding. As a result, the base materials 205 flow along the resin merging portion 204, and the flow length of the base materials 205 increases. Consequently, as the resin flows, the fibers 2031 (fiber tows 203) are uniformly oriented along the direction in which the resin merging portion 204 extends. Therefore, the fiber orientation degree in the first region RS1 (see FIG. 13) increases. In a case where the fiber orientation degree increases in the vicinity of the resin merging portion 204, the fibers 2031 exhibit the same rotation behavior on the inside and outside of the molded substance 201. Accordingly, in a case where the method for manufacturing the molded substance 201 is used, the fiber orientation degrees are the same on the inside and outside, and it is possible to inhibit warpage from occurring along a direction in which the resin merging portion 204 extends in the first region RS1.

The molded substance 201 according to the second embodiment of the present invention can be manufactured, for example, by charging a molding die with a molding material such as SMC containing a resin and fibers such that a ratio R of the following fiber flow length to an average fiber length of the fibers falls into a range of 0.2 to 15.0 and performing heat press molding on the molding material.

The fiber flow length is a distance that the fibers of the molding material charged into the molding die move to reach a predetermined site at an edge or a resin merging portion of the molded article by heat press molding. The fiber flow length mentioned herein equals to a shortest distance between the edge of the molding material charged into the molding die and a portion corresponding to the resin merging portion plus a distance that the fibers move along the portion corresponding to the resin merging portion during molding so as to reach the aforementioned predetermined site.

In other words, in a case where P0 represents a position of fibers at an end portion of a molding material just charged into the molding die, P represents a position that the fibers reach after moving to an edge or a resin merging portion of the molding die from P0. L0-1 represents a distance between P0 and P1. P2 represents a position that the fibers reach after further moving along the edge or the resin merging portion of the molding die from the position P1 until the molding ends, and L1-2 represents a distance between P1 and P2, L0-1 plus L1-2 equals the fiber flow length.

The fiber flow length can be determined by preliminary test molding or resin flow simulation.

In a case where R is 0.2 or more, it is possible to sufficiently increase the fiber orientation degree f in the first region. Therefore, the warpage of the composite material molded article tends to be suppressed, and the mechanical characteristics of the composite material molded article tend to be improved. R is preferably 0.3 or more, more preferably 0.5 or more, even more preferably 0.8 or more, and particularly preferably 1.0 or more.

On the other hand, in a case where R is 15.0 or less, it is possible to reduce the variation in the distribution of fibers in the composite material molded article in the first region, and hence the occurrence of a defective portion tends to be suppressed. R is preferably 12.0 or less, more preferably 10.0 or less, even more preferably 9.0 or less, and particularly preferably 8.0 or less.

R is preferably 0.3 to 12.0 more preferably 0.5 to 10.0, even more preferably 0.8 to 9.0, and particularly preferably 1.0 to 8.0.

In another aspect, the ratio R is preferably 0.2 to 15.0, more preferably 0.3 to 12.0, even more preferably 0.5 to 10.0, particularly preferably 0.8 to 9.0, and most preferably 1.0 to 8.0.

The composite material molded article of the present invention can be manufactured, for example, by charging a molding die with a molding material such as SMC containing a resin and fibers such that a ratio r of the following moving distance to the average fiber length of the fibers falls into a range of 0.2 to 12.0 and performing heat press molding on the molding material.

The moving distance is the distance L1-2 that the fibers at the end portion of the molding material charged into the molding die move to reach the position P2 from the position P1.

The moving distance L1-2 can be determined by preliminary test molding or resin flow simulation.

The ratio r is preferably 0.2 to 12.0, more preferably 0.4 to 10.0, even more preferably 0.8 to 8.0, particularly preferably 1.0 to 6.0, and most preferably 1.2 to 4.0.

In a case where force is applied to the fibers from the resin flowing during molding, the fibers experience rotation and translation and tend to be oriented in the flow direction during molding. In the present invention, such a tendency is marked in a case where the fibers move along an edge or a resin merging portion of the molding die during molding.

Therefore, it is preferable that the fiber flow length includes the moving distance along the resin merging portion.

In a case where r represents a ratio of the moving distance to the average fiber length of the fibers, r is preferably within a range of 0.2 to 12.0, r is more preferably 0.4 to 10.0, even more preferably 0.8 to 8.0, particularly preferably 1.0 to 6.0, and most preferably 1.2 to 4.0.

In a case where r is 0.2 or more, it is possible to sufficiently increase the fiber orientation degree f in the first region, and hence the mechanical characteristics of the composite material molded article tends to be improved, r is more preferably 0.4 or more, eve more preferably 0.8 or more, particularly preferably 1.0 or more, and most preferably 1.2 or more.

On the other hand, in a case where r is 12.0 or less, it is possible to reduce the variation in the distribution of fibers in the composite material molded article in the first region, and hence the occurrence of a defective portion tends to be suppressed, r is more preferably 10.0 or less, even more preferably 8.0 or less, particularly more preferably 6.0 or less, and most preferably 4.0 or less.

Furthermore, the molded substance 201 according to the second embodiment of the present invention can be manufactured, for example, by a method of charging a molding die with a molding material such as SMC such that the charge rate becomes 10% to 80% and performing heat press molding on the molding material.

The charge rate is a ratio of the area of the molding material to the area of the molding die.

In a case where the charge rate is 80% or less, the molding material vigorously flows during molding, and the reinforcing fibers are more uniformly oriented toward the resin merging portion. As a result, the fiber orientation degree f in the first region RS1 of the molded substance 201 increases. The charge rate is preferably 70% or less, more preferably 60% or less, even more preferably 50% or less, particularly preferably 40% or less, and most preferably 35% or less.

On the other hand, in a case where the charge rate is 10% or more, it is easy for the molding material to spread over the entirety of the mold during molding. The charge rate is more preferably 15% or more, and even more preferably 20% or more.

The charge rate is preferably 10% to 70%, more preferably 10% to 60%, even more preferably 10% to 50%, particularly preferably 15% to 40%, and most preferably 20% to 35%.

The composite material molded article according to a third embodiment of the present invention is a composite material molded article using a molding material such as SMC containing a resin and fibers, in which in a case where an in-plane second direction of the surface of the composite material molded article is named 0° direction, a first direction orthogonal to the second direction is named 90° direction, a fiber orientation degree based on the 0° direction is measured for a plurality of sites along the first direction by X-ray diffraction such that a distribution of the fiber orientation degree $f_w$ in the first direction is obtained, and the distribution of the fiber orientation degree is approximated to a normal distribution, a full width at half maximum is 5 mm or more.

Furthermore, there is a weld line within the surface of the composite material molded article, and the second direction is a direction in which the weld line extends. In the present specification, in a case where the weld line is a straight line, the direction in which the weld line extends is a direction parallel to the weld line. In a case where the weld line is a curve, the direction in which the weld line extends is a tangential direction of the weld line.

Furthermore, the method for manufacturing a composite material molded article according to the third embodiment is a method for manufacturing a composite material molded article by charging a mold cavity with a molding material such as SMC containing a resin and fibers such that the following charge rate becomes 10% to 80%, and heating and pressing the molding material such that the molding material flows and merges from at least two directions in the cavity and a composite material molded article is molded.

Charge rate: a ratio of an area of the molding material to an area of the mold cavity.

(Molding Material)

The molding material contains a resin and fibers. Specifically, the molding material contains a matrix resin as a resin and short reinforcing fibers as fibers.

A thermoplastic resin or a thermosetting resin can be used as the matrix resin.

The thermoplastic resin is shaped by cooling and solidification without a chemical reaction, and thus can be molded within a short period of time. Therefore, the productivity is excellent. As such a thermoplastic resin, for example, it is possible to use a polyetheretherketone resin, a polyetherimide resin, polyamide (such as nylon 6 or nylon 66), polyolefin (such as polyethylene or polypropylene), modified polyolefin, polyester (such as polyethylene terephthalate or polybutylene terephthalate), polycarbonate, polyamideimide, polyphenylene oxide, a polysulfone, polyether sulfone, polystyrene, ABS, polyphenylene sulfide, liquid crystal polyester, and an acrylonitrile-styrene copolymer. Moreover, a mixture of these may also be used. Furthermore, a copolymerized substance such as nylon 6-nylon 66 copolymer nylon may also be used. Among these, the polypropylene resin can be preferably used.

Examples of the thermosetting resin include an epoxy resin, a phenol resin, an unsaturated polyester resin, a vinyl ester resin, a phenoxy resin, an alkyd resin, a urethane resin, a urea resin, a melamine resin, a maleimide resin, a cyanate resin, and the like. Among these, the epoxy resin, the unsaturated polyester resin, and the vinyl ester resin can be preferably used. In a case where these resins are used, the resins excellently flow during molding. As a result, the fiber orientation degree or tensile elastic modulus of the molded product can be controlled.

In addition, a flame retardant, a weatherproofness improver, other antioxidants, a heat stabilizer, an ultraviolet absorber, a plasticizer, a lubricant, a colorant, a compatibilizer, a conductive filler, and the like can be added to the molding material according to the characteristics required to the molded product.

One or more kinds of the above resins can be appropriately selected and used. In the present invention, as a molding material, a sheet molding compound (SMC) is suitable which contains an uncured thermosetting resin as a matrix resin and short reinforcing fibers as fibers.

On the other hand, in a case where a molding material is manufactured by dispersing reinforcing fiber tows impregnated in advance with a matrix resin on a matrix resin sheet, a thermoplastic resin is preferable as the matrix resin.

The reinforcing fibers that can be used as the above fibers are not particularly limited, and examples thereof include inorganic fibers, organic fibers, metal fibers, hybrid reinforcing fibers obtained by combining these, and the like.

Examples of the inorganic fiber include carbon fiber, graphite fiber, silicon carbide fiber, alumina fiber, tungsten carbide fiber, boron fiber, glass fiber, and the like. Examples of the carbon fibers include polyacrylonitrile (PAN)-based carbon fibers, rayon-based carbon fibers, pitch-based carbon fibers, and the like. Examples of the organic fibers include aramid fibers, high-density polyethylene fibers, other general nylon fibers, polyester fibers, and the like. Examples of the metal fibers include fibers of stainless steel, iron, and the like. Examples of the hybrid reinforcing fibers include metal-coated carbon fibers. One kind of reinforcing fibers may be used singly, or two or more kinds of reinforcing fibers may be used in combination.

Considering the mechanical properties of the composite material molded article such as strength, the carbon fibers are preferable among the above.

The average fiber length of the fibers used in the molding material is preferably 5 to 100 mm, more preferably 10 to 75 mm, and further preferably 20 to 60 mm. In a case where the average fiber length is equal to or greater than the lower limit described above, a composite material molded article having excellent mechanical properties such as tensile strength and elastic modulus is obtained. In a case where the average fiber length is equal to or smaller than the upper limit described above, the molding material more easily flows during molding. Therefore, it is easy to mold the molding material.

Typically, the fibers are used in the form of reinforcing fiber tows obtained by bundling up a plurality of reinforcing fibers. Generally, the reinforcing fiber tows are obtained by cutting a reinforcing fiber tow made of continuous reinforcing fiber in a predetermined length. For example, in a case where carbon fiber tows are used, the number of filaments constituting each reinforcing fiber tow is generally about 1,000 to 60,000.

The content of the reinforcing fibers in the molding material such as SMC can be appropriately selected according to the fluidity of the molding material, the performance required to the composite material molded article, and the like. The greater the content of the reinforcing fibers is, the further the reinforcing fibers exhibit a sufficient reinforcing effect, and the mechanical strength of the composite material molded article tends to be improved. Furthermore, the smaller the content of the reinforcing fibers is, the better the fluidity of the molding material tends to be during molding.

In a case where carbon fibers are used as reinforcing fibers, the content of the carbon fibers is, for example, 20% to 60% by mass with respect to the total mass of the molding material.

(Composite Material Molded Article)

The composite material molded article of the present invention is a molded article using a molding material such as SMC.

The composite material molded article of the present invention is typically a press-molded article of SMC.

The shape of the composite material molded article of the present invention is not particularly limited and may be, for example, a sheet shape, a shape having portions with different thicknesses, a shape having ribs or bosses, and the like.

Typically, there is a weld line within the surface of the composite material molded article of the present invention.

The weld line is a merging portion that looks like a line, which is formed by the merging of molding materials such as SMC flowing in a mold cavity from two directions during molding.

For example, during press molding, in a case where the molding material with which the mold cavity is charged is caused to flow by heating and pressing such that the flows merge together from at least two directions in the cavity, the weld line is formed. Where the weld line is present may be visually recognized, or may be estimated from the charging pattern of the molding material in the cavity, mathematically or by using simulation or the like.

The following full width at half maximum of the composite material molded article of the present invention is 5 mm or more.

Full width at half maximum: in a case where a second direction within the surface of the composite material molded article is named 0° direction, a first direction orthogonal to the second direction is named 90° direction, a fiber orientation degree (hereinafter, also referred to as fiber orientation degree $f_w$) based on the 0° direction is measured for a plurality of sites along the first direction by X-ray diffraction such that a distribution of the fiber orientation degree $f_w$ in the first direction is obtained, and the distribution of the fiber orientation degree $f_w$ is approximated to a normal distribution, a full width at half maximum is determined.

In a case where the weld line is within the surface of the composite material molded article, the direction in which the weld line extends is the second direction.

Conventionally, in the vicinity of the weld line of a composite material molded article using SMC or the like, reinforcing fibers are oriented along the weld line. Therefore, unfortunately, the mechanical strength in a direction (first direction) orthogonal to the weld line is lower than the mechanical strength in the direction (second direction) in which the weld line extends. In addition, unfortunately, due to the weld line, an appearance defect occurs.

In the present invention, the full width at half maximum is 5 mm or more. Therefore, even though the molded article has a weld line, the mechanical strength in the direction orthogonal to the weld line is extremely excellent. Furthermore, the weld line is unnoticeable, and the molded article looks good.

In reality, the weld line in the composite material molded article using SMC is observed not as "line" but as portion having a certain width. The width greatly affects the mechanical characteristics or the appearance defect.

The full width at half maximum is an index of the width of a region having a relatively high fiber orientation degree in the direction orthogonal to the weld line. It can be said that the full width at half maximum is an index of the width of a weld line.

According to the study of the inventors of the present invention, the greater the full width at half maximum is, the further the decrease in mechanical strength in the direction orthogonal to the weld line is inhibited, and as a result, the mechanical strength of the composite material molded article is excellent in both the direction in which the weld line extends and direction orthogonal to the weld line. Furthermore, the greater the full width at half maximum is, the greater the width of the weld line is. As a result, the weld line is hardly noticed, and the molded article looks good.

On the other hand, in a case where the full width at half maximum is less than 5 mm, reinforcing fibers are highly oriented in a narrow region along the direction in which the weld line extends. Therefore, in a case where tensile strength in the direction orthogonal to the weld line is measured, stress is concentrated on the weld line, and fracture starts from the weld line.

The full width at half maximum is preferably 5 mm or more, more preferably 20 mm or more, even more preferably 40 mm or more, still more preferably 100 mm or more, particularly preferably 200 mm or more, and most preferably 1,000 mm or more.

Furthermore, the full width at half maximum is preferably less than 10.000 mm, more preferably less than 8.000 mm, even more preferably less than 6,000 mm, still more preferably less than 4,000 mm, particularly preferably less than 3,000 mm, and most preferably less than 2,000 mm.

Specifically, the full width at half maximum may be 5 mm or more and less than 10,000 mm, preferably 20 mm or more and less than 8,000 mm, more preferably 40 mm or more and 6,000 mm or less, even more preferably 100 mm or more and 4,000 mm or less, particularly preferably 200 mm or more and 3,000 mm or less, and most preferably 1,000 mm or more and less than 2,000 mm.

In a composite material molded article having no weld line, in a case where the distribution of the fiber orientation degree $f_w$ is obtained from a certain site extending 50 mm in a straight line and the full width at half maximum is calculated, the full width at half maximum is 1,000 mm or more. That is, in a case where the full width at half maximum is 1,000 mm or more, the presence of the weld line is negligible.

On the other hand, in order to obtain a composite material molded article having a full width at half maximum 10,000 mm or more, it is necessary to newly develop a technique of uniformly dispersing reinforcing fibers to a high extent at the stage of a molding material such as SMC or a technique of precisely designing a mold based on flow simulation, which leads to the problem of increase in development cost. In view of making it possible to reduce the development cost, the full width at half maximum may be less than 10,000 mm, and is preferably less than 2,000 mm.

The full width at half maximum can be adjusted by the charge rate, charging pattern, and the like in the manufacturing method which will be described later. In a case where SMCs merge together from two directions, the smaller the merging angle is which is the angle of the merging portion, the greater the full width at half maximum tends to be.

The fiber orientation degree f is a value obtained from a diffraction image (Debye ring) formed in a case where a composite material molded article is irradiated with X-rays as described in PCT International Publication No. WO2016/208731. The fiber orientation degree f is calculated from the following Equations (1), (2), and (3) by detecting an X-ray diffracted at a diffraction angle 2θ of 25.4°.

$$f = 2a - 1 \tag{1}$$

$$a = \frac{\sum_{i=1}^{N} I(\Phi_i)\cos^2\Phi_i}{\sum_{i=1}^{N} I(\Phi_i)} \tag{2}$$

$$\int_0^{360} I(\Phi)d\Phi = \sum_{i=2}^{N}(I(\Phi_i) + I(\Phi_{i-1})) \times d\Phi \times \frac{1}{2} = 10000 \tag{3}$$

In Equation (1), a is a coefficient of orientation expressed by Equation (2). $I(\varphi_i)$ is a luminance (diffraction intensity) at an i-th rotation angle $(\varphi_i)$ in the X-ray diffraction, and is normalized such that an integrated intensity expressed by Equation (3) becomes 10,000. Furthermore, N in Equation (3) is the number of measurement points. The number of measurement points is a value obtained by dividing 360 (°) by a step size (°) that is an angle by which a cured product as a measurement target is rotated whenever the X-ray diffraction is measured. dφ in the same equation represents a micro-region of the rotation angle around the cured product as a measurement target. Herein, dφ equals the value of the step size.

Specifically, the distribution of the fiber orientation degree f in the first direction is measured by the following method.

A test piece is cut out from the composite material molded article along the first direction, and the obtained test piece is cut into n pieces of equal parts in the first direction, thereby preparing n pieces of evaluation samples. n is an integer 5 or more. Then, for each of the evaluation samples, the fiber orientation degree f is determined by the following procedure.

While being irradiated with X-rays from an X-ray device by a transmission method, the evaluation sample is rotated around an axis that is the thickness direction of the evaluation sample, a diffracted X-ray is captured using a detector disposed at a diffraction angle 2θ=25.4° and a luminance $(I(\varphi_i))$ at an i-th rotation angle $(\varphi_i)$ is measured. $(\varphi_i)$ is normalized such that the integrated intensity expressed by Equation (3) becomes 10,000. Furthermore, φ=0° is the second direction, and p=90° is the first direction. The conditions for capturing the diffracted X-ray are as described in Examples which will be described later. Then, by using the measured $I(\varphi_i)$, a coefficient a of orientation is calculated by Equation (2). Furthermore, by using the obtained coefficient a of orientation, the fiber orientation degree f is calculated by Equation (1).

A first direction center position (mm) of each evaluation sample that is determined in a case where the position of one end of the test piece in the first direction is denoted as 0 mm is plotted on the horizontal axis, and the fiber orientation degree f of each evaluation sample is plotted on the vertical axis, thereby obtaining the distribution of the fiber orientation degree f in the first direction.

The distribution of the fiber orientation degree f is approximated to normal distribution, and the full width at half maximum of the obtained normal distribution, that is, the width (mm) at the fiber orientation degree f that is ½ of the maximum value is calculated. The approximation to the normal distribution and the calculation of the full width at half maximum can be performed using fitting software.

For 4 test pieces cut out from different positions in the second direction, the full width at half maximum is calculated in the same manner as that described above, and the average thereof is adopted as the full width at half maximum of the composite material molded article.

The width (length in the second direction) of the test piece is, for example, about 10 mm.

The length (length in the first direction) of the test piece is preferably 50 mm or more.

In order to approximate the distribution of fiber orientation degree to normal distribution, the value of n, that is, the number of measurement points in the first direction, is preferably 5 or more. The value of n is preferably set such that the length of each evaluation sample in the first direction, that is, the distance between adjacent measurement points becomes 5 to 10 mm.

In a case where there is a weld line within the surface of the composite material molded article, it is preferable to cut out the test piece such that the weld line is positioned at the central portion of the test piece in the first direction.

In a case where the fiber orientation degree f is associated with tensile strength, the test piece for measuring the fiber orientation degree f may be cut out from a test piece used for a tensile test. In a case where the site at which the fiber orientation degree f is to be measured is broken, the shape of the site is disturbed, and hence the fiber orientation degree f cannot be measured, the fiber orientation degree f measured in the vicinity of the site can be used instead.

The fiber orientation degree f that is higher than 0 tells that the reinforcing fibers are oriented in the second direction. The fiber orientation degree f that is equal to 0 tells that the reinforcing fibers are isotropically dispersed. The fiber orientation degree f that is lower than 0 tells that the reinforcing fibers are oriented in the first direction.

In a case where it is desired to obtain mechanical characteristics in the second direction, in the distribution of the fiber orientation degree f of the composite material molded article, the fiber orientation degree f in each portion in the second direction is preferably within a range of 0.1 to 0.6, and more preferably within a range of 0.2 to 0.4. However, the average of the fiber orientation degree f in the second direction may be within the above range.

(Method for Manufacturing Composite Material Molded Article)

The composite material molded article according to the third embodiment of the present invention can be manufactured, for example, by a method of molding a composite material molded article by charging a mold cavity with SMC such that a charge rate becomes 10% to 80% and heating and pressing SMC such that SMC flows to merge together from at least two direction in the cavity.

The charge rate is the ratio of the area of SMC to the area of the mold cavity.

In a case where the charge rate is 80% or less, it is possible to mold a member that takes advantage of the fluidity of SMC. In a case where the charge rate is higher than 80%, it is difficult to precisely dispose SMC in the mold cavity. The charge rate is more preferably 75% or less, and even more preferably 70% or less.

On the other hand, in a case where the charge rate is 10% or more, SMC is easily spread on the entirety of the cavity during molding. The charge rate is more preferably 20% or more, and even more preferably 30% or more. The charge rate is particularly preferably 25% or more.

The charge rate is preferably 10% to 80%, more preferably 15% to 75%, even more preferably 20% to 75%, and particularly preferably 25% to 70%.

The composite material molded article according to the third embodiment of the present invention can be manufactured, for example, by charging a molding die with a molding material such as SMC containing a resin and fibers such that a ratio R of the following fiber flow length to an average fiber length of the fibers falls into a range of 0.2 to 15.0 and molding SMC by heat press molding.

The fiber flow length is a distance that the fibers of the molding material charged into the molding die move to reach a predetermined site at an edge or a resin merging portion of the molded article by heat press molding. The fiber flow length mentioned herein equals to a shortest distance between the edge of the molding material charged into the molding die and a portion (weld line) corresponding to the resin merging portion plus a distance that the fibers move along the portion corresponding to the resin merging portion during molding so as to reach the aforementioned predetermined site.

In other words, in a case where P0 represents a position of fibers at an end portion of a molding material just charged into the molding die, P1 represents a position that the fibers reach after moving to an edge or a portion corresponding to a resin merging portion of the molding die from P0, L0-1 represents a distance between P0 and P1. P2 represents a position that the fibers reach after further moving along the edge or the portion corresponding to the resin merging portion of the molding die from the position P1 until the molding ends, and L1-2 represents a distance between P1 and P2, L0-1 plus L1-2 equals the fiber flow length.

The fiber flow length can be determined by preliminary test molding or resin flow simulation.

In a case where R is 0.2 or more, it is possible to sufficiently increase the fiber orientation degree f in the first direction or weld line or in a region including the vicinity of these. As a result, the mechanical strength of the composite material molded article tends to be improved. R is preferably 0.3 or more, more preferably 0.5 or more, even more preferably 0.8 or more, and particularly preferably 1.0 or more.

On the other hand, in a case where R is 15.0 or less, it is possible to reduce the variation in the distribution of fibers in the composite material molded article in the above region, and hence the occurrence of a defective portion tends to be suppressed. R is preferably 12.0 or less, more preferably 10.0 or less, even more preferably 9.0 or less, and particularly preferably 8.0 or less.

R is preferably 0.3 to 12.0, more preferably 0.5 to 10.0, even more preferably 0.8 to 9.0, and particularly preferably 1.0 to 8.0.

In another aspect, the ratio R is preferably 0.2 to 15.0, more preferably 0.3 to 12.0, even more preferably 0.5 to 10.0, particularly preferably 0.8 to 9.0, and most preferably 1.0 to 8.0.

The composite material molded article of the present invention can be manufactured, for example, by charging a molding die with a molding material such as SMC containing a resin and fibers such that a ratio r of the following moving distance to the average fiber length of the fibers falls into a range of 0.2 to 12.0 and performing heat press molding on the molding material.

The moving distance is the distance L1-2 that the fibers at the end portion of the molding material charged into the molding die move to reach the position P2 from the position P1.

The moving distance L1-2 can be determined by preliminary test molding or resin flow simulation.

In a case where force is applied to the fibers from the resin flowing during molding, the fibers experience rotation and translation and tend to be oriented in the flow direction during molding. In the present invention, such a tendency is marked in a case where the fibers move along an edge or a portion (weld line) corresponding to a resin merging portion of the molding die during molding.

Therefore, it is preferable that the fiber flow length includes the moving distance along the portion (weld line) corresponding to the resin merging portion.

In a case where r represents a ratio of the moving distance to the average fiber length of the fibers, r is preferably within a range of 0.2 to 12.0, r is more preferably 0.4 to 10.0, even more preferably 0.8 to 8.0, particularly preferably 1.0 to 6.0, and most preferably 1.2 to 4.0.

In a case where r is 0.2 or more, it is possible to sufficiently increase the fiber orientation degree f in the above region, and hence the mechanical characteristics of the composite material molded article tends to be improved, r is more preferably 0.4 or more, eve more preferably 0.8 or more, particularly preferably 1.0 or more, and most preferably 1.2 or more.

On the other hand, in a case where r is 12.0 or less, it is possible to reduce the variation in the distribution of fibers in the composite material molded article in the above region, and hence the occurrence of a defective portion tends to be suppressed, r is more preferably 10.0 or less, even more preferably 8.0 or less, particularly more preferably 6.0 or less, and most preferably 4.0 or less.

As the mold, a mold is used which has a cavity in the shape that conforms to the composite material molded article.

The shape of the cavity, that is, the shape of the composite material molded article is preferably rectangular (such as a square or rectangle) in plan view. However, the shape of the cavity is not limited thereto and may be any shape.

The molding material such as SMC may be manufactured by a known manufacturing method or may be a commercially available material.

The SMC manufacturing method is widely known. For example, SMC can be manufactured with reference to PCT International Publication No. WO2016/208731.

The area (size in plan view) of SMC is set according to the charge rate during molding.

The cavity may be charged with one sheet of SMC or two or more sheets of SMC.

SMC can be made flow to merge together from at least two directions in the cavity, for example, by a method of charging a plurality of sites in the cavity with SMC, a method of charging the cavity with SMC in a shape (such as an approximately L-shape or an approximately V-shape) with periphery having a bent portion such as notch that is recessed inwards in plan view, a method of using a mold in which pins are provided on the inside of the cavity, and the like.

In a case where there are pins on the inside of the cavity, the flowing SMC branches at the pins and merges together after flowing over the pins. In a case where there are pins on the inside of the cavity, the obtained composite material molded article have holes in shape conforming to the pins.

In a case where a plurality of sites in the cavity is charged with SMC or in a case where the cavity is charged with SMC in a shape with periphery having the aforementioned bent portion in plan view, it is preferable that the charging pattern is set such that a merging angle at which SMCs merge together from two directions during molding is greater than 0° (for example, 40° to 70°). In a case where the charging pattern is set as described above, the full width at half maximum increases. Examples of such a charging pattern include a pattern in which an angle greater than 0° is formed between two leading end sides of SMCs in two directions along the flow direction as shown in FIGS. 29B and 29C.

However, the charging pattern in the present invention is not limited thereto. The point of the present invention is to obtain a composite material molded article having excellent mechanical strength even though the merging angle is 0°.

Examples of the molding conditions include conditions under which the molding material is heated and pressed at a mold temperature of 140° C. for 3 minutes under a pressure of 8 MPa and conditions equivalent to the above conditions.

In the composite material molded article of the present invention described above, the full width at half maximum is 5 mm or more. Therefore, the composite material molded article has excellent mechanical strength even though the molded article has a weld line. In addition, the composite material molded article looks beautiful even though the molded article has a weld line.

In order to measure the mechanical strength (such as tensile strength or flexural strength) of the composite material molded article, a test piece may be cut out from the composite material molded article by using a wet cutter or the like, and the tensile strength thereof may be evaluated using a universal testing machine.

In order to investigate the influence of the weld line on the mechanical strength, in determining the full width at half maximum, the test piece may be cut out such that the test piece includes a weld line at the center. Furthermore, by dividing the mechanical strength of the test piece by the mechanical strength obtained in a case where no weld line is in the test piece, a mechanical characteristic retention rate can be determined. As the mechanical strength obtained in a case where no weld line is in the test piece, it is possible to use the mechanical strength of a composite material molded article that is molded under the same molding conditions as those described above except that the mold cavity is charged with SMC without a gap (charge rate: 100%).

The influence of the weld line on the appearance of the composite material molded article can be investigated by visually observing the surface of the molded article using SMC.

It is considered that in a case where a weld line is in a composite material molded article, the mechanical strength of the molded article may be reduced. According to the present invention, a tensile strength retention rate 40% or more and 60% or more can be obtained in a direction orthogonal to such a weld line.

EXAMPLES

Hereinafter, the present invention will be more specifically described based on examples, but the present invention is not limited to the examples. For example, the shape of a mold, molding temperature, pressure, and the like used for manufacturing a composite material molded article are not limited to those used in the examples. For instance, the composite material molded article is not necessarily in the form of a square or rectangle in plan view. The present invention is also effective for composite material molded articles in any shape. The same shall be applied to the shape of the mold used for manufacturing a composite material molded article. For example, it is possible to use molds which produce molded articles such as the molded article having a rib shown in FIG. 4, the curved molded article shown in FIG. 5, and the bolt-shaped molded article shown in FIG. 6. In addition, other various shapes can be adopted. Among these, a flat plate-shaped molded article shown in FIG. 1 is preferable.

<SMC>

Molding material A: trade name "STR120N131-KA6N" (manufactured by Mitsubishi Chemical Corporation).

<Preparation of Composite Material Molded Article Using SMC>

A 296 mm (length)×2% mm (width)×2 mm (thickness) mold was prepared.

Figure 7:
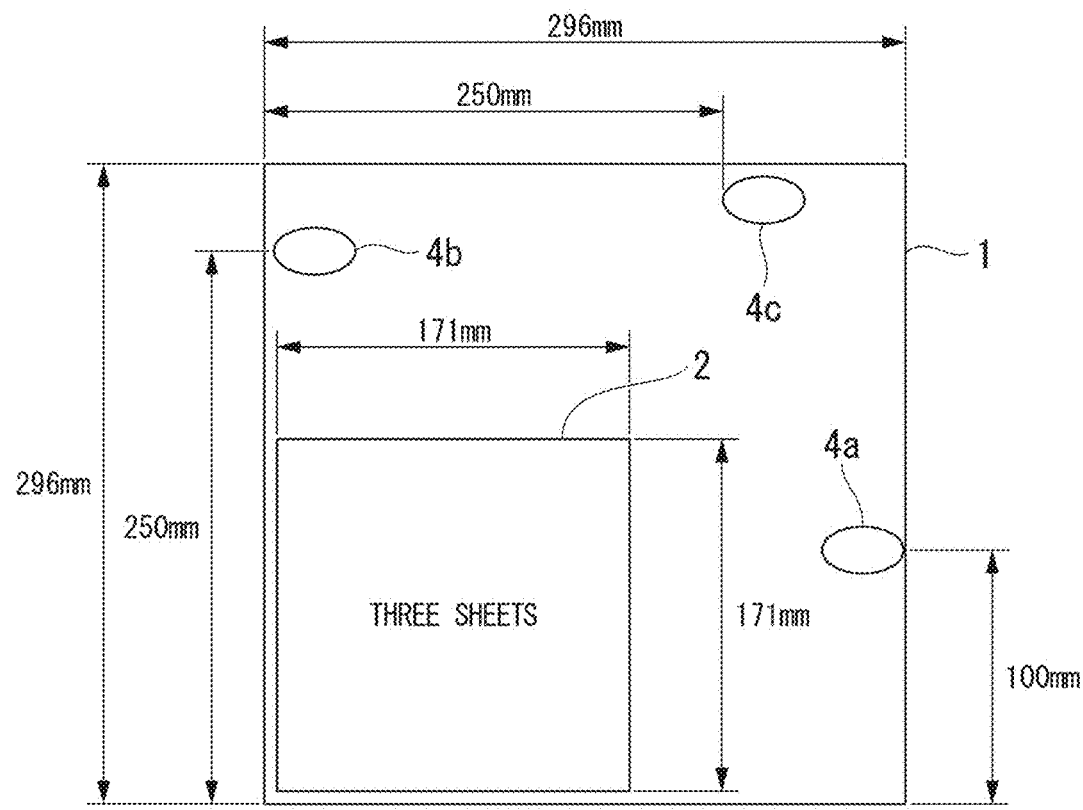
FIG. 7 is a schematic view illustrating an SMC charging method (charge rate to mold area: 33%) in Example 1.

In Production Example 1, the molding material A (SMC) was cut in a size (171 mm (length)×171 mm (width)) such that a charge rate became 33%, three sheets of the cut SMC (236 g in total) were laminated and disposed at one corner of a mold 100 as shown in FIG. 7 such that a gap having a length of about several millimeters was made between the mold and the laminate, and the molding material was molded under the following molding conditions, thereby obtaining a composite material molded article.

Figure 8:
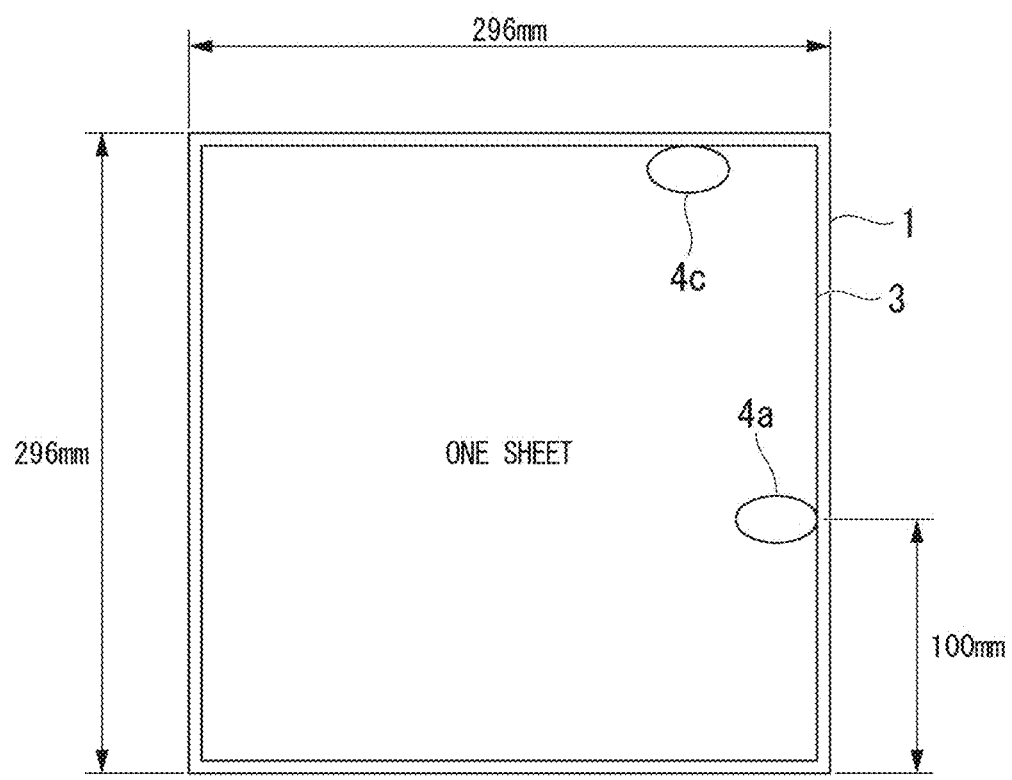
FIG. 8 is a schematic view illustrating an SMC charging method (charge rate to mold area: 96%) in Comparative Example 1.

In Production Example 2, the molding material A (SMC) was cut in a size such that a charge rate became 96%, one sheet of the cut SMC (236 g) was disposed at the center of the mold 100 as shown in FIG. 8 and molded under the following molding conditions, thereby obtaining a composite material molded article.

Figure 9:
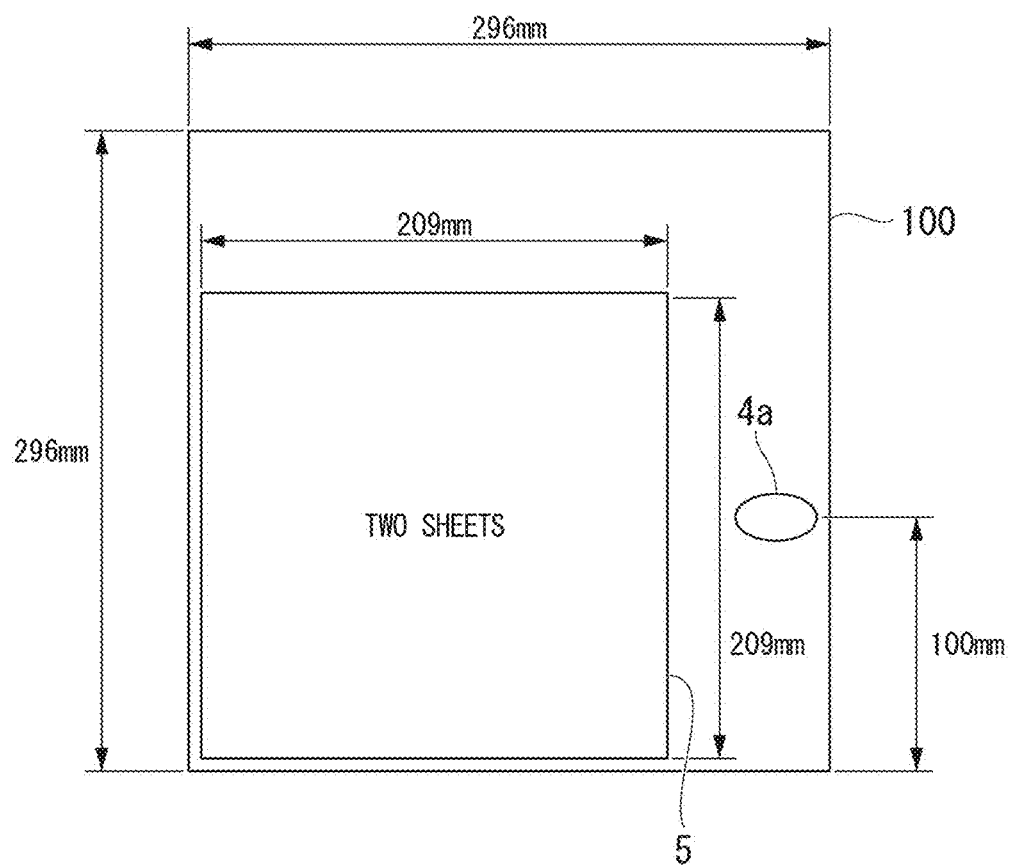
FIG. 9 is a schematic view illustrating an SMC charging method (charge rate to mold area: 49%) in Example 2.

In Production Example 3, a composite material molded article was obtained in the same manner as in Production Example 1, except that the molding material A (SMC) was cut in a size such that a charge rate became 49%, and two sheets of cut SMC (236 g in total) were laminated as shown in FIG. 9.

(Molding Conditions)
Mold temperature: 140° C.
Pressure: 8 MPa
Pressing time: 3 minutes <Measurement of Fiber Orientation Degree>

From the end portions of each of the obtained composite material molded articles, the portions corresponding to the positions indicated by the references 4a to 4c in FIGS. 7 to 9 were cut out in a size of about 1 cm (length)×1 cm (width) by using a metal cutter, thereby obtaining test pieces for measuring the fiber orientation degree f. In each of the obtained test pieces, for four sites separated from a lateral face of the test piece by different distances, the fiber orientation degree f was measured according to the following procedure by using the following measurement device. The four points are on a straight line extending along a vertical line perpendicular to the lateral face.

While a predetermined measurement range in each test piece was being irradiated with X-rays by a transmission method, the test piece was rotated around an axis that is the thickness direction of the test piece, a diffracted X-ray was captured under the following measurement conditions, and a luminance ($I(\varphi_i)$ at an i-th rotation angle ($\varphi_i$) was measured. $I(\varphi_i)$ was normalized such that the integrated intensity expressed by Equation (3) became 10,000. Then, by using the measured $I(\varphi_i)$, a coefficient a of orientation was calculated by Equation (2). Furthermore, by using the obtained coefficient a of orientation, the fiber orientation degree f was calculated by Equation (1).

(Measurement Device)
X-ray diffractometer: Empyrean (manufactured by Malvern Panalytical Ltd.)

(Measurement Conditions)
Scan range (°): 0.00-359.60
Step size (°): 0.40
Integration time/1 step (s): 4.0)
2θ(0): 25.4
Voltage (kV): 45
Current (mA): 40

(Filter)
Beta-filter Nickel
Material: Ni
Thickness (mm): 0.02
Micro gauge aperture (mm): 0.5

Table 1 shows the measurement results including the measurement positions (mm) of the four sites in the test piece, the measurement range of each of the measurement positions (distance (mm) from the lateral face), the fiber orientation degree f at each of the measurement sites, and the average of the fiber orientation degree f. Herein, the measurement position is defined as a point closest to the lateral face of the first end portion in the region irradiated with X-rays. In Example 1 and Comparative Example 1, the measurement positions 0 mm and 7 mm can be regarded as both end portions of a straight line extending along the vertical line described above, and a region ranging from the measurement position 0 mm to the measurement position 7 mm corresponds to the region A. In Example 2, the measurement positions 0 mm and 6 mm can be regarded as both end portions of a straight line extending along the vertical line described above, and a region ranging from the measurement position 0 mm to the measurement position 6 mm corresponds to the region A. In Examples 3 and 4, a region ranging from the measurement position 0 mm to a measurement position 8 mm corresponds to the region A. In Comparative Example 2, a region ranging from the measurement position 0 mm to a measurement position 7.5 mm corresponds to the region A.

Figure 10:
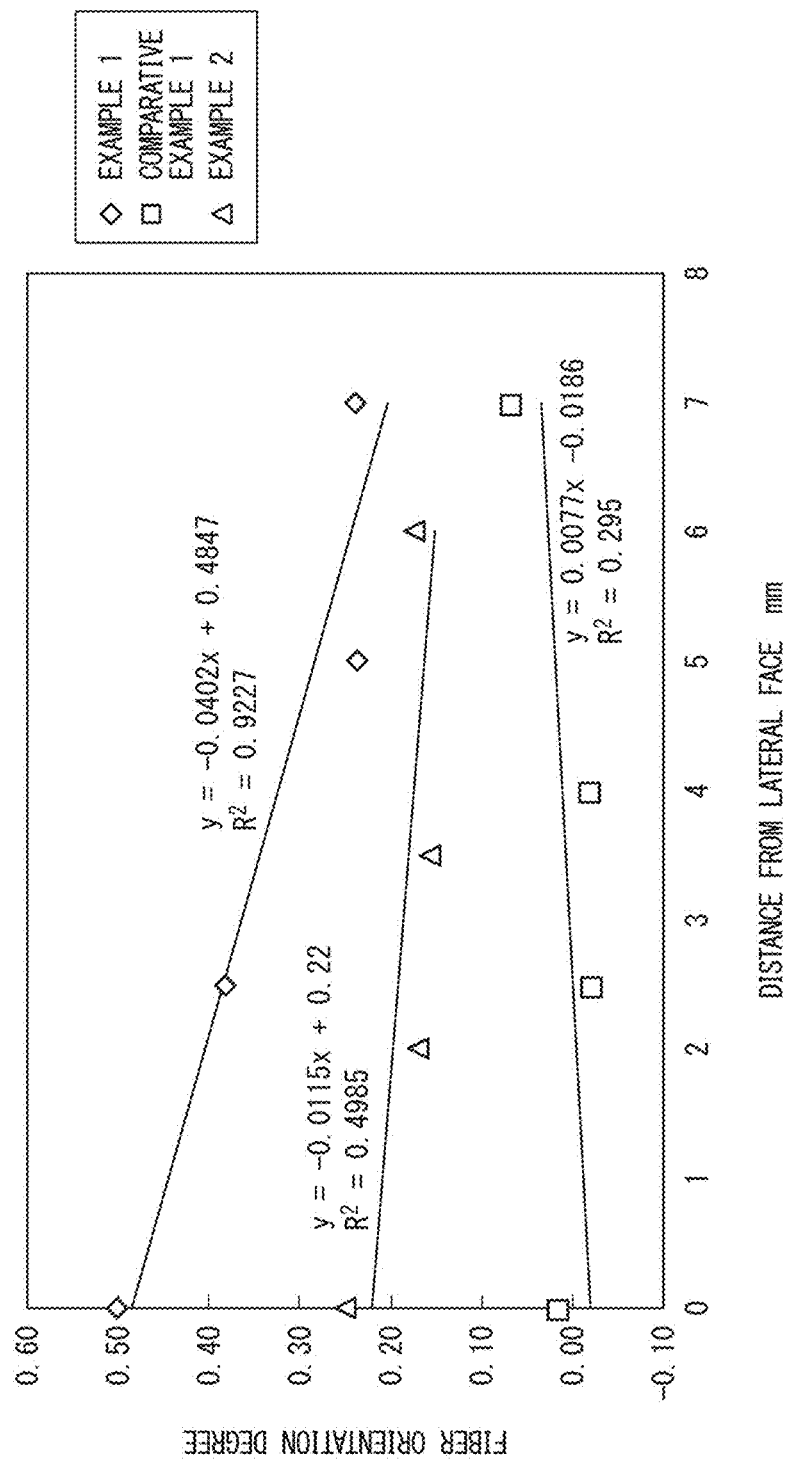
FIG. 10 is a graph showing the relationship between a fiber orientation degree f and a distance from a lateral face of a first end portion in composite material molded articles obtained in Examples 1 and 2 and Comparative Example 1.
Figure 11:
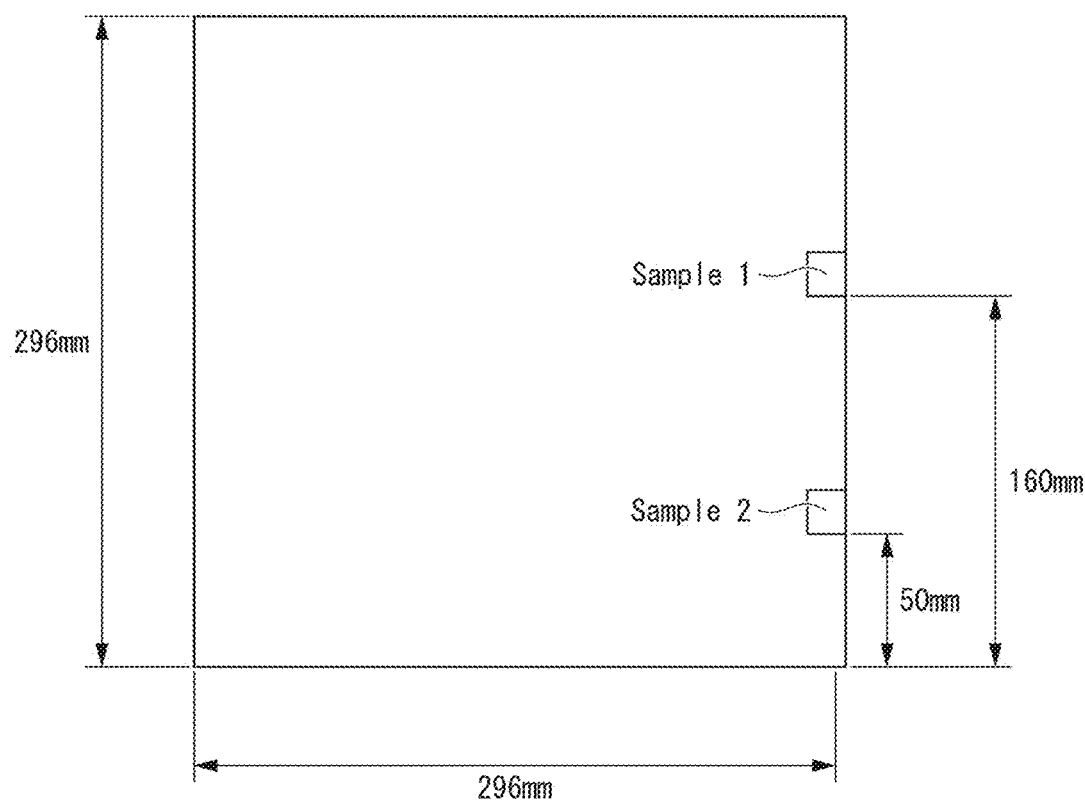
FIG. 11 is a view showing sampling positions where samples for impact resistance test are obtained from the composite material molded articles of Examples 1 and 2 and Comparative Example 1.

FIG. 10 is a graph created by plotting the measurement positions (mm) in Examples 1 and 2 and Comparative Example 1 on the horizontal axis (x axis) and plotting the fiber orientation degree f on the vertical axis (y axis). FIG. 10 also shows linear functions obtained from this graph by linear approximation. $R^2$ represents a coefficient of determination.

<Method of Calculating R and r>

The fiber flow length used for calculating R is a distance that the fibers of the molding material (SMC) charged into the mold move to reach a predetermined site at an edge or a resin merging portion of the molded article by heat press molding. The fiber flow length mentioned herein equals to a shortest distance between the edge of the molding material charged into the molding die and the edge of the molding die plus a distance that the fibers move along the edge of the molding die during molding so as to reach the aforementioned predetermined site.

The distance that the fibers move along the edge of the molding die until reaching a predetermined site during molding, which is necessary for calculating r, was calculated by expressing a space that is between a lower mold and an upper mold in an actual process of molding a molding material as a factor called Euler mesh by using resin flow simulation software 3DTIMON (manufactured by TORAY ENGINEERING Co., Ltd), and predicting a flow behavior exhibited in a case where the molding material is disposed in the space and then subjected to compression molding until the molding material becomes a molded article having the shape of the upper and lower molds closed.

<Evaluation of Mechanical Properties (Impact Resistance)>

As the mechanical properties of the composite material molded article, impact resistance was evaluated by the following procedure. The results are shown in Table 2.

Figure 12:
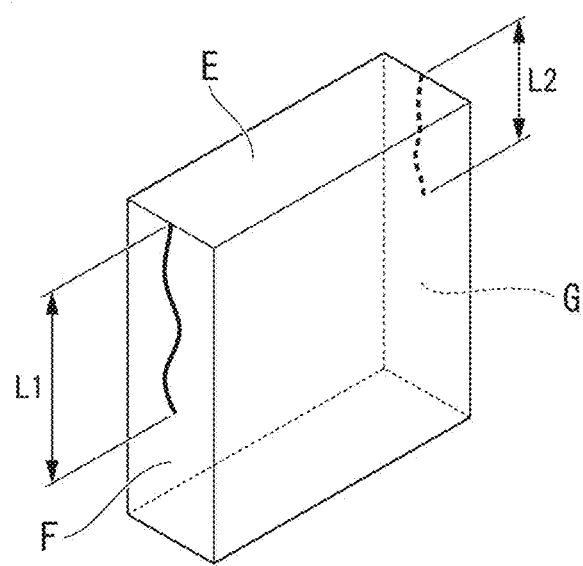
FIG. 12 is a schematic view showing a sample having undergone the impact resistance test, in which E represents a surface on which impact is exerted, F and G represent lateral surfaces adjacent to E, and L1 and L2 represent a length as a component of cracks in a direction perpendicular to a thickness direction.

Impact resistance test: a 1.5 cm (length)×1.5 cm (width)×2 mm (thickness) sample of the composite material molded article was cut out from the sites shown in Table 2. As shown in FIG. 12, each sample was fixed to the floor such that a face E as a lateral face of the composite material molded article faced up, and an iron ball weighing 508 g was allowed to hit the face E by performing free-fall from a position 69.5 cm directly above the face E of each sample.

Evaluation method: as shown in FIG. 12, whether cracks occurred on lateral faces F and G adjacent to the face E at both sides of the face E (face on which impact was exerted) of each sample in the longitudinal direction was visually observed. Furthermore, L1 and L2 (mm) as lengths of the cracks that occurred within the lateral faces F and G in the direction perpendicular to the face E were mad, and the sum (L1+L2) thereof was determined and used as an index of impact resistance. In a case where L+L2 equals 0 (mm), it tells that no crack occurred.

The value of (L1+L2) in each sample is shown in Table 2. From these results, the impact resistance was evaluated based on the following standard.

A: L1+L2 is 20 or less.
B: L1+L2 is greater than 20.

TABLE 1

| | Charge rate (%) | Location | R | r | Measurement position (mm) | Measurement range [distance from lateral face (mm)] | Fiber orientation degree f | Average of f |
|---|---|---|---|---|---|---|---|---|
| Example 1 | 33 (Production Example 1) | 4a (FIG. 7) | 6.1 | 1.2 | 0 | 0-2.0 | 0.50 | 0.34 |
| | | | | | 2.5 | 2.5-4.5 | 0.38 | |
| | | | | | 5 | 5.0-7.0 | 0.24 | |
| | | | | | 7 | 7.0-9.0 | 0.24 | |
| Example 2 | 49 (Production Example 3) | 4a (FIG. 9) | 4.4 | 1.0 | 0 | 0-2.0 | 0.25 | 0.19 |
| | | | | | 2 | 2.0-4.0 | 0.17 | |
| | | | | | 3.5 | 3.5-5.5 | 0.16 | |
| | | | | | 6 | 6.0-8.0 | 0.17 | |
| Example 3 | 33 (Production Example 1) | 4b (FIG. 7) | 4.7 | 4.7 | 0 | 0-2.0 | 0.32 | 0.27 |
| | | | | | 3 | 3.0-5.0 | 0.29 | |
| | | | | | 6 | 6.0-8.0 | 0.26 | |
| | | | | | 8 | 8.0-10.0 | 0.19 | |
| Example 4 | 33 (Production Example 1) | 4c (FIG. 7) | 8.9 | 3.9 | 0 | 0-2.0 | 0.27 | 0.14 |
| | | | | | 2 | 2.0-4.0 | 0.09 | |
| | | | | | 4 | 4.0-6.0 | 0.18 | |
| | | | | | 8 | 8.0-10.0 | 0.03 | |
| Comparative Example 1 | 96 (Production Example 2) | 4a (FIG. 8) | 0.1 | 0.0 | 0 | 0-2.0 | 0.01 | 0.01 |
| | | | | | 2.5 | 2.5-4.5 | −0.02 | |
| | | | | | 4 | 4.0-6.0 | −0.02 | |
| | | | | | 7 | 7.0-9.0 | 0.06 | |
| Comparative Example 2 | 96 (Production Example 2) | 4c (FIG. 8) | 0.1 | 0.0 | 0 | 0-2.0 | 0.00 | −0.02 |
| | | | | | 2.5 | 2.5-4.5 | −0.05 | |
| | | | | | 5.5 | 5.5-7.5 | −0.05 | |
| | | | | | 7.5 | 7.5-9.5 | 0.04 | |

TABLE 2

| | Production Example | Location | R | r | L1 + L2 (mm) | Impact resistance |
|---|---|---|---|---|---|---|
| Example 3 | 1 | 4b (FIG. 7) | 4.7 | 4.7 | 10 | A |
| Example 4 | 1 | 4c (FIG. 7) | 8.9 | 3.9 | 12 | A |
| Comparative Example 2 | 2 | 4c (FIG. 8) | 0.1 | 0.0 | 30 | B |
| Example 5 | 1 | Sample 1 (FIG. 11) | 6.7 | 1.8 | 19 | A |
| | | Sample 2 (FIG. 11) | 5.5 | 0.6 | 0 | A |
| Example 6 | 3 | Sample 1 (FIG. 11) | 5.0 | 1.6 | 12 | A |
| | | Sample 2 (FIG. 11) | 3.8 | 0.4 | 9 | A |
| Comparative Example 3 | 2 | Sample 1 (FIG. 11) | 0.1 | 0.0 | 27 | B |
| | | Sample 2 (FIG. 11) | 0.1 | 0.0 | 30 | B |

As is evident from the above results, in examples in which R was 0.2 to 15.0, r was 0.2 to 12.0, and the charge rate was 10% to 80%, composite material molded articles were obtained in which the fiber orientation degree f in the region A was 0.10 or more and 1.0 or less and the aforementioned function relating to the region A had a negative slope. Furthermore, these composite material molded articles had mechanical properties (impact resistance) better than those of the composite material molded articles of comparative examples.

Hereinafter, the present invention will be more specifically described based on examples relating to the composite material molded article according to the second embodiment.

Example

Figure 22:
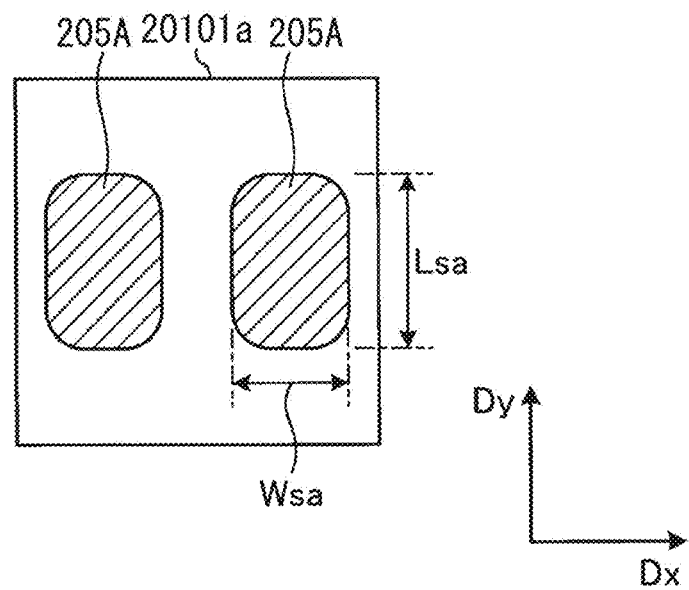
FIG. 22 is a view for illustrating a method for manufacturing a molded substance according to Example 21, which shows an example of the way the base materials are arranged in a mold.
Figure 23:
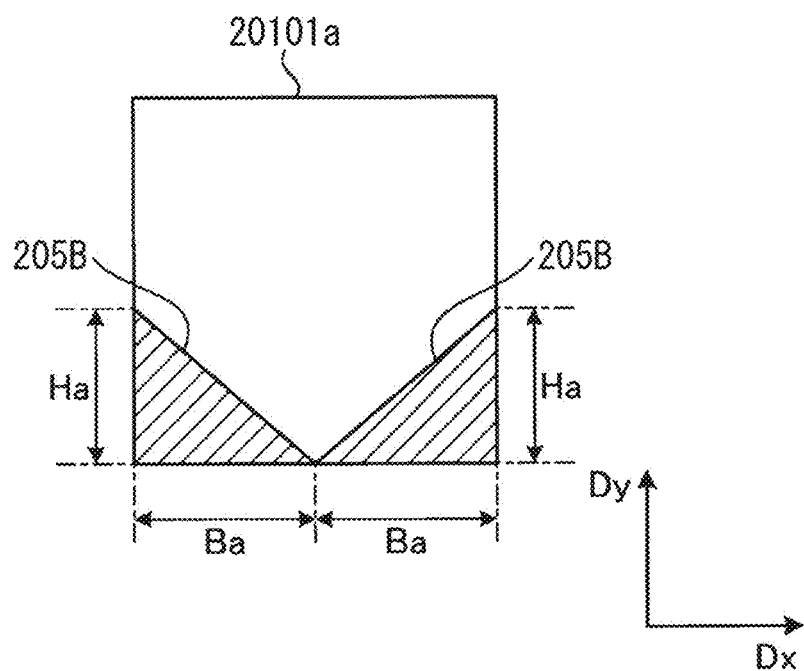
FIG. 23 is a view for illustrating a method for manufacturing a molded substance according to Example 22, which shows an example of the way the base materials are arranged in a mold.
Figure 24:
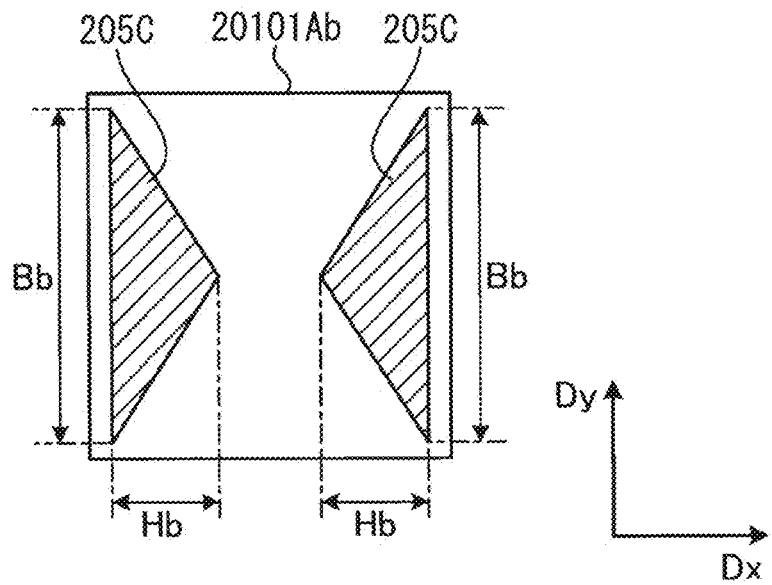
FIG. 24 is a view for illustrating a method for manufacturing a molded substance according to Comparative Example 21, which shows an example of the way the base materials are arranged in a mold.
Figure 25:
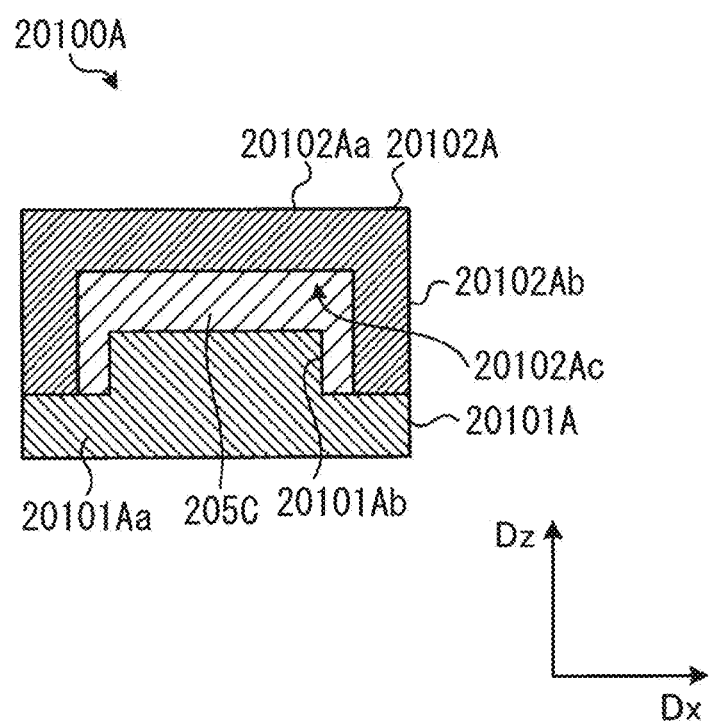
FIG. 25 is a view for illustrating the method for manufacturing a molded substance according to Comparative Example 21.
Figure 26:
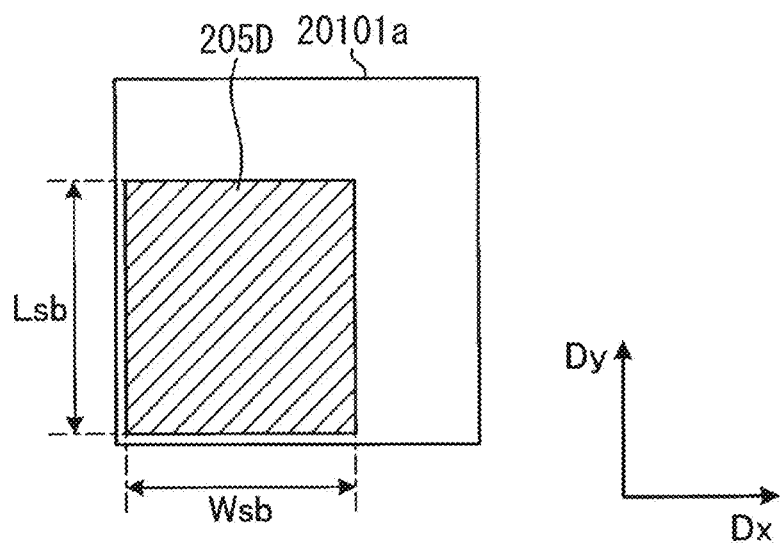
FIG. 26 is a view for illustrating a method for manufacturing a molded substance according to Comparative Example 22, which shows an example of the way the base material is disposed in a mold.
Figure 27:
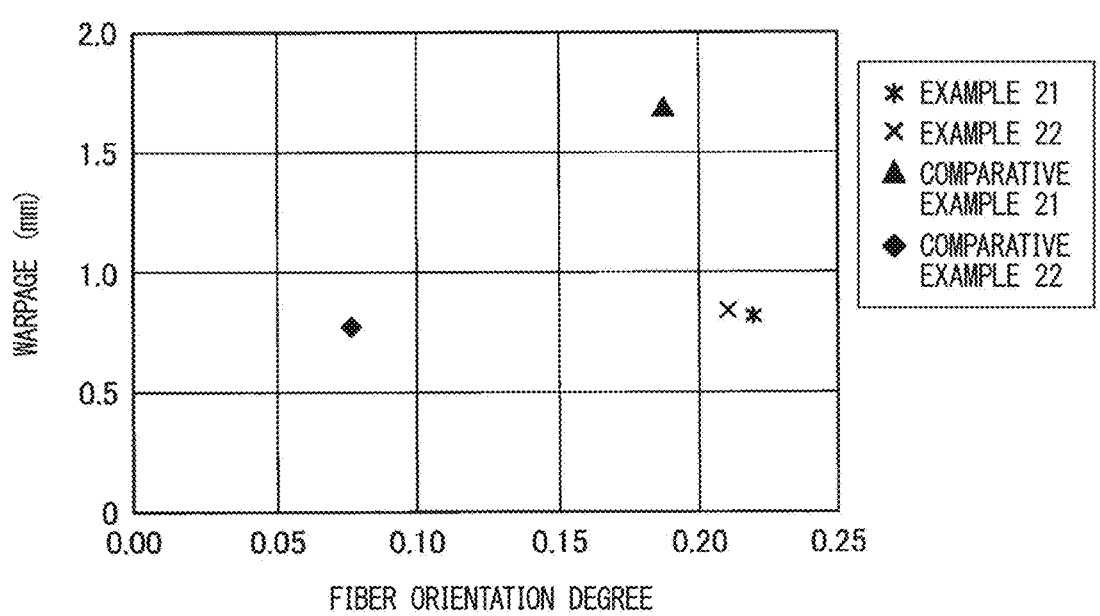
FIG. 27 is a graph showing the relationship between a fiber orientation degree and warpage in molded substances according to examples and comparative examples.

FIG. 22 is a view for illustrating a method for manufacturing a molded substance according to Example 21, which shows an example of the way the base materials are arranged in a mold. FIG. 23 is a view for illustrating a method for manufacturing a molded substance according to Example 22, which shows an example of the way the base materials are arranged in a mold. FIG. 24 is a view for illustrating a method for manufacturing a molded substance according to Comparative Example 21, which shows an example of the way the base materials are arranged in a mold. FIG. 25 is a view for illustrating the method for manufacturing a molded substance according to Comparative Example 21. FIG. 26 is a view for illustrating a method for manufacturing a molded substance according to Comparative Example 22, which shows an example of the way the base material is disposed in a mold. FIG. 27 is a graph showing the relationship between a fiber orientation degree and warpage in molded substances according to examples and comparative examples. FIG. 28 is a graph showing the relationship between a position in a second direction and a height, which illustrates an example of the shape of warpage of a molded substance.

Base materials 205A, 205B, 205C, and 205D used in Examples 21 and 22 and Comparative Examples 21 and 22 shown in FIGS. 22 to 26 are formed of the same material in the same formulation. As the base materials 205A, 205B, 205C, and 205D. "STR120N131-KA6N" (trade name, manufactured by Mitsubishi Chemical Corporation) was used. The molding conditions are the same in Examples 21 and 22 and Comparative Examples 21 and 22. That is, the base materials were molded under the conditions of a mold temperature of 140° C. a load of 72 tons, a mold clamping speed of 1 mm/sec, and a molding time of 3 minutes for which the materials were molded after the closing of the mold.

Figure 28:
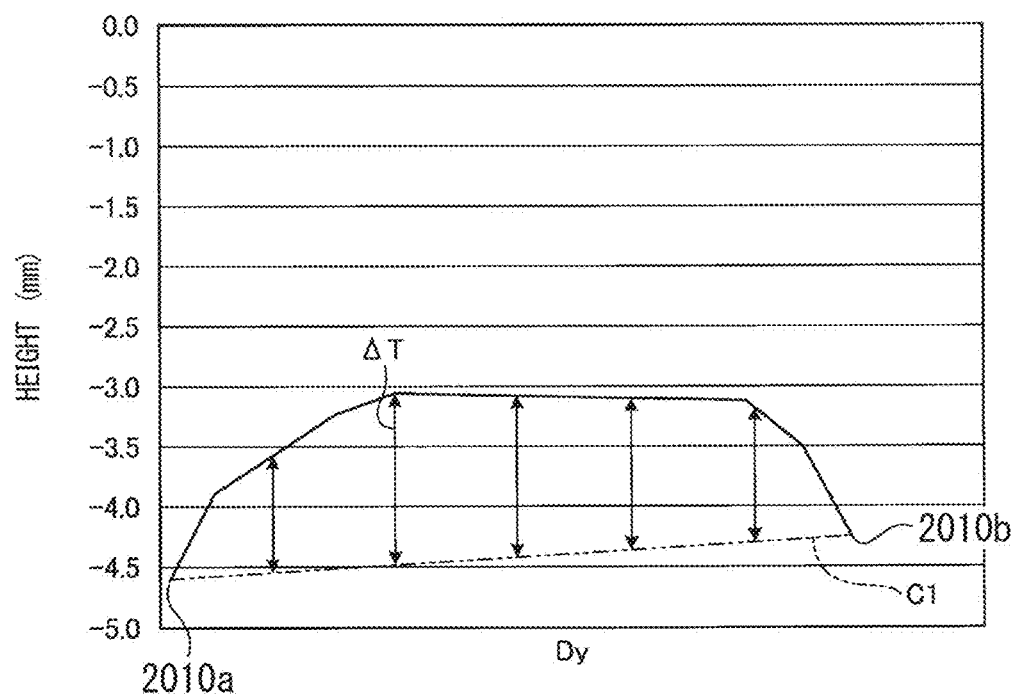
FIG. 28 is a graph showing the relationship between a position in a second direction and a height, which illustrates an example of the shape of warpage of a molded substance.

The warpage of the molded substance was measured along the resin merging portion 204 of the molded substance 201 shown in FIG. 13, and the results are shown in FIGS. 27 and 28. In Comparative Example 22, although the resin merging portion 204 was not formed, the warpage was measured at a position corresponding to the resin merging portion 204 of the molded substance 201. That is, in both the example and comparative example, the warpage that occurred along the second direction Dy was measured at the central portion of the molded substance in the first direction Dx.

After the base materials 205A, 205B. 205C, and 205D were subjected to compression molding, the obtained molded substances were left to stand for 24 hours or longer at a temperature of 23° C., and then the warpage was measured. A coordinate measuring machine was used for measuring the warpage. The coordinate measuring machine can measure the shape of a molded substance in a non-contact manner by scanning the surface of the molded substance placed on a surface plate of the measurement device with a laser beam. The in-plane direction of the surface plate of the coordinate measuring machine is regarded as an XY axis, and the height direction of the measurement device is regarded as a Z axis. By measuring the dimension (height) of the surface of the molded substance in the Z axis direction within the XY plane, the coordinate measuring machine can measure the shape of warpage of the molded substance.

FIG. 28 is a graph for explaining an example of the shape of warpage of the molded substance 201 shown in FIG. 13. FIG. 28 is an example of the result of measuring the shape of warpage along the resin merging portion 204 from the center of one side 2010$a$ to the center of the other side 2010$b$ of the molded substance 201. As shown in FIG. 28, a line connecting the height of the side 2010$a$ and the height of the other side 2010$b$ is regarded as a virtual line C1. Supposing that no warpage occurs in the molded substance 201, the warped shape of the molded substance 201 agrees with the virtual line C1. In the present example and comparative example, a difference ΔT between the height along the resin merging portion 204 and the virtual line C1 was calculated, and the average of absolute values of the difference ΔT at a plurality of sites was adopted as the warpage of the molded substance 201. For the molded substances 201 of the examples and comparative examples, warpage was measured by the same method.

In Examples 21 and 22 and Comparative Example 22, the mold shown in FIG. 20 was used as the mold 20100. Just as the molded substance 201 in FIG. 19, the molded substances of Examples 21 and 22 and Comparative Example 22 are quadrangles 30 cm on one side and having a thickness of 2 mm. Furthermore, in Comparative Example 21, the mold 20100A shown in FIG. 25 was used. FIG. 25 is a cross-sectional view obtained by cutting the mold 20100A along the width direction and the thickness direction. As shown in FIG. 25, a lower mold 20101A of the mold 20100A has a base portion 20101Aa and a projection portion 20101Ab. An upper mold 20102A has an upper portion 20102Aa and a wall portion 20102Ab. A recess portion 20102Ac is formed by the upper portion 20102Aa and the wall portion 20102Ab. In a state where the mold 20100A is fastened, the projection portion 20101Ab is disposed in the recess portion 20102Ac, and the lateral face of the projection portion 20101Ab is separated from the wall portion 20102Ab. Accordingly, the molded substance of Comparative Example 21 has a box shape.

As shown in FIG. 22, each of the base materials 205A of Example 21 is approximately rectangular. Each base material 205A has a width Wsa of 80 mm, a length Lsa of 130 mm, and a thickness of 6 mm. Two base materials 205A are arranged in the second direction Dy at positions overlapping with the midpoint of the bottom portion 20101$a$ in the second direction Dy. Furthermore, the two base materials 205A are arranged in a state of being spaced apart in the first direction Dx. In a case where the two base materials 205A are compressed in the mold 20100 in this state, the base materials 205A flow and start to come into contact with each other at the central portion of the bottom portion 20101$a$. From the contact position, the base materials 205A flow in the longitudinal direction of FIG. 22 and are compressed and deformed. As a result, the resin merging portion 204 is formed. The maximum flow length of the base material 205A along the resin merging portion 204 is 150 mm. Furthermore, the charge rate of the base material was 23%, the fiber flow length of the base material was 84 mm, R was 3.3, and r was 2.4.

As shown in FIG. 23, each of the base materials 205B of Example 22 is triangular. Each base material 205B has a base length Ba of 150 mm, a height Ha of 150 mm, and a thickness of 8 mm. Just as in FIG. 19, the two base materials 205B are arranged adjacent to each other in the first direction Dx. The bases of the two base materials 205B are on the same side as the bottom portion 20101a. Furthermore, unlike the example shown in FIG. 19, the base materials 205B of Example 22 are arranged such that vertices of the triangles come into contact with each other. In a case where the two base materials 205B are compressed in the mold 20100 in this state, the base materials 205B also flow and thus start to come into contact with each other in the vicinity of one side of the bottom portion 20101a. The maximum flow length of the base material 205B along the resin merging portion 204 is 300 mm. Furthermore, the charge rate of the base material was 25%, the fiber flow length of the base material was 206 mm, R was 8.1, and r was 8.1.

As shown in FIG. 24, each of the base materials 205C of Comparative Example 21 is triangular. Each base material 205C has a base length Bb of 280 mm, a height Hb of 140 mm, and a thickness of 32 mm. The two base materials 205C are arranged adjacent to each other in the first direction Dx. The two base materials 205C am arranged on the projection portion 20101Ab such that the vertices thereof face each other. In the present example, a mold 20100A shown in FIG. 25 is used. In a case where the two base materials 205C are compressed in the mold 20100A, the base materials 205C flow and thus start to come into contact with each other at the central portion of the projection portion 20101Ab. The base material 205C flows between the projection portion 20101Ab and the upper portion 20102Aa shown in FIG. 25, and further flows between the lateral face of the projection portion 20101Ab and the wall portion 20102Ab. As a result, the formed molded substance of Comparative Example 21 has a box shape. The maximum flow length of the base material 205C along the resin merging portion 204 is 220 mm. Furthermore, the charge rate of the base material was 44%, the fiber flow length of the base material was 120 mm, R was 4.7, and r was 4.3.

As shown in FIG. 26, a base material 205D of Comparative Example 22 is quadrangular. One base material 205D is disposed on the bottom portion 20101a. The base material 205D has a width Wsb of 168 mm, a length Lsb of 168 mm, and a thickness of 6 mm. In Comparative Example 22, only one base material 205D was used, and the charge rate was 33%. However, the resin merging portion 204 was not formed. In a case where the base material 205D is compressed in the mold 20100, the base material 205D flows in the first direction Dx and the second direction Dy. Therefore, it is difficult to control the fiber orientation degree in a specific region.

As shown in FIG. 27, the warpage of the molded substance of Example 21 is 0.79 mm. In addition, the average of the fiber orientation degree in the first region RS1 of the molded substance of Example 21 is 0.22. The warpage of the molded substance of Example 22 is 0.82 mm. Furthermore, the average of the fiber orientation degree in the first region RS1 of the molded substance of Example 22 is 0.21.

The warpage of the molded substance of Comparative Example 21 is 1.70 mm. Furthermore, the average of the fiber orientation degree in the first region RS1 of the molded substance of Comparative Example 21 is 0.18. The warpage of the molded substance of Comparative Example 22 is 0.75 mm. Although the molded substance of Comparative Example 22 does not have the resin merging portion 204, the average of the fiber orientation degree in the molded substance is 0.075.

As is evident from the above results, in a case where the base material 205A and the base material 205B are arranged at a plurality of sites in the mold 20100, the base materials 205A and 205B flow along the resin merging portion 204 during molding. As a result, the average of the fiber orientation degree in the first region RS1 in the vicinity of the resin merging portion 204 can be increased. Furthermore, it has been revealed that in a case where the average of the fiber orientation degree in the first region RS1 is 0.19 or more, it is possible to inhibit warpage from occurring in the first region RS1 along the resin merging portion 204.

The above examples are merely an example, and the shape, arrangement, and the like of the base materials 205A and 205B can be appropriately changed. For example, by changing the arrangement and number of the base materials 205A and 205B, the resin merging portion 204 can be formed at any location in the molded substance 201. For instance, in a case where the molded substance 201 is connected to another member, the connection portion of the molded substance 201 and another member needs to have linearity. In a case where the resin merging portion 204 is formed in the connection portion of the molded substance 201, the occurrence of warpage can be inhibited in at least the connection portion of the molded substance 201, and hence the linearity can be ensured.

Even though the base materials 205C are arranged as shown in Comparative Example 21, by increasing the flow length of the base materials 205C flowing along the resin merging portion 204 such that the average of the fiber orientation degree becomes 0.19 or more, it is possible to inhibit the occurrence of warpage.

Hereinafter, the present invention will be more specifically described based on examples relating to the composite material molded article according to the third embodiment. However, for example, the shape of the mold to be used, molding temperature, pressure, and the like of the present invention are not limited to the examples.

(SMC)

In the present example, the following SMC was used.

Trade name "STR120N131-KA6N" (manufactured by Mitsubishi Chemical Corporation).

Example 31

<Preparation of Sample (Composite Material Molded Article) Using SMC>

Figure 29A:
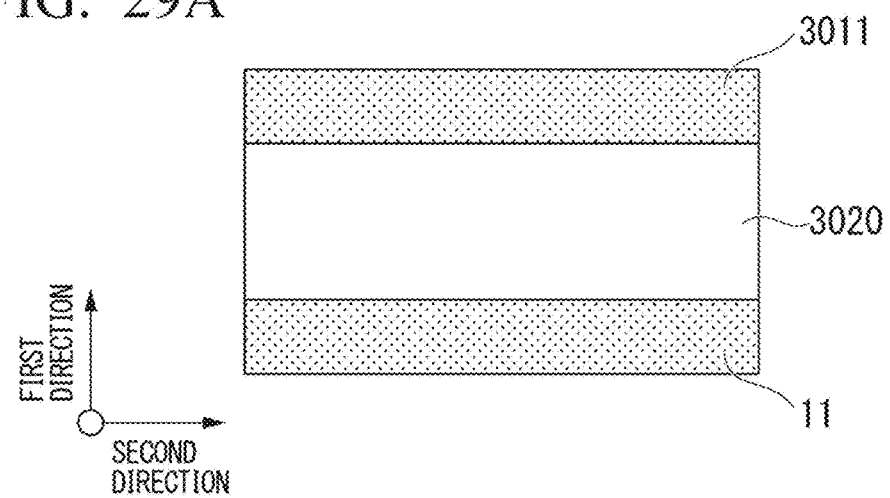
FIG. 29A is a plan view showing a mold cavity charged with SMC in Example 31.
Figure 29B:
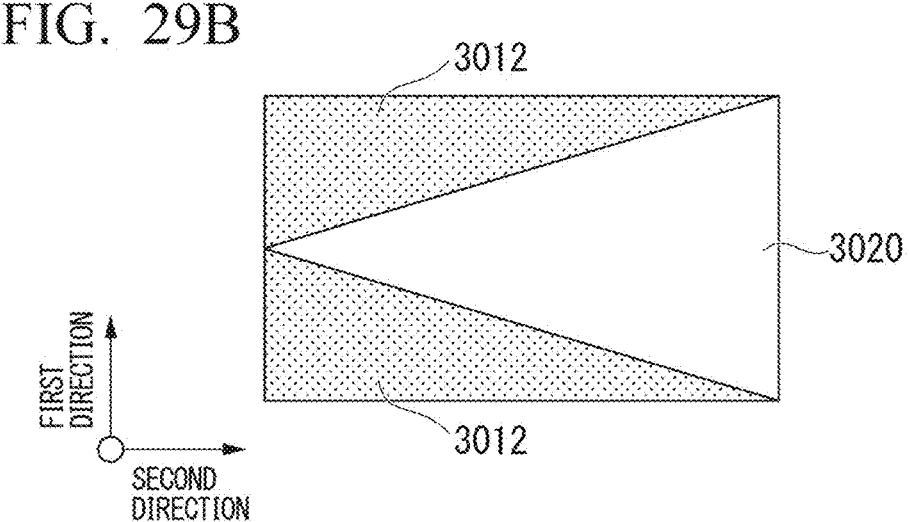
FIG. 29B is a plan view showing a mold cavity charged with SMC in Example 32.
Figure 29C:
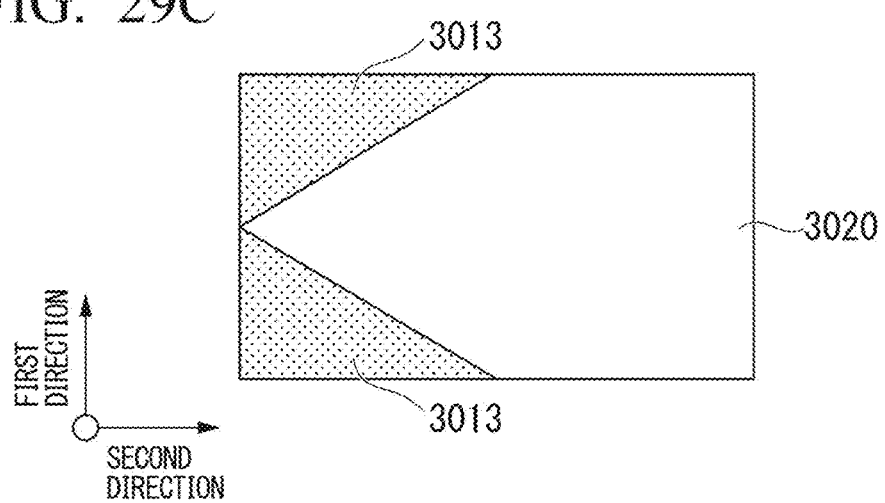
FIG. 29C is a plan view showing a mold cavity charged with SMC in Example 33.

As shown in FIG. 29A, a cavity 3020 (120 mm (length)× 200 mm (width)×2 mm (thickness)) of a mold was charged with laminates 3011 each obtained by laminating two sheets of SMC cut in the form of a 30 mm (length)×200 mm (width) rectangle such that the laminates were positioned at both ends of the cavity 3020 in the longitudinal direction. Then, the laminates were molded under the following molding conditions, thereby obtaining a 120 mm (length)×200 mm (width)×2 mm (thickness) composite material molded article.

Presumably, in a case where the cavity is charged as described above, a weld line may be easily formed at the central portion of the composite material molded article in the longitudinal direction (first direction). The same shall be applied to Examples 32 and 33 which will be described later. Therefore, in Examples 31 to 33, the transverse direction of the composite material molded article was adopted as a second direction, and the longitudinal direction of the molded article was adopted as a first direction. In reality, in the composite material molded articles obtained in Examples 31 to 33, within the surface of the central portion in the longitudinal direction, there was a weld line extending in the transverse direction.

Figure 30:
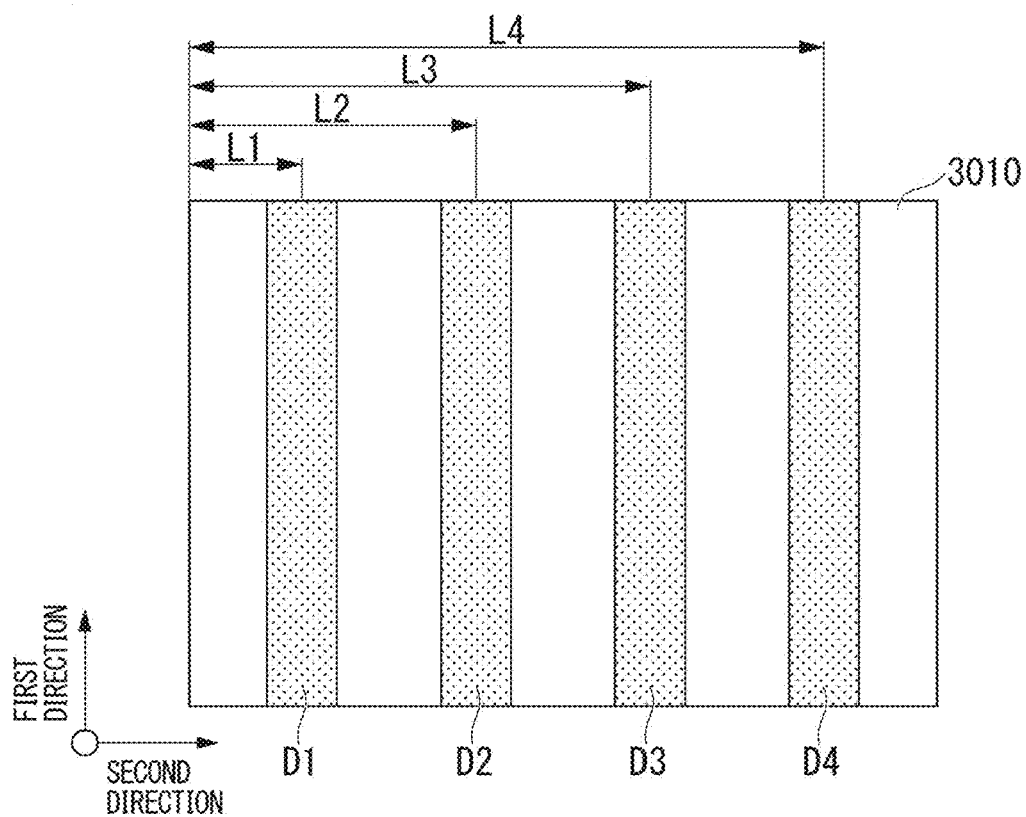
FIG. 30 is a plan view schematically showing locations where tensile test pieces are cut out from a composite material molded article.
Figure 31:
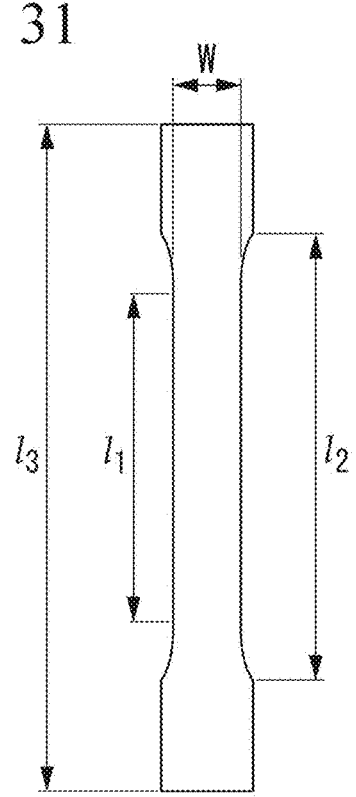
FIG. 31 is a plan view schematically showing the shape of a tensile test piece.
Figure 32A:
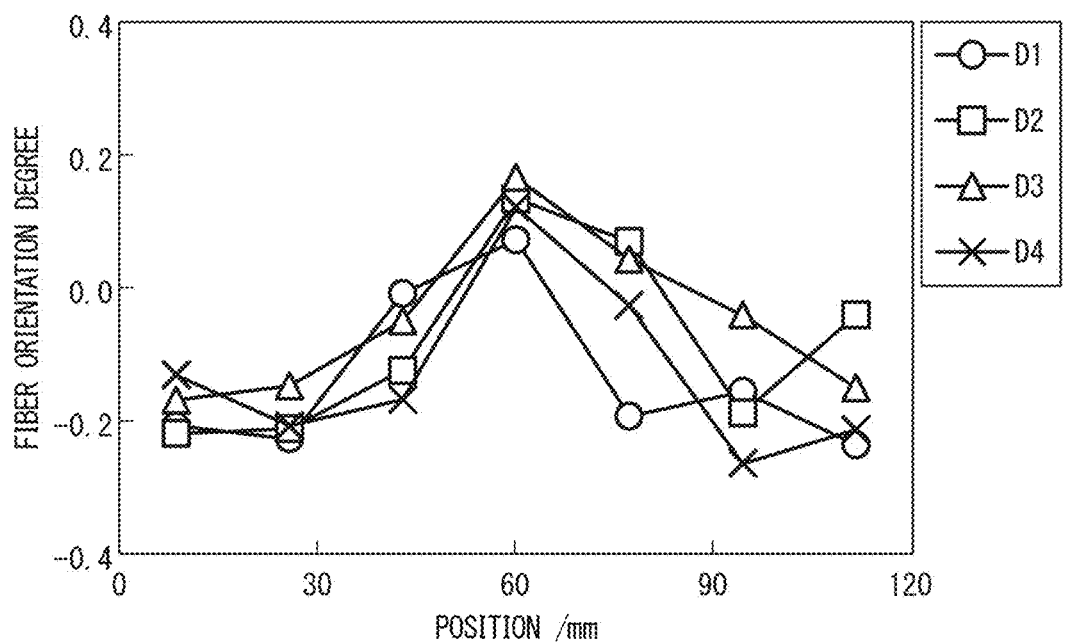
FIG. 32A is a graph showing the distribution of a fiber orientation degree in Example 31.

"Molding Conditions"
  Mold temperature: 140° C.
  Pressure: 8 MPa
  Pressing time: 3 minutes
<Tensile Test>
  As shown in FIG. 30, four tensile test pieces D1, D2, D3, and D4 were cut out from the obtained composite material molded article 3010. As shown in FIG. 31, each of D1, D2, D3, and D4 is a dumbbell-shaped test piece in which a gauge length l1 is 40 mm, a width w of a parallel portion is 10 mm, a distance l2 between chucks is 70 mm, and a total length l3 is 120 mm. D1, D2, D3, and D4 were cut out from positions at which distances L1, L2, L3, and L4 between one end (left end in FIG. 30) of the composite material molded article 3010 in the transverse direction (second direction) and the center of each of the tensile test pieces in the direction of the width w became 47.5 mm, 82.5 mm, 117.5 mm, and 152.5 mm respectively.
  For D1 to D4, a tensile test was performed at a tensile speed of 2 mm/min, thereby determining the tensile strength.
<Measurement of Fiber Orientation Degree>
  After the tensile test, each of the tensile test pieces was divided into seven equal parts in the longitudinal direction (first direction), thereby obtaining evaluation samples. Each of the evaluation samples had a width (second direction) of 10 mm and a length (second direction) of about 16 mm. One of the evaluation samples divided into seven equal parts was split further by being broken during tensile test. In this case, a larger piece was used as an evaluation sample. Furthermore, a sample that was broken during tensile test and thus too damaged to be used for evaluation was not adopted as an evaluation sample. Instead, from both ends of the initially set position of the evaluation sample in the second direction, samples each having a width of 15 nm and a length of about 16 mm were cut out and used as evaluation samples.
  For the obtained 7 or 8 evaluation samples, the fiber orientation degree f was measured according to the following procedure by using the following measurement device.
  While being irradiated with X-rays by a transmission method, each evaluation sample was rotated around an axis that is the thickness direction of the sample, a diffracted X-ray was captured under the following measurement conditions, and a luminance (I($\varphi_i$) at an i-th rotation angle ($\varphi_i$) was measured. I($\varphi_i$) was normalized such that the integrated intensity expressed by Equation (3) became 10,000. Then, by using the measured I($\varphi_i$), a coefficient a of orientation was calculated by Equation (2). Furthermore, by using the obtained coefficient a of orientation, the fiber orientation degree f was calculated by Equation (1). For the sample that was broken during tensile test and thus too damaged to be used for evaluation as described above, f was calculated for the two evaluation samples cut out from both ends thereof, and the average thereof was adopted.
"Measurement Device"
  X-ray diffractometer: Empyrean (manufactured by Malvern Panalytical Ltd.)
"Measurement Conditions"
  Scan range (0): 0.0-359.6
  Step size (°): 0.4
  Integration time/1 step (s): 4.0
  2θ (°): 25.4
  Voltage (kV): 45
  Current (mA): 40
  "Filter"
  Beta-filter Nickel
  Material: Ni
  Thickness (mm): 0.02
  Micro gauge aperture (mm): 2.0
(Calculation of Full Width at Half Maximum)
  The evaluation positions at 7 points, that is, the distance (mm) from one end (upper end in FIG. 30) in the longitudinal direction of the composite material molded article was plotted on the horizontal axis, and the fiber orientation degree f was plotted on vertical axis, thereby obtaining the distribution of the fiber orientation degree f. FIG. 32A shows the obtained distribution of the fiber orientation degree f. As is evident from FIG. 32A, the fiber orientation degree f is high in the vicinity of the center of the evaluation sample.
  The obtained distribution of the fiber orientation degree f was approximated to normal distribution, thereby calculating the full width at half maximum. Furthermore, the average and standard deviation of the full width at half maximum and tensile strength of D1 to D4 were calculated. The results are shown in Table 3.
(Strength retention rate)
  The strength retention rate was calculated by the following equation. The results are shown in Table 3.

Strength retention rate=(average of tensile strength (MPa) of Example 31/tensile strength (MPa) obtained in a case where mold cavity was charged with SMC without gap)×100

In a cavity 3020 (120 mm (length)×200 mm (width)×2 mm (thickness)) of a mold, one sheet of SMC having the same shape as that of the cavity was disposed, thereby obtaining a composite material molded article. The molded article was subjected to a tensile test in the same manner as that described above. As a result, the tensile strength was about 89 MPa. This tensile strength was adopted as tensile strength obtained in a case where a mold cavity is charged with SMC without a gap.
(Appearance)
  The appearance of the obtained composite material molded article was visually checked and evaluated based on the following standard. The results are shown in Table 1.
  A (excellent): An SMC merging portion cannot be identified.
  B (fair): Although an SMC merging portion can be identified, the width of the merging portion in the first direction cannot be calculated by visual observation.
  C (poor): An SMC merging portion can be identified, and the width of the merging portion in the first direction can be calculated by visual observation.

Example 32

Figure 32B:
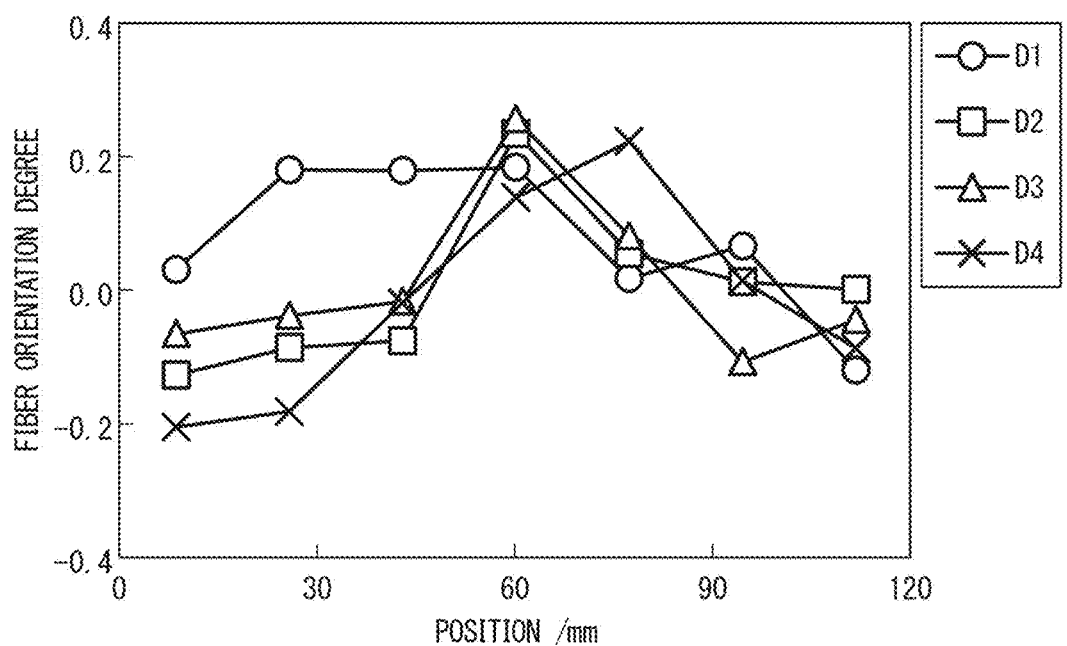
FIG. 32B is a graph showing the distribution of a fiber orientation degree in Example 32.

The same operation as that in Example 31 was performed, except that, as shown in FIG. 32B, two sites of the cavity 3020 of the mold was charged with a laminate 3012 obtained by laminating two sheets of SMC each cut in the form of a right triangle having a height of 60 mm and a base of 200 mm as two sides intersecting at right angles, such that the vertex of the right angle was positioned at the corner of the cavity 3020.
  The distribution of the fiber orientation degree f in Example 32 is shown in FIG. 32B. By the comparison between FIG. 32A and FIG. 32B, it has been found that the distribution of the fiber orientation degree f is broader in Example 32 than in Example 31.
  Table 3 shows the full width at half maximum and tensile strength of D1 to D4, the average and standard deviation of the full width at half maximum and tensile strength, the strength retention rate, and the appearance evaluation results.

Example 33

The same operation as that in Example 31 was performed, except that, as shown in FIG. 29C, 2 sites of the cavity 3020 of the mold was charged with a laminate 3013 obtained by laminating 4 sheets of SMC each cut in the form of a right triangle having a height of 60 mm and a base of 100 mm as two sides intersecting at right angles, such that the vertex of the right angle was positioned at the corner of the cavity 3020.

Figure 32C:
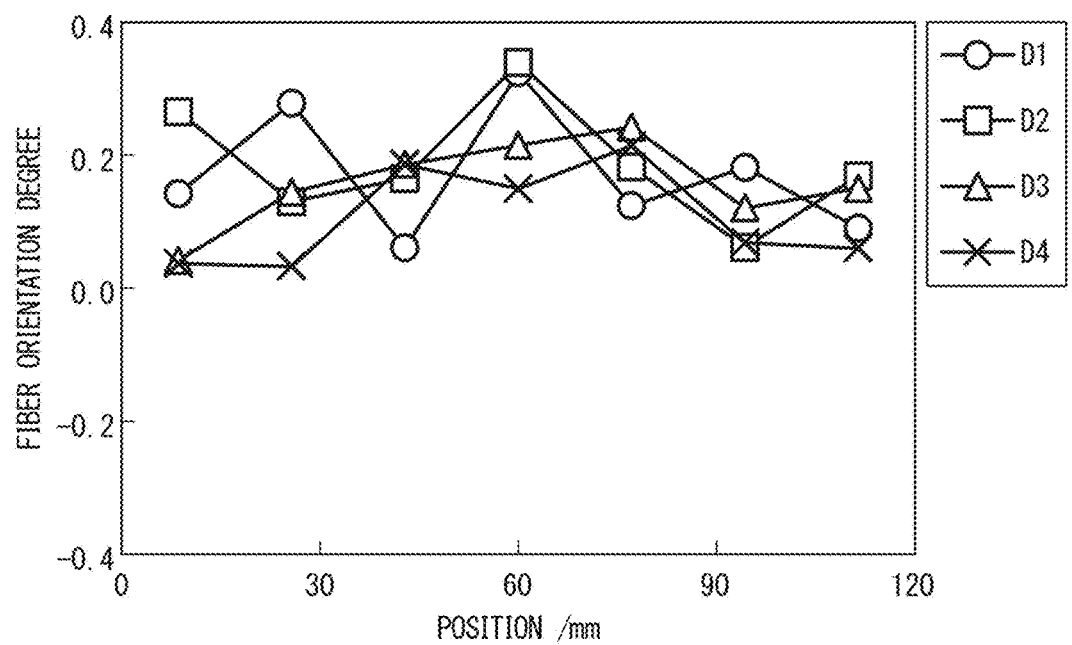
FIG. 32C is a graph showing the distribution of a fiber orientation degree in Example 33.

The distribution of the fiber orientation degree f in Example 33 is shown in FIG. 32C. By the comparison between FIG. 32B and FIG. 32C, it has been found that the distribution of the fiber orientation degree f is broader in Example 33 than in Example 32.

Table 3 shows the full width at half maximum and tensile strength of D1 to D4, the average and standard deviation of the full width at half maximum and tensile strength, the strength retention rate, and the appearance evaluation results.

TABLE 3

|  | Example 31 | | Example 32 | | Example 33 | |
| --- | --- | --- | --- | --- | --- | --- |
|  | Tensile strength (MPa) | Full width at half maximum (mm) | Tensile strength (MPa) | Full width at half maximum (mm) | Tensile strength (MPa) | Full width at half maximum (mm) |
| D1 | 38 | 19 | 52 | 108 | 54 | 407 |
| D2 | 38 | 24 | 53 | 14 | 51 | 218 |
| D3 | 33 | 41 | 56 | 24 | 51 | 265 |
| D4 | 50 | 22 | 47 | 52 | 67 | 56 |
| Average | 40 | 27 | 52 | 50 | 56 | 236 |
| Standard deviation | 7 | 10 | 4 | 42 | 8 | 145 |
| Strength retention rate (%) | 45 | | 58 | | 63 | |
| Appearance | A | | A | | A | |
| Charge rate (%) | 50 | | 50 | | 25 | |

The strength retention rate in Examples 31 to 33 was 25% or more.

There was no problem with the appearance of the composite material molded articles of Examples 31 to 33. In each of the composite material molded articles, there was no portion that was poorly filled, and SMC was cured by flowing to the end portion of the cavity of the mold.

INDUSTRIAL APPLICABILITY

According to the present invention, a high fiber orientation degree is obtained at the end portion or in a resin merging portion of a composite material molded article. As a result, it is possible to obtain a molded article which has better mechanical characteristics and is further inhibited from undergoing warpage compared to the conventional SMC molded article containing randomly oriented fibers.

The composite material molded article of the present invention can be used for members for aircrafts, members for automobiles, and the like that are require to have high strength and impact resistance and required to be lightened.

REFERENCE SIGNS LIST 1 composite material molded article
2,3,5,6,7,8 cut SMC
10 molded product
13 lateral face
13a, 13b, 13c, 13d planar portion
14 first end portion
100 mold (molding die)
201 molded substance
202 resin
203, 203A fiber tow
2031, 2031A fiber
204 resin merging portion
205,205A, 205B, 205C, 205D base material
2010a, 2010b, 2010c, 2010d side
20100,20100A mold
20101, 20101A lower mold
20101a bottom portion
20101b wall portion
20101c recess portion
20101Aa base portion
20101Ab projection portion
20102, 20102A upper mold
20102a base portion
20102b projection portion
20102Aa upper portion
20102Ab wall portion
20102Ac recess portion
Lf, Lfa, Lsa, Lsb length
Wf, Wfa, Wsa, Wsb width
RS1 first region
RS2 second region
RS3 third region
3010 composite material molded article
3011, 3012, 3013 laminate obtained by laminating cut SMC
3020 mold cavity

The invention claimed is:
1. A composite material molded article, comprising:
a molded product of a molding material containing a resin and fibers,
wherein an average of the following fiber orientation degree f in the following region A of the molded product is 0.20 or more and 1 or less, region A: in a case where a distance between one point at each of edges of a surface of a first end portion of the molded product and edges of the other end portion is measured along a vertical direction perpendicular to lateral faces of the first end portion within a surface of the molded product, and points separated from the one point by a distance equivalent to 3.0% of the distance measured from the one point are connected with a line along the edges of the first end portion of the molded product, a region surrounded with the line and edges of the molded product is regarded as a region A, fiber orientation degree f: in a case where the vertical direction is named 90° direction, a direction orthogonal to the vertical direction is named 0° direction, and an X-ray diffracted at a diffraction angle 2θ of 25.4° is detected by X-ray diffraction, a fiber orientation degree based on the 0° direction that is calculated from the following Equations (1), (2), and (3) is a fiber orientation degree f, $$f = 2a - 1 \quad (1)$$

$$a = \frac{\sum_{i=1}^{N} I(\Phi_i)\cos^2\Phi_i}{\sum_{i=1}^{N} I(\Phi_i)} \quad (2)$$

$$\int_0^{360} I(\Phi)d\Phi = \sum_{i=2}^{N} (I(\Phi_i) + I(\Phi_{i-1})) \times d\Phi \times \frac{1}{2} = 10000 \quad (3)$$

a in Equation (1) is a coefficient of orientation expressed by Equation (2), $I(\varphi_i)$ is a luminance at an i-th rotation angle $(\varphi_i)$ in the X-ray diffraction and is normalized such that an integrated intensity expressed by Equation (3) becomes 10,000, N in Equation (3) is the number of measurement points, and the number of measurement points is a value obtained by dividing 360(°) by a step size (°) that is an angle by which a molded product as a measurement target is rotated whenever the X-ray diffraction is measured, dφ in the same equation represents a micro-region of the rotation angle around the molded product as a measurement target, and dφ equals a value of the step size, wherein the following function of the region A of the molded product has a negative slope, function: a linear function obtained by measuring the fiber orientation degree f for two points at both end portions of a straight line extending in the vertical direction in the region A and for two or more points closer to the inside than the two points, plotting a distance (mm) between each of the points and the lateral faces of the first end portion on an x axis, plotting the fiber orientation degree f on a y axis, and performing linear approximation by a least square method.

2. The composite material molded article according to claim 1,
wherein the region A is a region surrounded with the edges of the molded product and a line connecting points 2 mm distant from the one point of each of the edges of the surface of the first end portion of the molded product in the vertical direction perpendicular to the lateral faces of the first end portion along the edges of the first end portion of the molded product.

3. The composite material molded article according to claim 1, which is a cured product of a sheet molding compound.

4. The composite material molded article according to claim 1,
wherein the fibers are carbon fibers.

5. The composite material molded article according to claim 1,
wherein an amount of the fibers is 20% by mass or more and 65% by mass or less with respect to a total amount of the composite material molded article.

6. A method for manufacturing the composite material molded article according to claim 1, comprising:
charging a molding die with a molding material containing a resin and carbon fibers such that a ratio R of the following fiber flow length to an average fiber length of the molding material falls into a range of 0.2 to 15.0; and
performing heat press molding on the molding material,
fiber flow length: a distance that the fibers of an end portion of the molding material charged into the molding die move to reach an edge or a resin merging portion of the molded article by heat press molding.

7. The method for manufacturing a composite material molded article according to claim 6,
wherein the molding material is a sheet molding compound.

8. The composite material molded article according to claim 1, wherein the average of the fiber orientation degree f in the region A of the molded product is 0.27 or more and 1 or less.

9. The composite material molded article according to claim 1, wherein the average of the fiber orientation degree f in the region A of the molded product is 0.34 or more and 1 or less.

10. The composite material molded article according to claim 1, wherein an amount of the fibers is 30% by mass or more and 60% by mass or less with respect to a total amount of the composite material molded article.

* * * * *